Figure 1:
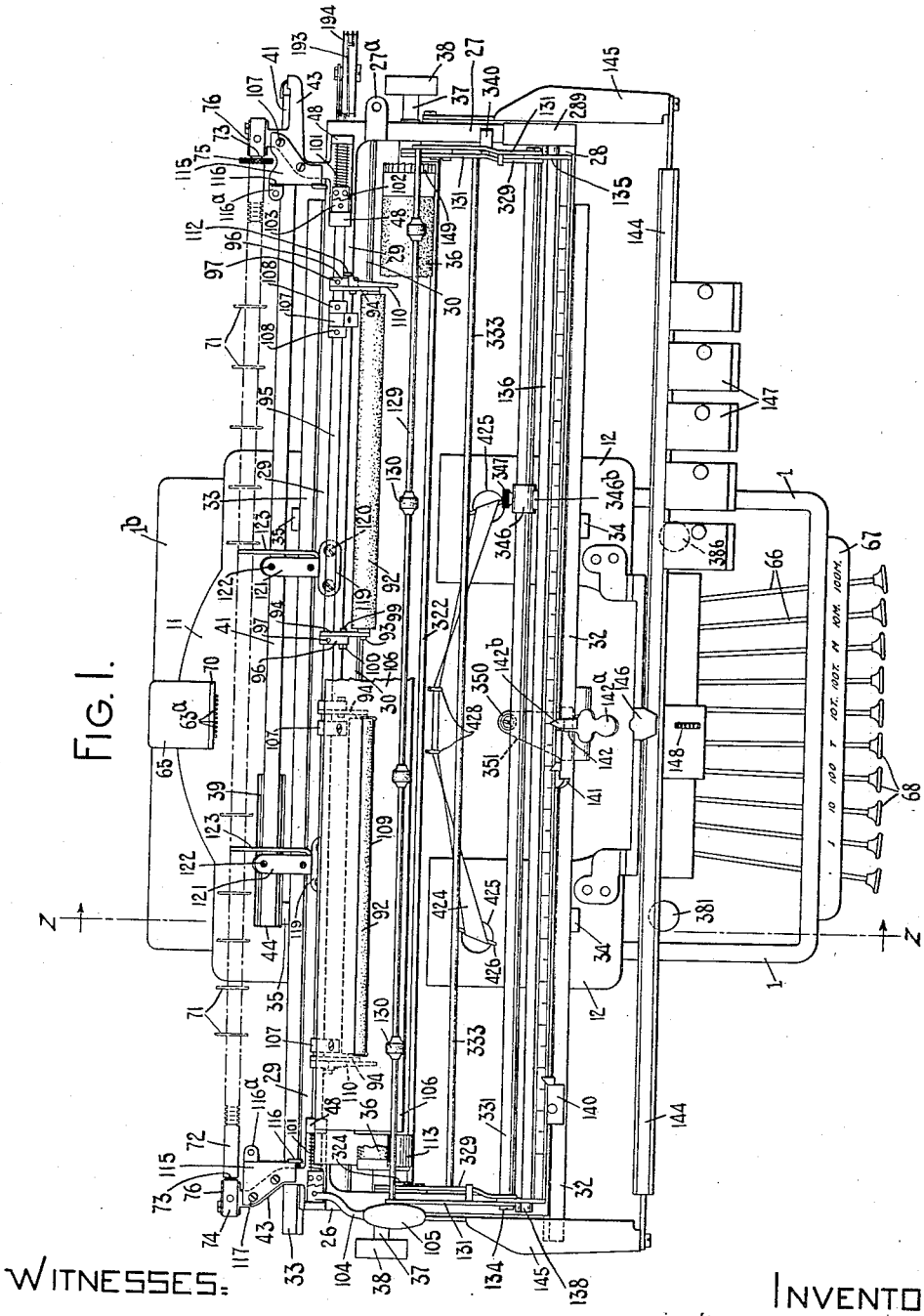

S. H. FARNHAM, A. W. SMITH & J. PHELPS.
TYPE WRITING MACHINE.
APPLICATION FILED JAN. 18, 1913.

1,071,612.

Patented Aug. 26, 1913.
19 SHEETS—SHEET 1.

WITNESSES:
M. F. Hannweber
M. W. Pool

INVENTORS:
Stephen H. Farnham
Arthur W. Smith
Joseph Phelps
By Jacob Field
THEIR ATTORNEY

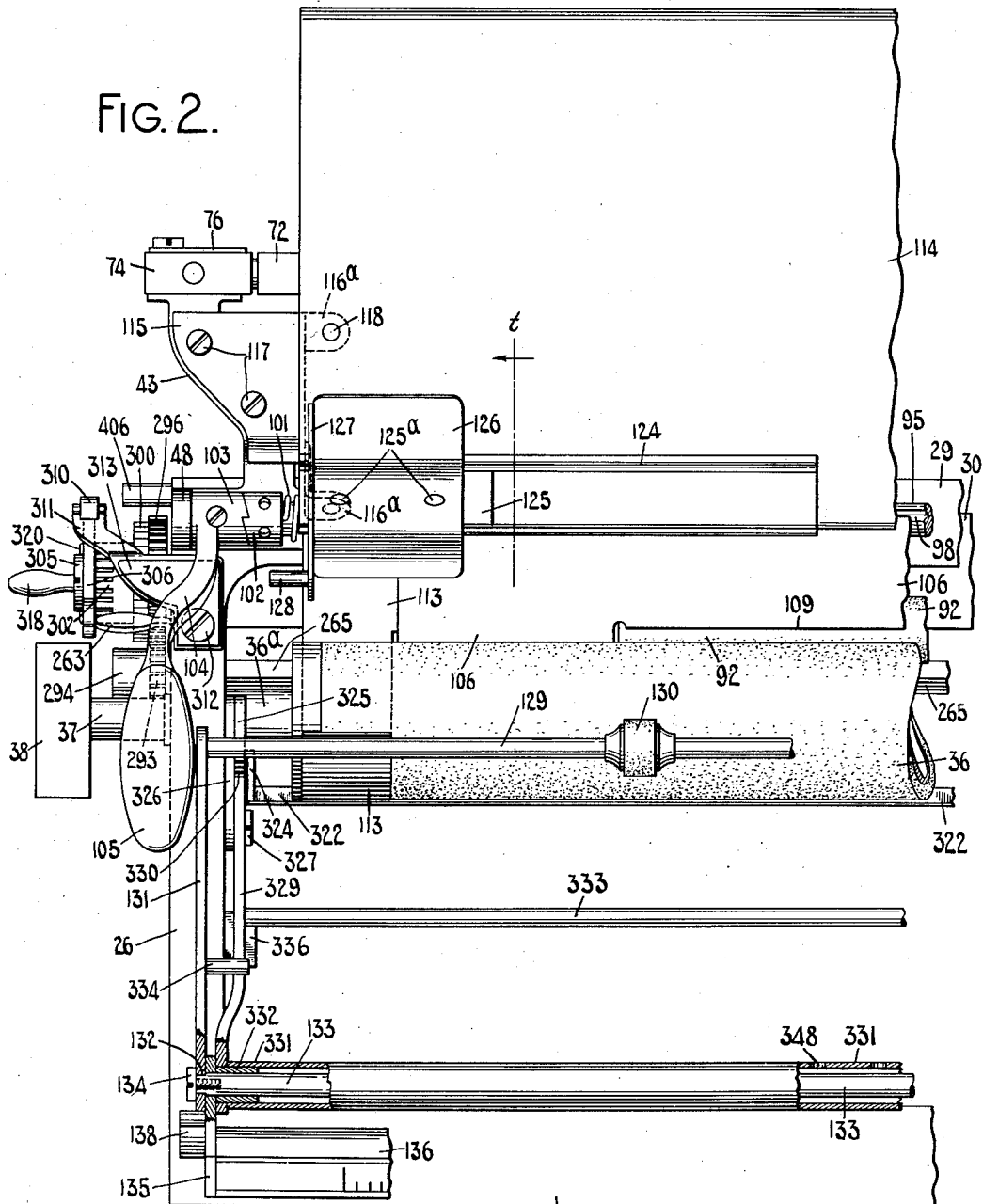

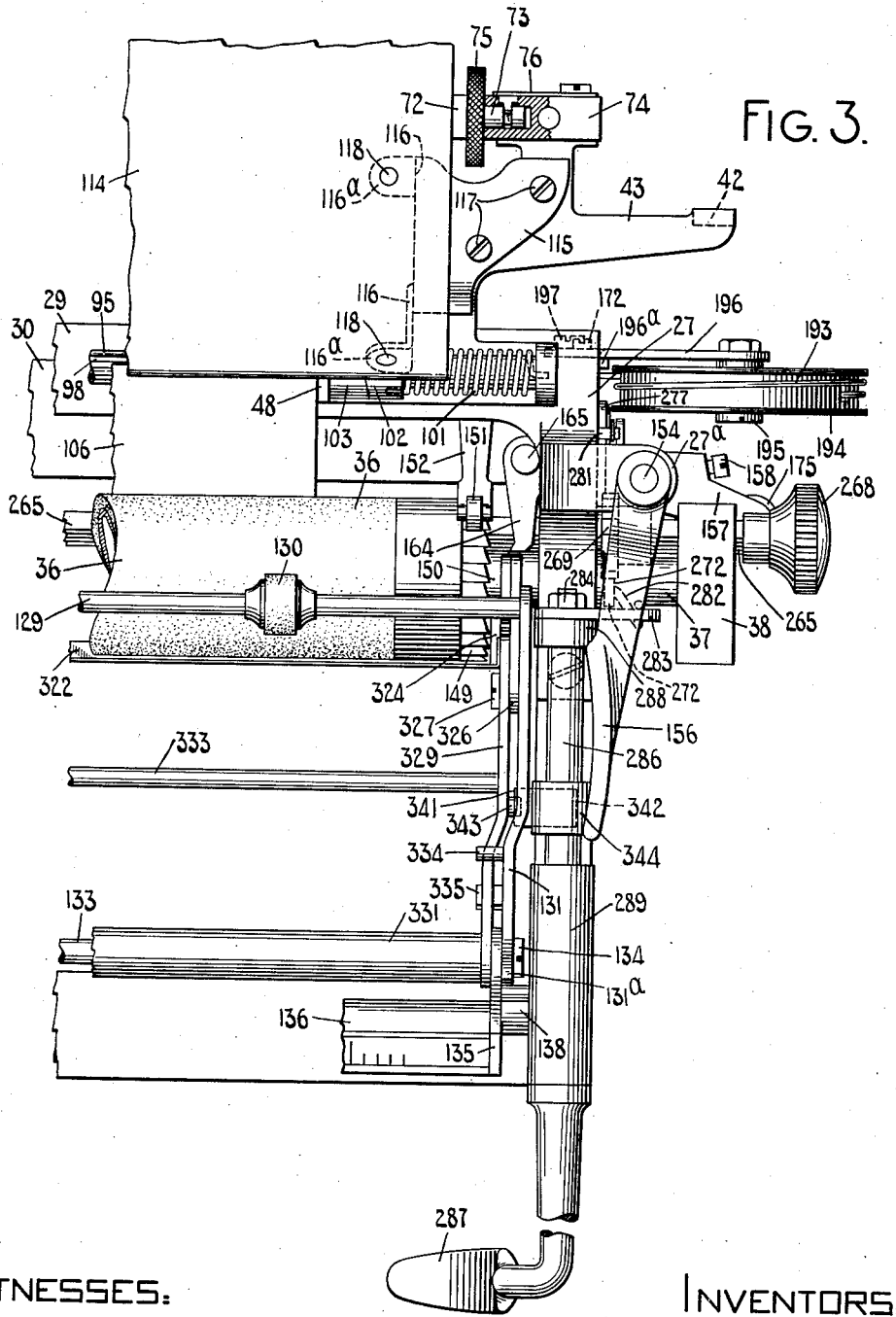

S. H. FARNHAM, A. W. SMITH & J. PHELPS.
TYPE WRITING MACHINE.
APPLICATION FILED JAN. 18, 1913.
1,071,612.
Patented Aug. 26, 1913.
19 SHEETS—SHEET 4.
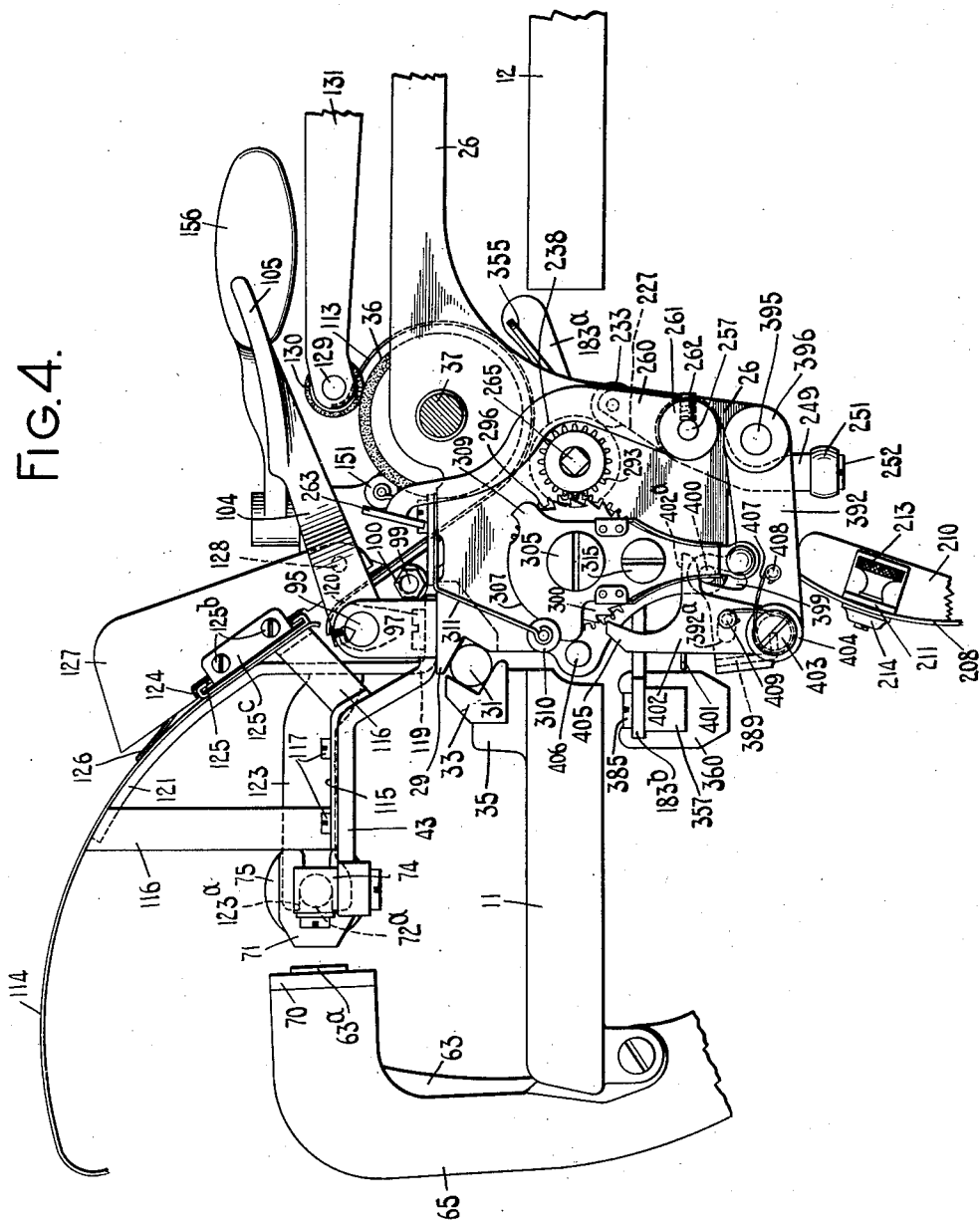

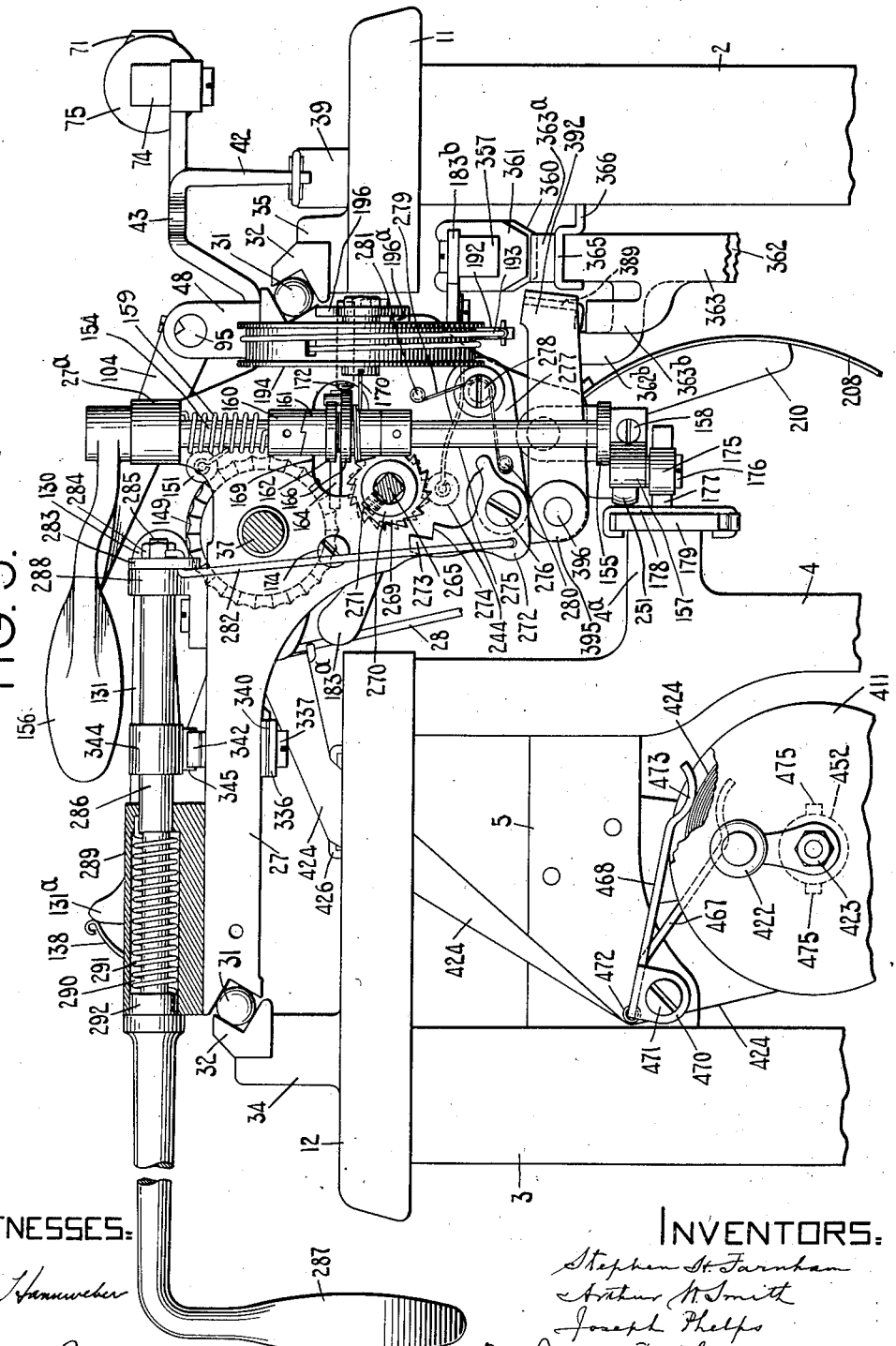

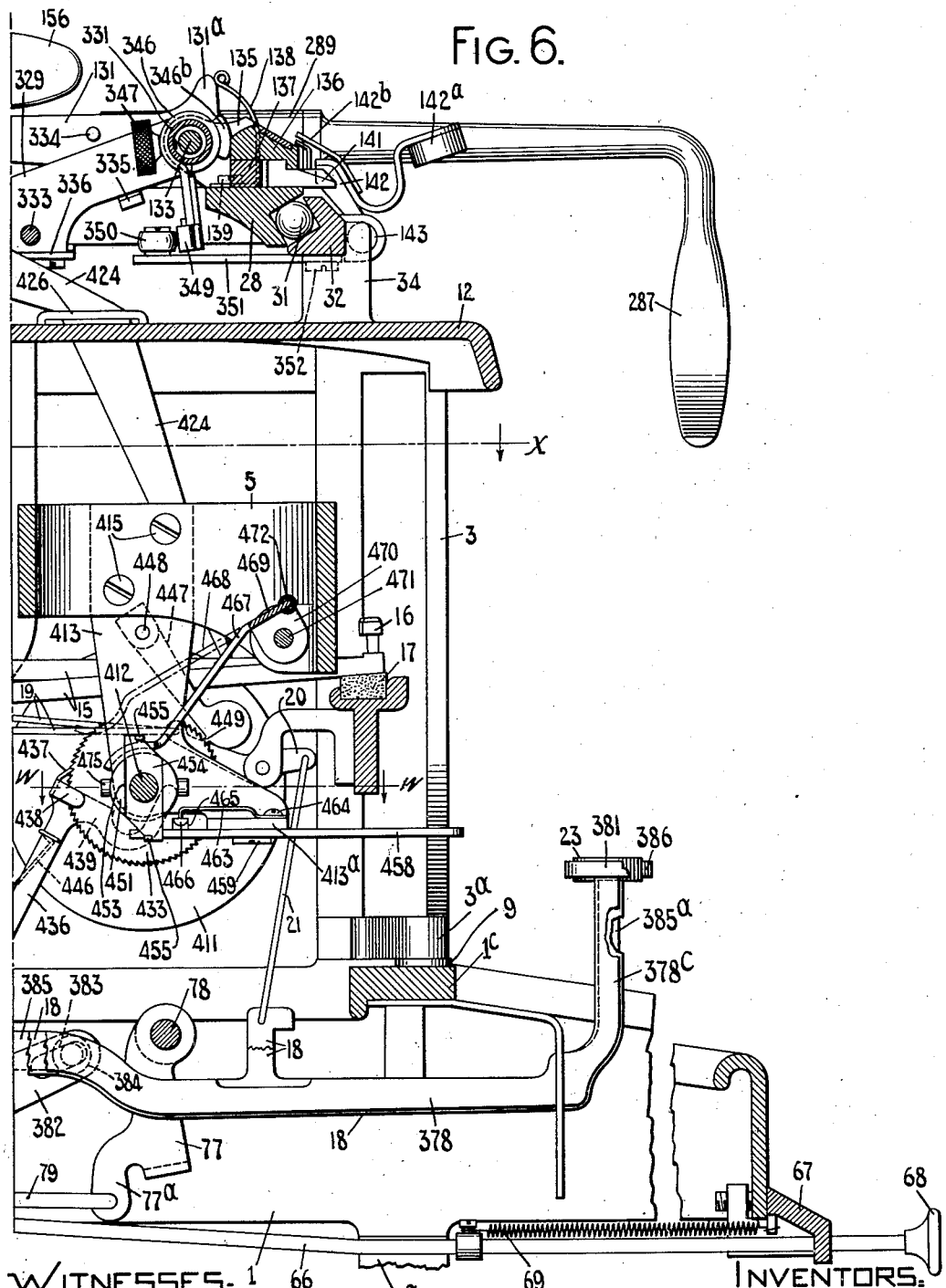

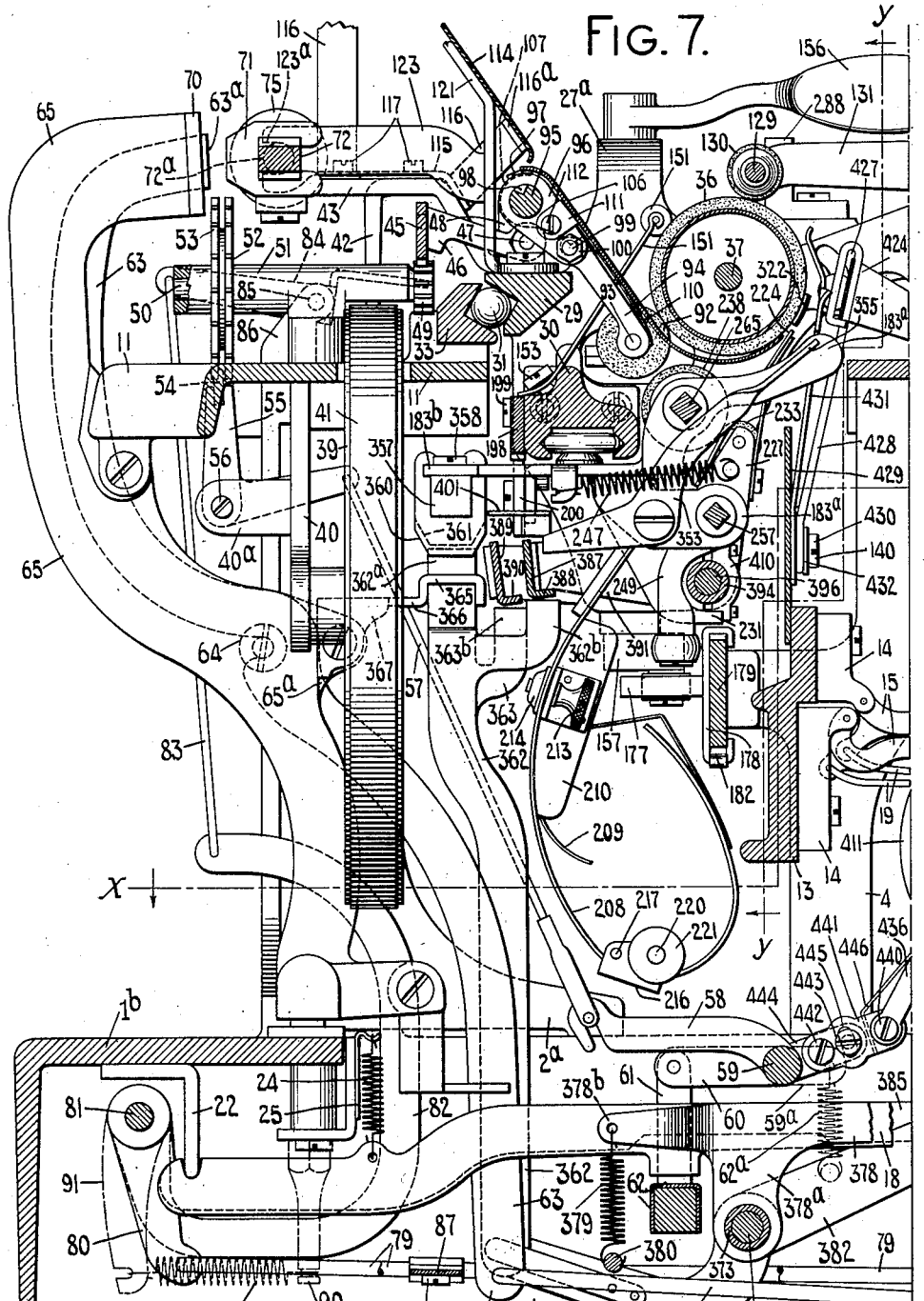

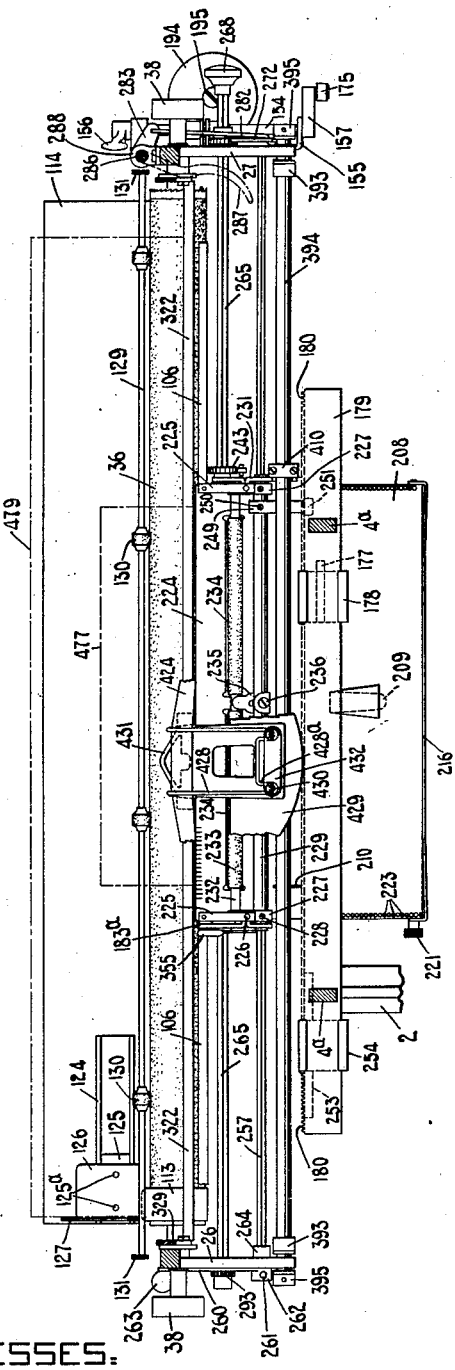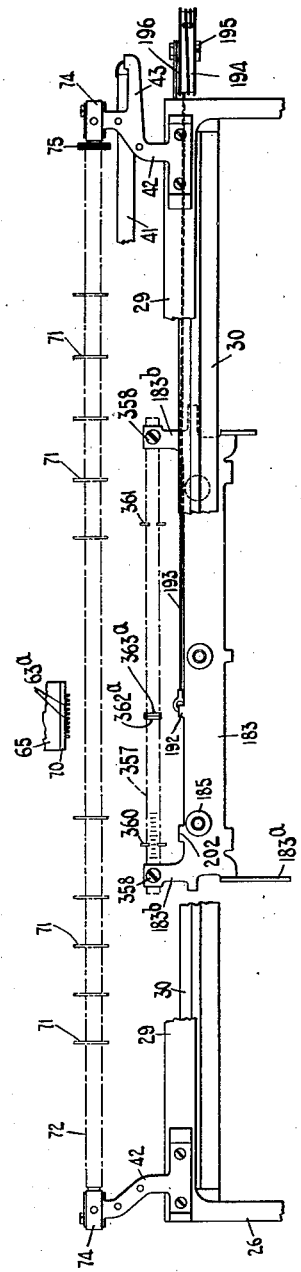

S. H. FARNHAM, A. W. SMITH & J. PHELPS.
TYPE WRITING MACHINE.
APPLICATION FILED JAN. 18, 1913.

1,071,612.

Patented Aug. 26, 1913.

19 SHEETS—SHEET 9.

FIG. 10.

WITNESSES:

INVENTORS:
Stephen H. Farnham
Arthur W. Smith
Joseph Phelps
By Jacob Felbel
THEIR ATTORNEY S. H. FARNHAM, A. W. SMITH & J. PHELPS.
TYPE WRITING MACHINE.
APPLICATION FILED JAN. 18, 1913.
1,071,612.
Patented Aug. 26, 1913.
19 SHEETS—SHEET 10.
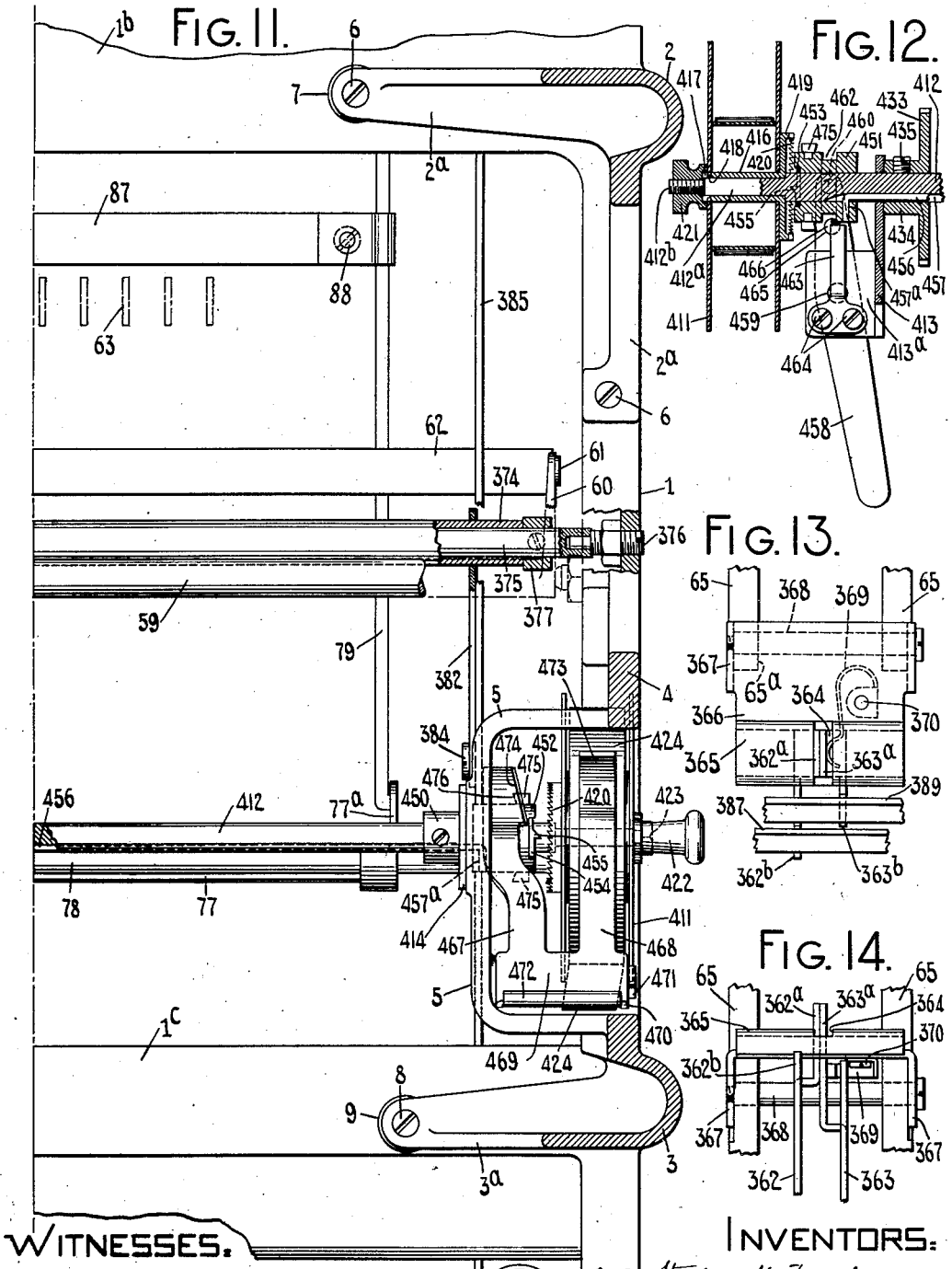
WITNESSES.
INVENTORS:
Stephen H. Farnham
Arthur W. Smith
Joseph Phelps
By Jacob Felbel
THEIR ATTORNEY

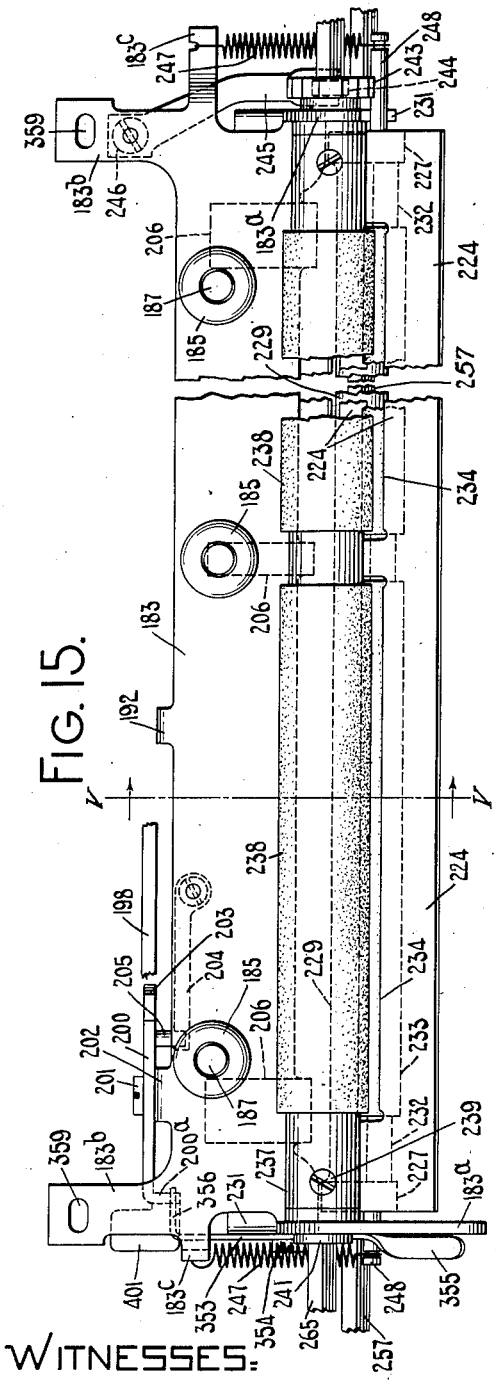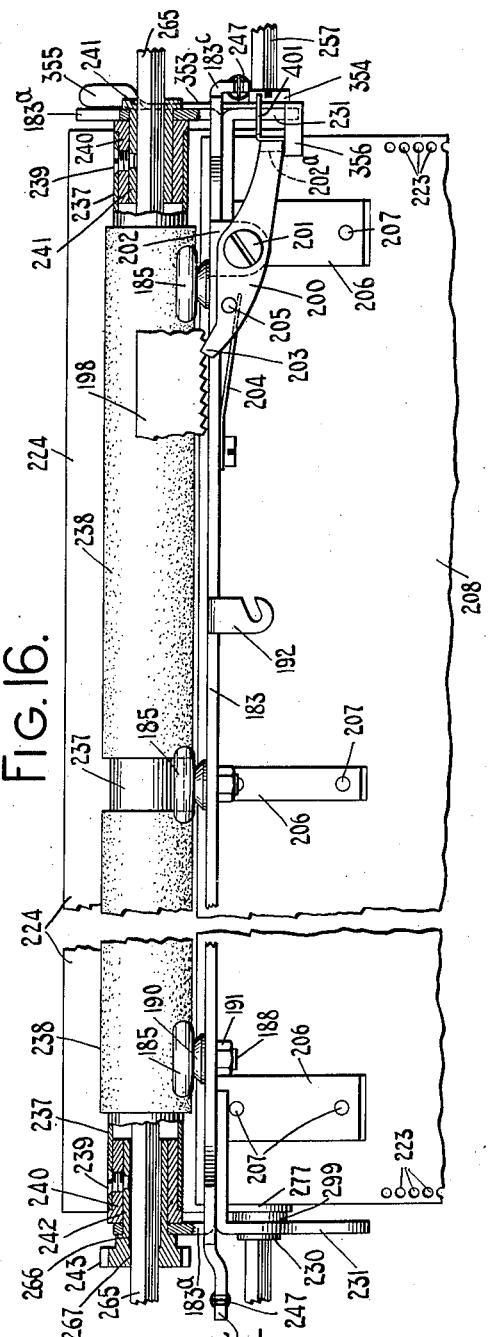

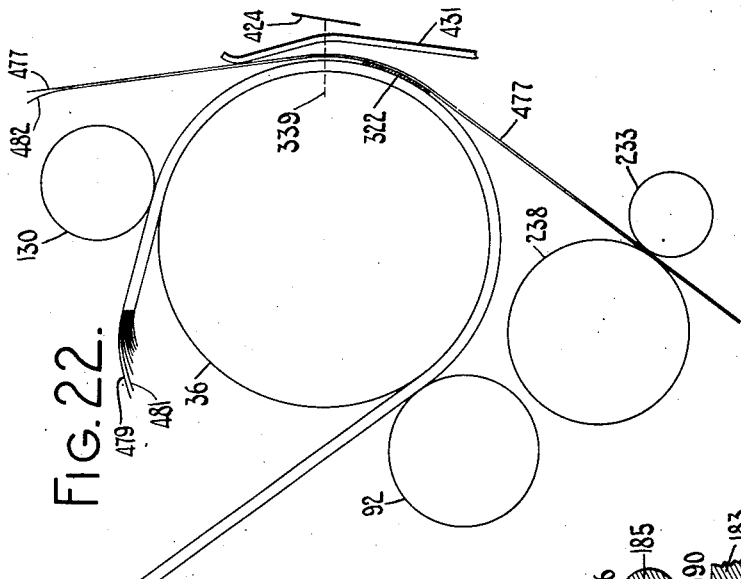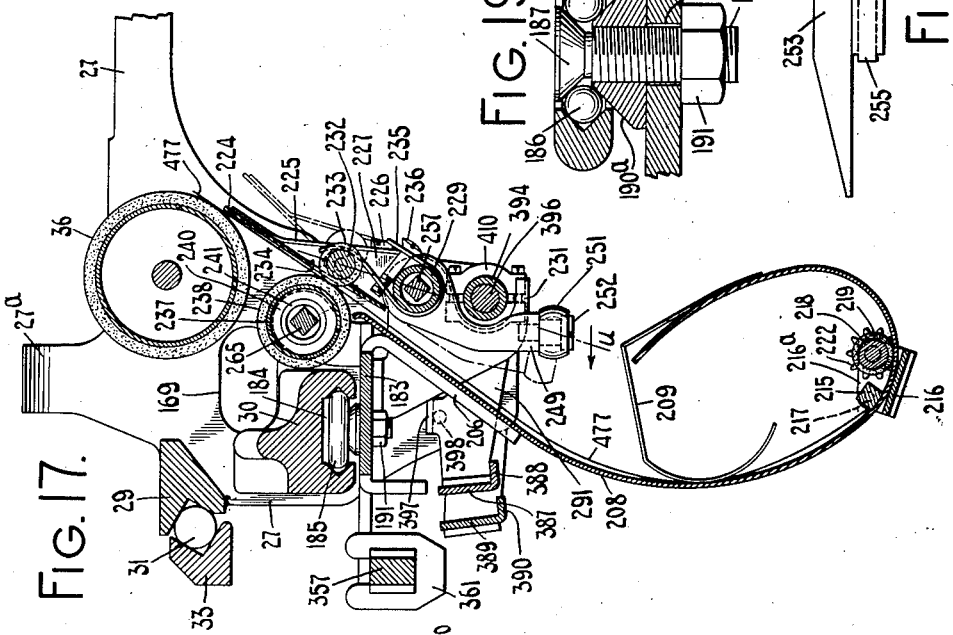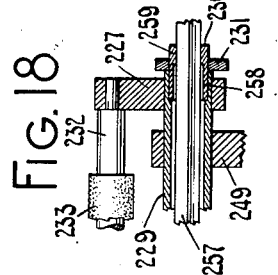

S. H. FARNHAM, A. W. SMITH & J. PHELPS.
TYPE WRITING MACHINE.
APPLICATION FILED JAN. 18, 1913.
1,071,612.
Patented Aug. 26, 1913.
19 SHEETS—SHEET 13.
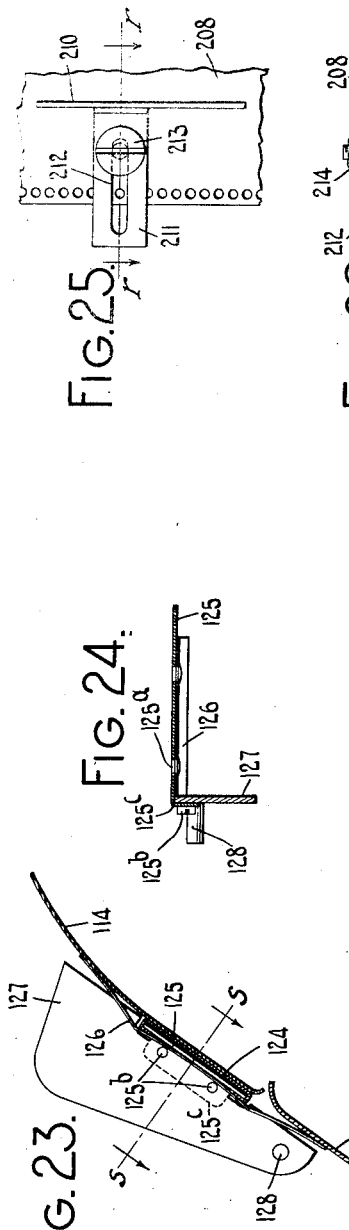
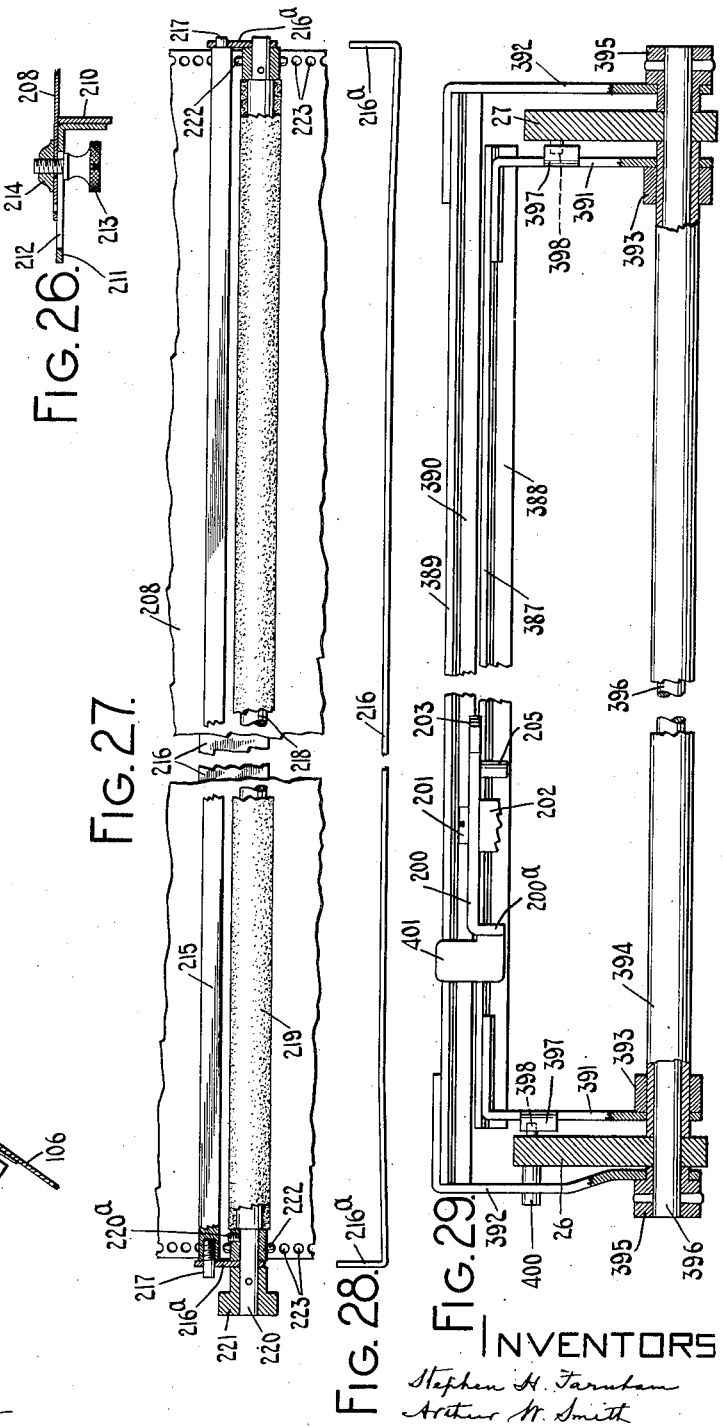
WITNESSES:
INVENTORS
Stephen H. Farnham
Arthur W. Smith
Joseph Phelps
By Jacob Felbel
THEIR ATTORNEY

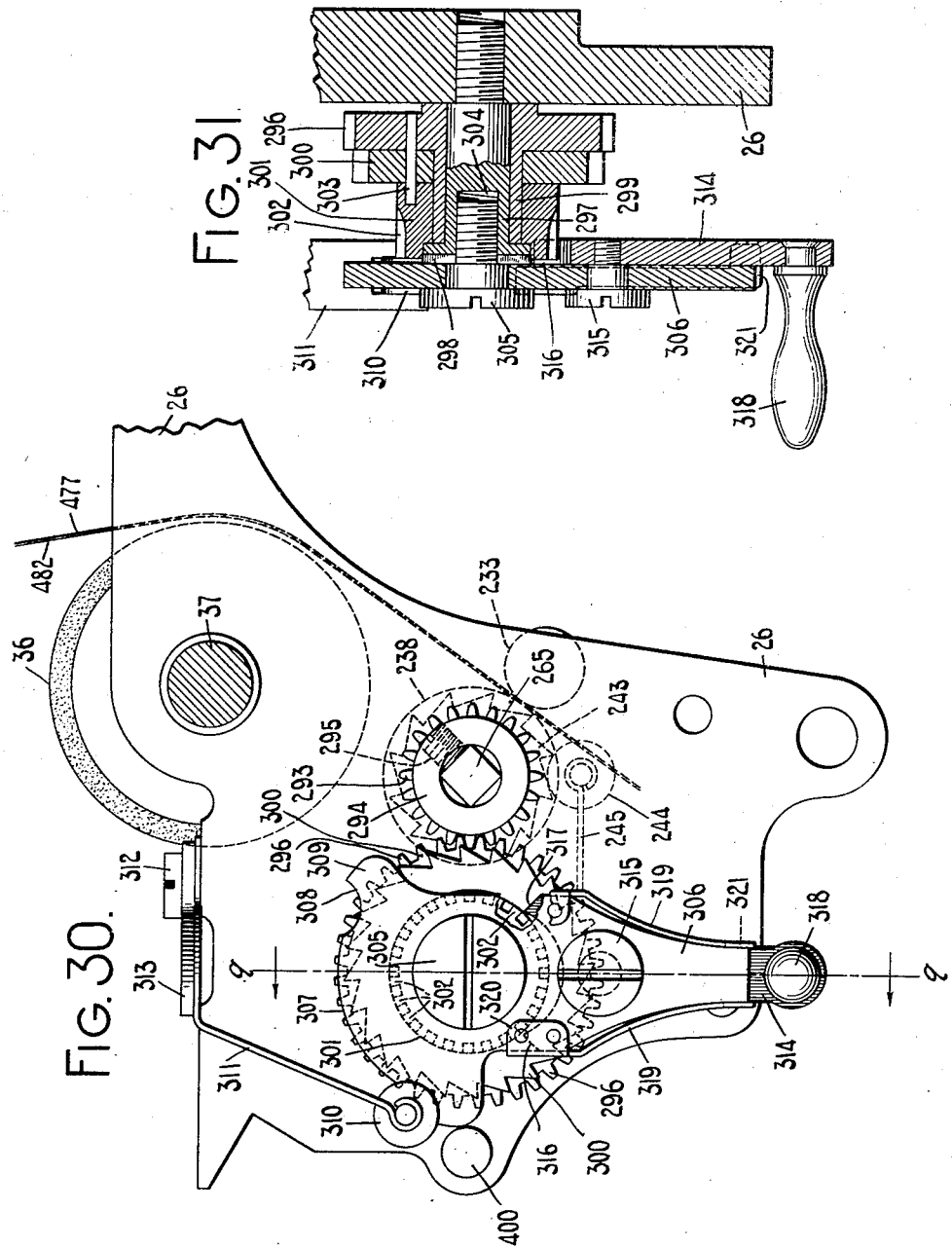

S. H. FARNHAM, A. W. SMITH & J. PHELPS.
TYPE WRITING MACHINE.
APPLICATION FILED JAN. 18, 1913.
1,071,612.
Patented Aug. 26, 1913.
19 SHEETS—SHEET 15.
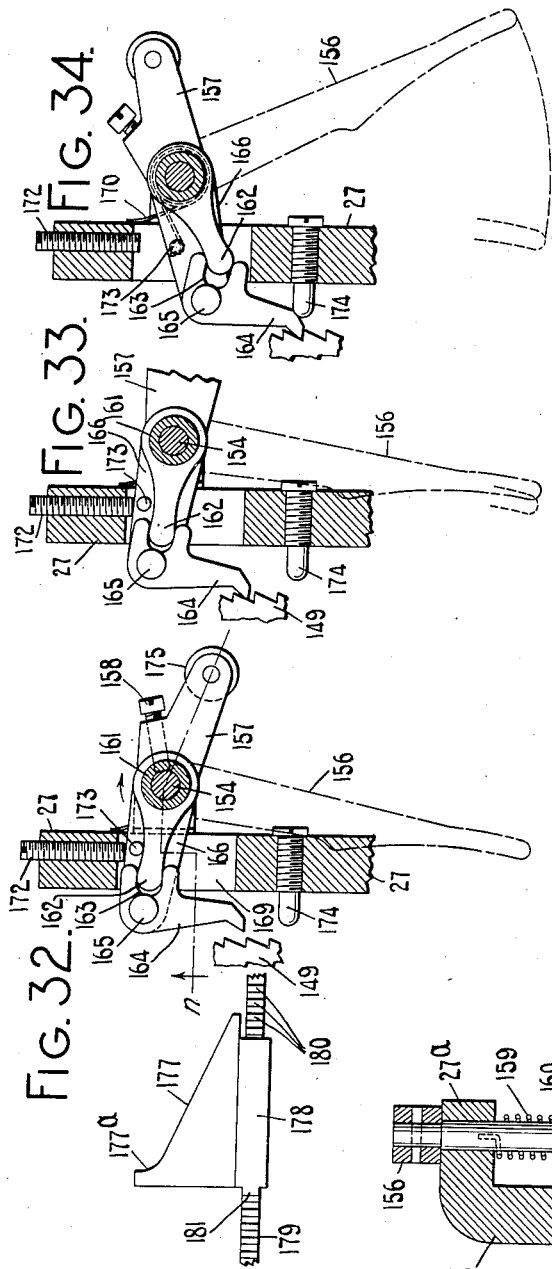
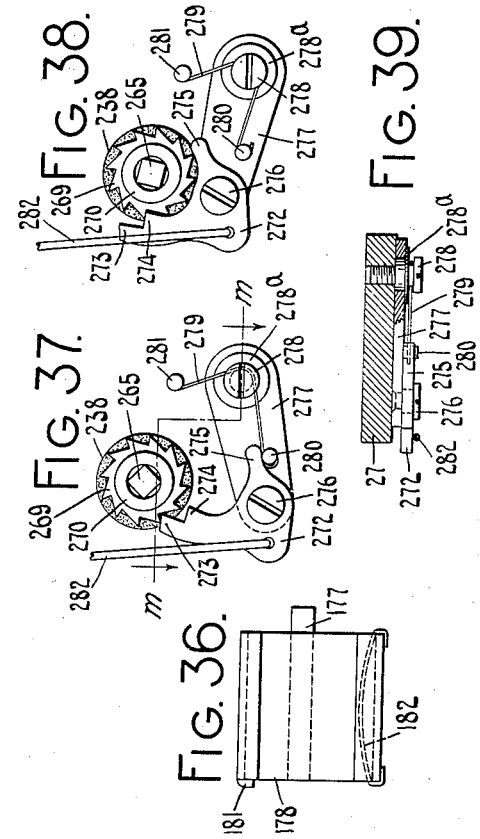
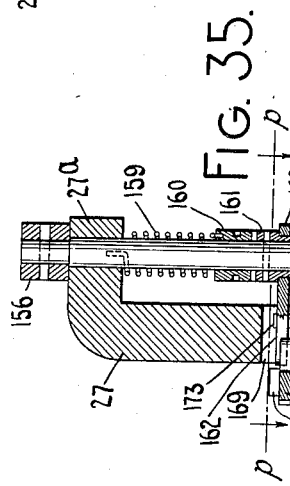
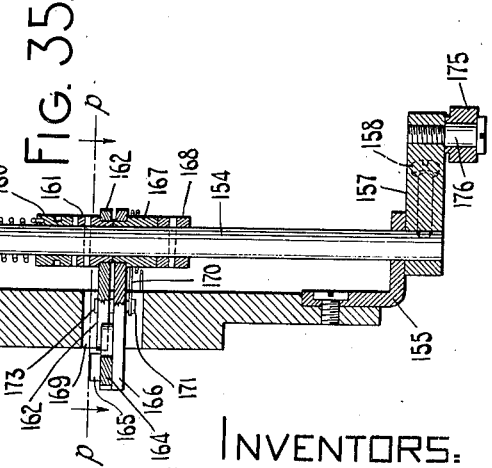
WITNESSES:
INVENTORS:
Stephen H. Farnham
Arthur W. Smith
Joseph Phelps
By Jacob Felbel
THEIR ATTORNEY

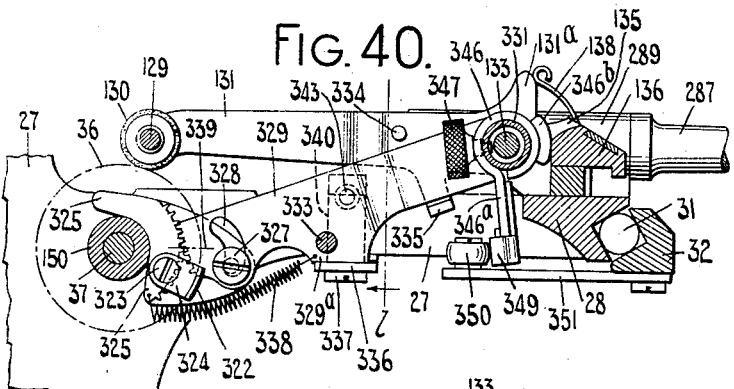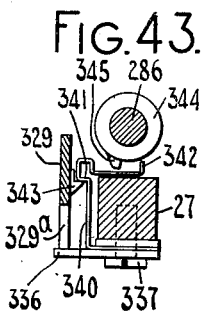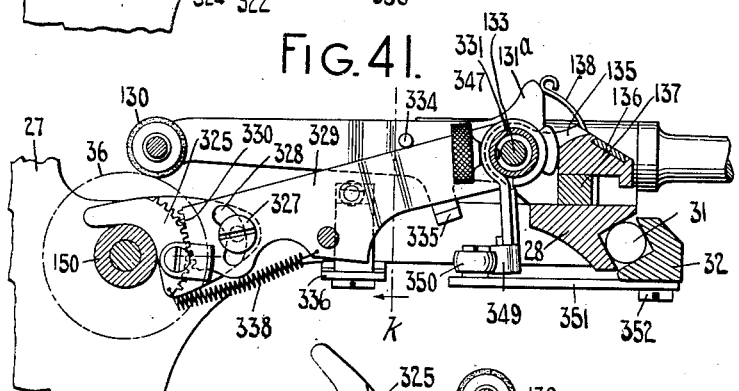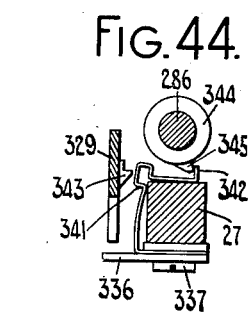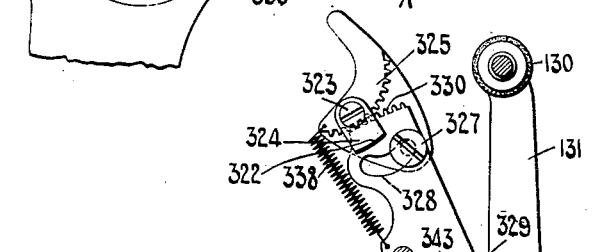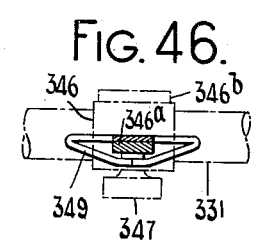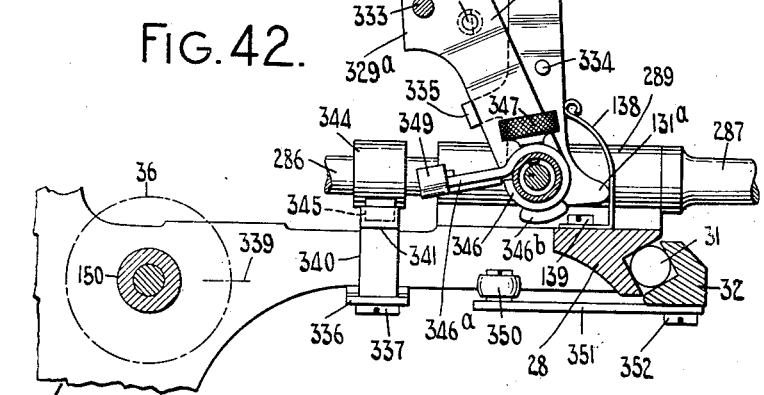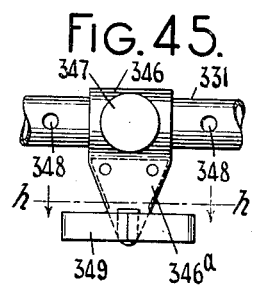

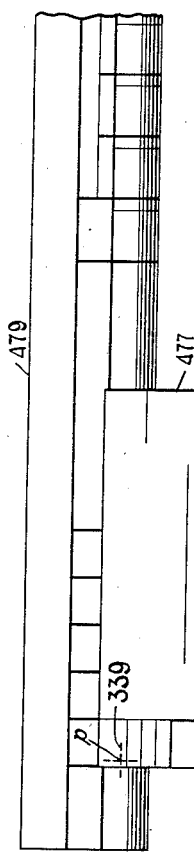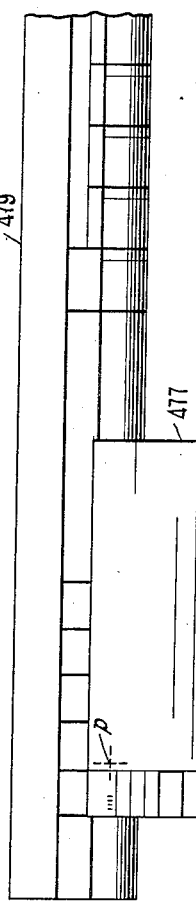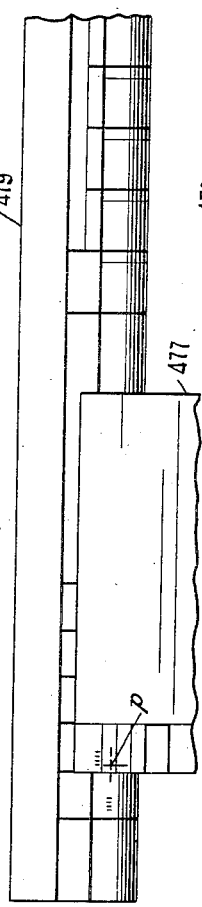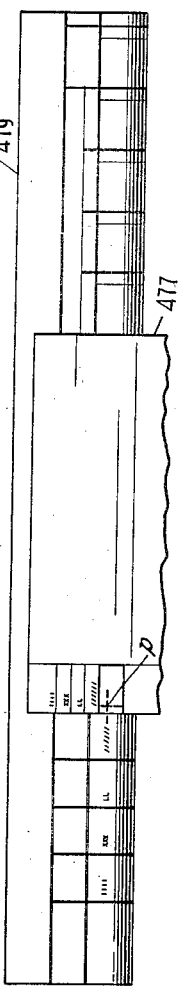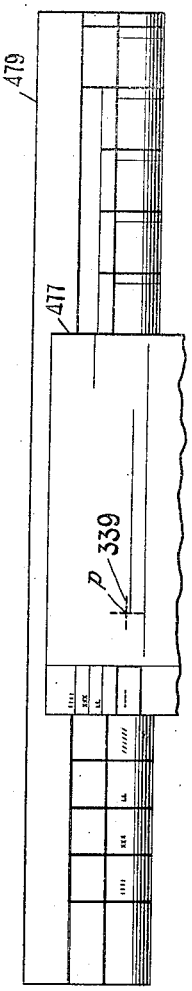

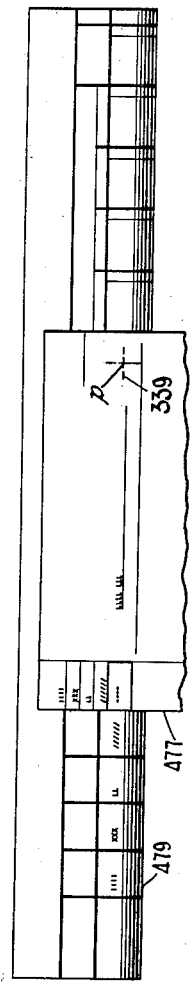
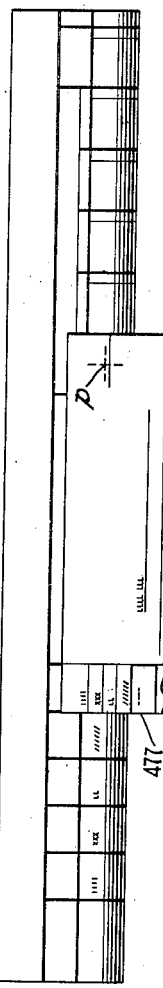
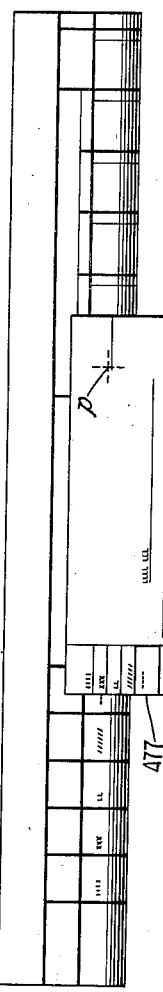
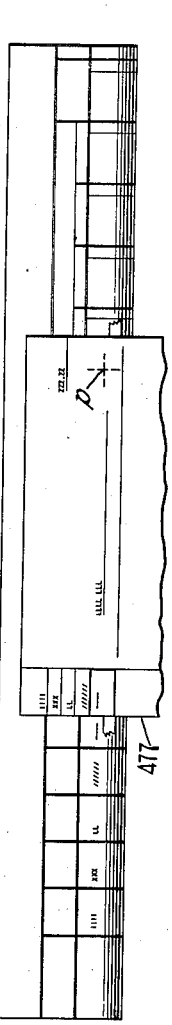
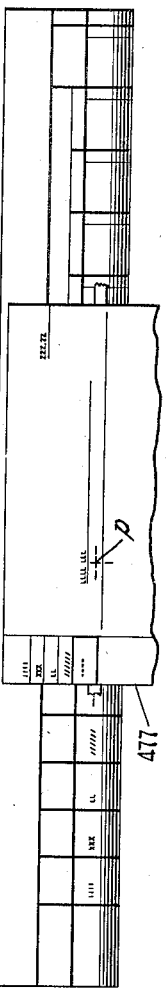

S. H. FARNHAM, A. W. SMITH & J. PHELPS.
TYPE WRITING MACHINE.
APPLICATION FILED JAN. 18, 1913.

1,071,612.

Patented Aug. 26, 1913.
19 SHEETS—SHEET 19.

FIG. 57.

FIG. 58.

WITNESSES:

INVENTORS:
Stephen H. Farnham
Arthur W. Smith
Joseph Phelps
By Jacob Felbel
THEIR ATTORNEY

UNITED STATES PATENT OFFICE.

STEPHEN H. FARNHAM AND ARTHUR W. SMITH, OF NEW YORK, N. Y., AND JOSEPH PHELPS, OF BELLEVILLE, NEW JERSEY, ASSIGNORS, BY MESNE ASSIGNMENTS, TO REMINGTON TYPEWRITER COMPANY, OF ILION, NEW YORK, A CORPORATION OF NEW YORK.

TYPE-WRITING MACHINE.

1,071,612. Specification of Letters Patent. Patented Aug. 26, 1913.

Application filed January 18, 1913. Serial No. 742,786.

*To all whom it may concern:*

Be it known that we, STEPHEN H. FARNHAM, ARTHUR W. SMITH, and JOSEPH PHELPS, citizens of the United States, and residents, respectively, of the borough of Brooklyn, county of Kings, city and State of New York; borough of Manhattan, city, county, and State of New York, and Belleville, county of Essex, and State of New Jersey, have invented certain new and useful Improvements in Type-Writing Machines, of which the following is a specification.

Our invention relates generally to improvements in typewriting machines and its main object is to provide a new and improved typewriting machine which is especially adapted to facilitate certain kinds of typewritten work.

To the above and other ends our invention consists in the features of construction, combinations of devices and arrangements of parts hereinafter described and particularly pointed out in the claims.

The preferred form of our invention herein disclosed was especially designed for use in making out warrants or vouchers and records of the same such as are employed in the financial departments of certain municipalities, and the invention will be explained in detail in connection with such work, but it is clearly to be borne in mind that the invention is not restricted to this particular use but may be employed in connection with other kinds of typewritten work.

In the accompanying drawings, Figure 1 is a fragmentary plan view of our improved typewriting machine, parts being omitted and parts broken away. Figs. 2 and 3 are fragmentary plan views on a larger scale showing respectively the left-hand and right-hand end portions of the carriage of said machine, parts being omitted and parts broken away. Figs. 4 and 5 are fragmentary end views of the upper part of said machine, parts being omitted and parts broken away, Fig. 4 being a view from the left-hand end and Fig. 5 a view from the right-hand end. Figs. 6 and 7 are respectively the front and rear portions of a fore and aft vertical sectional view, the section being taken approximately on a plane indicated by the dotted line z—z in Fig. 1 with the exception of where it passes through the type action and ribbon guiding devices, the sections whereof are shown nearer the middle of the machine. Fig. 8 is a vertical sectional view taken on planes indicated by the broken dotted line y—y in Fig. 7 and looking in the direction of the arrows at said line. Fig. 9 is a fragmentary diagrammatic plan view showing the relationship of the two paper carriages comprised in our machine and the relationship of the tabulating mechanisms associated with said carriages. Figs. 10 and 11 are respectively the left-hand and right-hand portions of a horizontal sectional view taken on planes indicated by the broken dotted line x—x in Figs. 6 and 7 and looking downward. Fig. 12 is a horizontal sectional view of the left-hand ribbon spool and associate parts, said section being taken on a plane indicated by the dotted line w—w in Fig. 6 and looking in the direction of the arrows at said line. Figs. 13 and 14 are respectively a fragmentary plan and a front elevation of part of the tabulating mechanism associated with the sub-carriage or carriage supplemental to the main carriage. Figs. 15 and 16 are respectively a fragmentary plan view and rear elevation of the sub-carriage. Fig. 17 is a transverse sectional view taken on a plane indicated by the dotted line v—v in Fig. 15 and looking in the direction of the arrows at said line, the main carriage also appearing in section in said Fig. 17. Fig. 18 is a substantially vertical sectional view taken on a plane indicated by the dotted line u in Fig. 17 and looking in the direction of the arrow at said line, the view showing the right-hand end portion of the sub-carriage and the paper controlling devices associated with said carriage, some of the parts shown in Fig. 17 being omitted. Fig. 19 is a central vertical sectional view of one of the roller bearing devices for the sub-carriage. Figs. 20 and 21 are respectively a top plan and a front elevation of a cam member for automatically controlling the paper advancing or feeding devices of the sub-carriage. Fig. 22 is a diagrammatic side view of the platen and paper feeding devices of the main and sub-carriages. Fig. 23 is a transverse sectional view taken on a plane indicated by the dotted line t in Fig. 2 and looking in the direction of the arrow at said line, the view showing the side edge gage or guide for the main carriage. Fig. 24 is a sectional view taken on a plane indicated by the dotted line *s—s* in Fig. 23. Fig. 25 is a front face view of the side guide on the sub-carriage. Fig. 26 is a sectional view taken on a plane indicated by the dotted line *r—r* in Fig. 25. Fig. 27 is a fragmentary plan view of the paper end-guide, on the sub-carriage. Fig. 28 is a front view showing detached a spring member in the paper end stop device for the sub-carriage. Fig. 29 is a fragmentary plan view partly in section showing the releasing devices or bars of the sub-carriage tabulating mechanism, and the mounting of said bars. Fig. 30 is an end view of the main carriage showing part of the line spacing or paper advancing mechanism of the sub-carriage. Fig. 31 is a sectional view taken on a plane indicated by the dotted line *q—q* in Fig. 30. Fig. 32 is a horizontal sectional view of the platen line spacing devices, the section being taken on a plane indicated by the dotted line *p—p* in Fig. 35. Figs. 33 and 34 are views corresponding with Fig. 32 but showing the parts in different relationships. Fig. 35 is a vertical sectional view taken on a plane indicated by the broken dotted line *n* in Fig. 32 and looking in the direction of the arrow at said line. Fig. 36 is a detached front view of a cam member shown in Fig. 32 and included in the line spacing mechanism of the platen. Figs. 37 and 38 are fragmentary end views of certain of the line spacing or paper advancing devices for the paper carried by the sub-carriage, the views corresponding to Fig. 5 but the position of the parts being different. Fig. 39 is a sectional view taken on planes indicated by the broken dotted line *m—m* in Fig. 37. Figs. 40, 41 and 42 are fragmentary vertical sectional views corresponding with Figs. 6 and 7 and showing in detail chiefly the shield or cut out mechanism for the paper on the main carriage, the relationship of the parts varying in the different views and the platen being cut away. Fig. 43 is a sectional view taken on the dotted line *l* in Fig. 40. Fig. 44 is a sectional view taken on a plane indicated by the dotted line *k* in Fig. 41. Fig. 45 is a rear elevation of certain of the parts shown in Fig. 40. Fig. 46 is a horizontal sectional view taken on a plane indicated by the dotted line *h* shown in Fig. 45. Figs. 47 to 56 inclusive are diagrammatic face views showing successive steps in the control of the work sheets. Fig. 57 is a fragmentary face view of the work sheet or one of the work sheets carried by the main carriage. Fig. 58 is a face view of the work sheet carried by the sub-carriage.

Referring first to Figs. 1, 4 to 7, 10 and 11, the main frame of our machine as illustrated comprises a rectangular base portion 1 which may be provided with rubber feet 1ª and from which rise two rear corner posts or uprights 2 and two front corner posts 3, while at each side intermediate the front and rear posts are additional or supplemental posts or uprights 4 which are cast integral with the front posts 3, being connected thereto near their tops by a web or cross bar 5. The superstructure of our machine comprising the traveling elements or carriages is of large size and needs an especially firm and rigid support; and to this end the corner posts are specially shaped and secured to the base. Each rear post is formed with angularly disposed extensions or feet 2ª, the ends of which receive screws 6 by which the post is fastened to the base, one of the screws screwing into the side portion of the base and the other into the rear portion 1ᵇ of the base, a washer 7 being interposed between the rear portion of the base and the foot portion 2ª. A broad base for the post is thus obtained and the tendency of the post to tear away from the base during the operation or handling of the machine is minimized. Each front post 2 has an inwardly extending foot portion 3ª which is secured to a cross bar 1ᶜ connecting the sides of the base by a screw 8, a washer 9 being interposed between the head of this screw and the foot 3ª. Each supplemental post 4 is secured to the base by a screw 10, passing upward through the flange of the side frame of the base. The web or cross piece 5 connecting each post 4 with the associate post 3 is U-shaped, the U extending inward toward the middle of the machine. The construction is such that a broad support is provided at each front corner, said support comprising the posts 3 and 4 and the web 5. The top plate which completes the main frame proper comprises three sections or parts, the rear part 11 being suitably secured to the tops of the rear corner posts or uprights and forming a cross connection between them; while the front portion of the top plate comprises two side plates or pieces 12, each of which is secured on top of one of the front posts and its companion supplemental post. Between the rear section of the top plate and the two front sections is a gap or space which affords a passage for part of the carriage mechanism. It will be observed that the main frame comprises two rear uprights or posts comprising angular extensions or foot portions detachably secured to the base as by screws, and a rear top plate connecting the rear posts. Further said main frame includes two upright members each consisting of a pair of vertical portions or posts and an integral connecting portion or web, two additional top plate portions being provided which are supported one on each of said members.

The machine is a front-strike machine and the printing instrumentalities, as appears from Figs. 6 and 7, are secured to an upright segment or support 13 which is suitably fixed to the main frame of the machine. Secured at the front face of the segment 13 are type bar hangers 14 on which are pivoted type bars 15, each type bar being provided with a single type 16 and normally extending forward and being supported by a stationary rest 17. Each type bar is connected to a key lever 18 by connections which comprise a link 19, a lever 20 and a second link 21. The key levers are arranged within the base 1 and extend fore and aft thereof, being pivoted at their rear ends on a fixed fulcrum plate 22 and provided at their front ends with keys or buttons 23. Each key lever has connected to it a restoring spring 24 which is anchored to a stationary support 25. The printing instrumentalities may be of any suitable character but those above described are like the printing instrumentalities of the No. 11 Remington machine except that the type blocks are provided with single types instead of with double types as in said Remington machine.

Our invention contemplates the employment of a plurality of superposed work sheets relatively movable to enable entries or items to be simultaneously reproduced in duplicate in varying relationships with respect to said sheets, as, for example, to enable a vertical column to be written on one sheet while the entries in said column are simultaneously reproduced in a horizontal line or in a plurality of parallel vertical columns on another sheet or sheets. To this end two traveling elements, paper supports or carriages are provided, these carriages being relatively movable and in the present instance one, which may be termed the main carriage, supporting the other, which may be termed the supplementary or sub-carriage. The main carriage or carrier, as appears clearly from Figs. 1 to 8, is a rigid rectangular frame comprising two end plates or bars 26 and 27, a front bar 28 and two rear bars 29 and 30, the bar 29 being arranged above the bar 30. The end bars extend fore and aft of the machine to connect the front and rear bars with which preferably said end bars are cast integral; and said end bars also extend downward to provide supports or bearings for the line spacing, paper feeding and other controlling devices for the work sheets on the two carriages. The bars 28 and 29 are formed along their outer faces with longitudinally extending grooves which coöperate with anti-friction balls 31, said balls being received in stationary grooved track-ways or guide rails 32 and 33. The front track-way 32 is fixed to standards 34, one rising from each of the top plate sections 12 while the rear track-way 33 is fixed to short standards or lugs 35 on the top plate 11. The track-ways extend outward beyond the ends of the main frame, as the carriage is a long one, being adapted to receive a platen 36 long enough to accommodate sheets up to 22" in width. Said platen 36 is mounted on an axle 37 which takes bearings in the end plates 26 and 27 and is provided at its ends with finger wheels 38. The main carriage with its platen 36 is adapted to be moved back and forth along the track-ways 32 and 33, being constantly impelled toward the left by a motor or spring drum 39 pivoted to a bracket or plate 40 depending from the top plate 11, said spring drum being flexibly connected with the main carriage by a band or strap 41. One end of said strap is connected to the spring drum while the other end is detachably connected or hooked over a finger 42 depending from the right-hand one of a pair of brackets 43 which are screwed or otherwise detachably secured to the bar 29. The spring drum projects slightly upward through a slot 44 in the top plate 11 so that the leftward pull exerted on the main carriage through the strap 41 is substantially a straight one.

Leftward movements of the carriage are controlled by letter feeding, detent or escapement devices of suitable construction which comprise (Fig. 7) a toothed feed rack 45 supported on arms 46 pivoted at 47 to the inward ones of pairs of ears 48 rising from and integral with the brackets 43. The rack 45 is normally maintained in spring-pressed engagement with a feed pinion 49 secured at the forward end of a shaft 50 which bears in a bracket 51 stationary on the top plate 11. Operatively connected to the rear end of said shaft are a pair of toothed escapement wheels 52 and 53 with which coöperate a feed dog 54 mounted at the top of a dog rocker 55. Said dog rocker is pivoted at 56 to ears 40ª on the bracket 40 and is operatively connected by a link 57 with a crank arm 58 projecting rearward from a rock shaft 59 which is pivoted at its ends in the sides of the base 1. Near its ends the rock shaft 59 is provided with rearwardly extending crank arms 60 from which depend links 61 supporting a universal bar 62 which underlies the key levers and is operative thereby to cause the escapement devices to permit leftward step-by-step movements of the main carriage. Suitable restoring springs are provided, including one for the universal bar, indicated at 62ª, said spring 62ª being connected at one end to a crank arm 59ª on the rock shaft 59, the other end having a stationary anchorage. Each key lever, it will be understood, actuates the escapement devices and also operates through the described connections to actuate its associate type bar and cause the same to co-act with the front face of the platen. The carriage feeding or escapement devices above described are or may be like those found in the No. 11 Remington machine; and release keys on the carriage operative to lift the rack 45 at will are also preferably employed as in said machine, although not shown herein. Leftward movements of the main carriage are also controllable by tabulating mechanism which is effective to free the carriage from its escapement or detent devices for tabulating runs and, as appears from Figs. 1, 6, 7, 10 and 11, comprises a set of frame stops or denominational levers 63 pivoted on a pivot screw 64 that extends transversely of a frame 65 detachably secured to the main frame. The lower end of each lever 63 is connected to a push rod 66 which extends forward under the key levers and is guided in a detachable guide 67, the front end of each rod being provided with a denominational tabulator key 68. Each rod 66 is connected to a restoring spring 69. The upper ends of the levers 63 are curved forward and extend through a guide plate 70 on the frame 65, the ends 63$^a$ of the curved portions providing denominational stops proper for coöperation with column or carriage tabulator stops 71 which are adjustably mounted on a toothed stop bar 72, the ends of which are shaped to provide pintles 73 that bear in blocks 74 secured to rearwardly extending portions of the brackets 43. A knurled finger piece 75 is provided on the bar 72 near one end for conveniently turning it in its bearing blocks, and spring detents 76 may be employed to coöperate with flat faces on the pintles to retain the stop bar in adjusted positions (Fig. 3).

The construction enables any one of a plurality of variable adjusted series or sets of column stops on the bar 72 to be brought to position for coöperation with the denominational stops 63$^a$ by turning the bar 72 so that the desired series of stops 71 may project rearward toward the denominational stops 63$^a$ and so that said denominational stops may be projected forward into the path of the column or carriage stops 71 by the actuation of the associate keys 68. Connections are also provided operative by the keys 68 for releasing the main carriage concurrently with the forward projection of any stop 63$^a$. Said connections comprise a U-shaped bar or bail 77 secured to a rock shaft 78 pivoted in the sides of the base and provided with ears 77$^a$ which are connected through links or rods 79 with crank arms 80 extending downward from a rock shaft 81. Fixed to said rock shaft is an angular arm or frame 82 which is connected by a link 83 with a releasing lever 84 pivoted at 85 to a bracket 86 on the top plate 11, the forward end portion of said lever underlying the feed rack 45. To transmit the motion from the tabulator keys 68 to the release lever 84 a strap or cross bar 87 is provided arranged behind and transversely of the lower end portions of the levers 63, the ends of the bar 87 being folded over the links 79 and clamped adjustably thereto by screws 88.

In operation any lever 63, as it swings on its pivot, will contact at its lower end with the cross bar 87, forcing said bar rearward against the pull of a spring 89 secured at one end to a fixed pin 90 and at its opposite end to an arm 91 depending from the rock shaft 81. The rearward movement of the bar 87 will be transmitted through the links 79 and arms 80 to the rock shaft 81 which will be rocked to cause the arm 82 to lower the link 83 and swing the lever 84 so that its forward end will lift the rack 45 from the feed pinion 49, thus freeing the carriage so that it may run continuously leftward under the pull of the spring drum 39 until arrested by the contact of the proximate column stop 71 with the projected denominational stop 63$^a$.

Part of the releasing devices above described, including the cross bar 87 directly operative by the levers 63, are novel. Furthermore the rotatable construction of the stop bar 72 is a feature not usually provided, although of known construction. The remainder of the tabulating mechanism for the main carriage as illustrated, however, is found in the No. 11 Remington machine although it is to be understood that any other suitable tabulating mechanism may be employed. It will be observed that the novel releasing devices comprise a cross bar or universal bar 87 directly engageable and operative by the tabulator levers 63; that said universal bar is supported on parallel links 79 which connect a pair of rocking frames, one frame comprising the bail 77 and the other frame comprising the rock shaft 81 and crank arms 80; and that one of these rocking frames, that is, the last named, is connected to the releasing lever 84 by devices comprising the link 83 and the arm 82.

In order to control, guide and feed or advance the sheet or sheets on the main carriage and around the platen 36, devices are provided which, as illustrated in Figs. 1 to 4 and 7, comprise main feed roller sections 92 coöperative directly with the lower rear side of the platen 36. In the present case two separate sections 92 are shown as constituting the main feed roller, each section being provided with a shaft 93 which bears in arms 94 supported on a rock shaft 95 that bears near its ends in the ears 48 of the brackets 43. The arms 94 are not secured directly to the rock shaft 95 but each is associated with an arm 96 which is fixed to said rock shaft, the arms 96 being provided with set screws 97 having pointed ends which engage in a V-groove 98 extending longitudinally of said rock shaft. Each arm 96 is contiguous to its associate arm 94 and is held in fixed relationship therewith by a headed screw 99 and a coöperating locking nut 100. The screw is provided with an eccentric shoulder which passes loosely through a hole in the arm 94 while its shank passes freely through an opening in the arm 96, the head of said screw being maintained in clamping engagement with the arm 94 by the locking nut 100. It will be understood that the relationship between the arm 96 and the rock shaft 95 is predetermined by reason of the set screw and groove connection 97, 98 between the parts, while the connection of the arms 94 through the screws 99 permits of a slight variation in the location of said arms sufficient to afford accurate adjustment of the feed roll sections 92 with respect to the platen. The feed roll sections are pressed constantly toward the platen by springs 101, said springs being coiled around the rock shaft 95 and one being arranged between each pair of ears 48. One end of each spring is anchored to one of the associate ears 48 while the other end is secured in an adjustable sleeve 102 which is provided with ratchet teeth that coöperate with similar ratchet teeth on a collar 103 fixed to the shaft 95. The construction is such that by turning the sleeve 102 the tension of the spring may be varied as desired and will after adjustment be transmitted through the associate sleeve 102 and collar 103 to the rock shaft 95 and thence to the main feed roller. In order to release the feed roller, the left-hand collar 103 is provided with a forwardly extending arm 104 which terminates in a finger piece or release key 105 depressible to overcome the springs 101 and throw the feed roller sections 92 off or away from the platen. Arranged in an inclined position at the rear of the platen 36 is a paper apron or deflector 106 which is screwed or otherwise secured to blocks 107 pivoted loosely on the rock shaft 95 and one or more of which may be confined between collars 108 fixed to said shaft. The deflector 106 is provided with slots 109 through which the roller sections 92 protrude to coöperate with the platen and said deflector is constantly pressed toward the platen by leaf springs 110 having ears 111 secured by screws 112 to the outermost arms 96. Arranged at the left end of the deflector and suitably secured thereto as by soldering is a marginal portion or guide finger 113 which curves forward and upward around the platen and terminates above the same. This finger may be formed integrally with the deflector 106 and may be duplicated at the right side thereof if desired. Arranged above the movable deflector 106 so as to form therewith a practically continuous means or guiding surface and support for the paper on the main platen is a paper table or guide plate 114 which curves upward and rearward, being extended far enough back to prevent the paper which may overhang at the rear from being obstructed by the tabulating mechanism during endwise movements of the main carriage.

Four brackets are provided for supporting the paper table 114 rigidly on the main carriage. The two outermost brackets each comprise a post or plate-like portion 115 and upwardly extending arms 116 terminating in inwardly bent ears 116ª. The plate-like portion 115 of each bracket is secured by screws 117 to the brackets 43 while the ears 116ª receive screws 118 by which the paper table 114 is fastened near its outer ends to the outer brackets. The two inner brackets 119 are secured by screws 120 to the carriage bar 29 and comprise upstanding arms 121 to which the paper table is fastened by screws 122. Integral with the arms 121 and projecting horizontally rearward are extensions or arms 123 which are slotted as indicated at 123ª to engage with reduced portions 72ª of the stop bar 72. Thus the brackets 119, 121, 123 provide intermediate supports both for the paper table and for the stop bar 72. A side gage or guide for the sheet or sheets on the main carriage is also provided, said side guide, as fully shown in Figs. 2, 23 and 24, being mounted on a grooved track-way 124 suitably secured to the left-hand side of the paper table 114 near its lower edge. Said track-way extends horizontally along the paper table and receives a slide 125 to which is suitably secured as by rivets 125ª a spring plate 126, the upper and lower end portions whereof respectively coöperate frictionally with the paper table 114 and deflector 106 so as to maintain the slide in adjusted positions along the track-way 124. Suitably secured to the slide 125 as by being screwed at 125ᵇ to an ear 125ᶜ on said slide is an upstanding side guide proper or abutment 127. A lateral pin 128 on this abutment or gage plate 127 is adapted to coöperate with the arm 104 to prevent the slide from being detached at the left from its guide-way 124. The friction plate or device 126 is of very thin flexible sheet metal and while it overlies or covers the guide-way 124 and the slide 125, its upper and lower portions incline down toward the paper table and paper deflector and closely hug these parts so that when paper, and particularly that having key-hole slots or punches at its edge, is introduced into the machine over the paper table 114 its edges will not be obstructed by the projecting upper edge or face of the part 124 but will be guided over the same by the inclined upper portion of the friction plate. Thus the friction plate not only serves to hold the side gage 127 securely in adjusted positions along the guide-way but also serves in itself as a paper guide to facilitate the handling of the paper or work sheets. It will be observed that the feed rollers 92 are mounted on arms or hangers 94 which while themselves loose on the rock shaft 95 are adjustably secured to other arms 96, said arms 96 being so connected to the rock shaft 95 that their relationship circumferentially thereof is fixed, while at the same time they may be variably adjusted lengthwise of said rock shaft. The main or body portion of the deflector 106, it will be seen, terminates below the printing line at the front face of the platen while the marginal portion 113 of said deflector extends upward across the printing line and is adapted to guide the paper back over the platen. The brackets 115, 116 while shown separate from the brackets 43 may be integral therewith, of course, and these bracket members constitute at each end of the carriage a bracket device which provides an end support for the rock shaft 95, for the paper table 114 and for the stop bar 72, while the right-hand bracket device further provides a connection through the strap 41 to the carriage.

To coöperate above the printing line with the sheet or sheets fed around the platen 36, a pressure device is preferably employed of the general character sometimes provided with the Remington machine. Said pressure device is illustrated clearly in Figs. 1, 2, 3, 6 and 40 to 42 and is in the form of a spring mounted bail comprising a rod or shaft 129 arranged above and extending lengthwise of the platen and having mounted on it a plurality of pressure rollers 130. The ends of the rod 129 are mounted in arms 131 which extend normally horizontally forward and are provided at their front ends with holes which fit over the squared ends 132 of a rod or shaft 133, being secured in place by headed screws 134. The shaft 133 bears in vertical plates 135 which are secured to the ends of a scale plate or bar 136 which in turn is secured to the top of a toothed margin stop bar 137 fixed on the carriage bar 28. Leaf springs 138 secured by screws 139 to the carriage bar 28 are coiled at their free ends and coöperate with noses 131$^a$ formed at the front ends of the arms 131. The springs normally exert a pressure on said arms to maintain the rolls 130 in coöperation with the platen or the paper thereon but when the bail or member comprising the rod 129 and arms 131 is swung upward and forward to released position, said springs will operate as detents to hold the bail released until it is again restored to working position.

Adjustably mounted in coöperation with the bars 136 and 137 are margin stop devices 140 and 141 which are adapted to coöperate with a frame stop 142 (Figs. 1 and 6) pivoted at 143 to the fixed rail 32 and normally maintained in the path of the margin stops by a spring (not shown) but releasable by a finger piece 142$^a$. The margin stop devices may be of any suitable character but those illustrated are such as are found in the Remington machine except that the frame stop 142 instead of being yieldable slightly on its support toward the left as in said machine is, in the present instance, yieldable toward the right. Further, said frame stop is provided with a pointer 142$^b$ which extends rearward and coöperates with the scale on the scale bar 136.

In connection with the class of work for which the present form of our invention is particularly designed it is desirable to employ adding mechanism and to this end our machine is preferably equipped with the adding devices commonly known as the Wahl adding attachment and comprising, as shown in Fig. 1, a toothed support 144 connected to the end bars 26 and 27 of the main carriage by arms 145 and having a fixed guide 146. Adjustably mounted on the support 144 are a plurality of totalizers or adding heads 147 which are adapted to coöperate successively with a non-traveling actuator 148 adapted to be operated by the numeral keys of the machine as is usual.

In order to control the line space advance of the sheet or sheets on the platen 36, line spacing devices are provided which, as illustrated in Figs. 3, 5, 7, 8 and 32 to 36 comprise a line spacing ratchet wheel 149 contiguous to the right-hand end of the platen and provided with a hub 150 secured to the platen axle. Said ratchet wheel has both peripheral and crown teeth, and coöperative with the peripheral teeth is a roller detent 151 mounted on a spring arm 152 secured by a screw 153 to the carriage bar 30. Said detent operates to maintain the platen 36 in predetermined line space positions. To advance the platen step-by-step through line space distances hand controlled pawl devices are provided comprising an upright shaft 154 which bears near its upper end in a lateral ear 27$^a$ on the right-hand carriage end bar 27, the lower end of said shaft bearing in an angular bracket 155 secured to said end bar. The upper end of the shaft is reduced and has pinned to it a line space lever or handle 156 which prevents the shaft from dropping out of its bearings, while a member or crank arm 157 fixed by a set screw 158 to the lower end portion of the shaft which projects below the bracket 155 prevents upward displacement of said shaft. The shaft 154 is under constant tension from a spring 159 coiled around its upper portion. One end of said spring is anchored to the ear 27ª while the other end is secured in an adjustable sleeve 160, the lower face of which is formed with ratchet teeth that coöperate with corresponding ratchet teeth on a collar 161 fast on said shaft. The spring 159 tends constantly to turn the shaft in the direction of the arrow in Fig. 32. Rigid on the collar 161 is an actuator or arm 162, the free end of which is rounded and engages in a slot 163 in a pawl 164, said pawl extending forward and terminating in a tooth which operatively engages during forward movements with the crown teeth of the ratchet wheel 149 at a point under the platen axle. Said pawl is pivoted at 165 on an arm or carrier 166 which is provided with a hub or sleeve 167 that bears loosely on the shaft 154, being confined between the collar 161 and a collar 168 pinned to said shaft below said hub.

The arm 166 and actuator 162 extend inward through a slot 169 in the end bar 27 and at substantially right angles to the line space lever 156 which extends forward outside said end bar. A spring 170 coiled around the hub 167 engages at one end with the outer face of the end bar 27 while its other end is connected to a pin 171 projecting downward from the arm 166. The spring tends constantly to turn said arm rearward and normally maintains it engaged with an adjustable screw stop 172 supported on the end bar 27 as shown in Figs. 5 and 32. The spring 159 normally maintains the actuator 162 engaged with an upstanding stop pin 173 on the arm 166 and so positions the pawl normally (Fig. 32) that it is out of the path of the ratchet wheel 149. This stop pin 173 may be the continuation above the arm 166 of the pin 171.

In operation an initial rightward movement of the hand lever 156 overcomes the spring 159, turns the shaft 154 and causes the actuator 162 to turn the pawl 164 on its pivot 165, with the result that the pawl tooth engages with the ratchet wheel 149 as shown in Fig. 33. This initial operation, it will be observed, does not affect the arm 166 which remains in normal position. However, since now the pawl 164 can no longer turn freely on its pivot, any further forward swinging movement of the actuator 162 will be transmitted to the arm 166 which will swing forward. Consequently the pawl will be forced to advance forward bodily and will bodily turn the ratchet wheel 149 and the platen 36 connected thereto. The turning or line space advance of the platen will continue until the pawl engages with a screw stop 174 on the end bar 27 which coöperates with the pawl to jam it into the ratchet wheel and prevent overthrow (Fig. 34). The parts are adjusted so that the advance or turning thus communicated to the platen is equal to two units of line space distance. On releasing the lever 156 the parts will be restored to the normal position (Fig. 32). In addition to these line spacing devices, provision is made for turning the platen 36 automatically during leftward movements of the main carriage by means which comprise a roller 175 pivoted on a shouldered screw 176 secured near the free end of the crank arm 157. Said roller is adapted to coöperate with a cam 177 carried by a slide 178 mounted adjustably on a toothed bar 179 secured to lugs 4ª on the posts 4, the bar 179 extending transversely of the machine and to some distance beyond said lugs as shown in Fig. 8. The upper edge of the bar 179 is formed at letter space intervals with teeth 180 and these teeth coöperate with a tooth 181 on the slide or cam member 178. The slide is formed with lips or troughs at its top and bottom so that it partly embraces the bar 179 and cannot be detached therefrom except by being slid off it endwise. The tooth 181 is maintained in engagement with the teeth 180 by a bowed spring 182 carried by the slide and coöperative with the bottom face of said bar 179. The construction is such that by pressing upward against the slide its spring may be overcome and its tooth disengaged and it may then be slid to desired positions along the bar so as to vary the location of the cam and its consequent co-action with the roll 175. A scale on the bar 179 is preferably provided to facilitate adjustment of the parts carried thereby. When during leftward movements of the carriage the roll 175 contacts with the cam 177 it will ride up said cam until arrested by a dwell or stop portion 177ª in which the left end of the cam terminates. As a consequence the crank arm 157 carrying the roll will swing on its axis and the shaft 154 will be forced to turn counter to its spring 159, and the pawl 164 will engage with the ratchet wheel 149 to turn the platen as when the handle 156 is operated. The parts are proportioned so that when the pawl is jammed into the ratchet wheel by the stop 174 to arrest the parts the roll 175 will be in engagement with the stop 177ª and since the roll can no longer swing about the shaft 154 it will act in coöperation with the end or part 177ª as a stop to limit the leftward movement of the main carriage. Preferably the arm 157 is releasably connected with the shaft 154 so that the roller 175 may be rendered inoperative if desired.

As has been stated the writing in duplicate on superposed or overlying work sheets and in a special arrangement of the entries is made possible and facilitated by supporting the work sheets on relatively movable paper carriers, holders or carriages, these carriages traveling in parallel paths. The main carriage on which one of the sheets or several manifold sheets is or are supported has been described as have the associate paper controlling devices. The supplemental or sub-carriage, together with its associate devices for controlling another sheet, will now be described and explained. The sub-carriage is mounted on and supported by the main carriage and is adapted to be moved with the main carriage without the relationship between the two carriages being altered or varied. The sub-carriage is also adapted to be moved independently of the main carriage, a motor being provided to move the sub-carriage in the opposite direction from that in which the main carriage is moved by its motor, and controlling devices being also provided to allow such movement of the sub-carriage to take place at will. The sub-carriage is considerably shorter than the main carriage and in the present instance is intended to support work sheets much narrower than those on the main carriage.

As will be seen from Figs. 7 and 15 to 17, the sub-carriage is composed primarily of a base plate or body portion 183 having integral upturned end portions or ears 183$^a$. The base plate 183 underlies the cross bar 30 of the main carriage and is adapted to be supported and suspended from a groove 184 extending along the under side of said bar by roller bearing devices shown in detail in Fig. 19. There are three of these roller devices one near each end of the plate 183 and one about midway between the end devices. Each of said roller devices comprises a horizontally arranged roller or wheel 185 having a rounded periphery and formed with an internal V-groove or ball race receiving a set of balls 186 which coöperate also with the coned head 187 of a screw 188. Said screw passes downward through a hole 189 in the base plate 183 and is adjustably held or clamped in fixed relationship with said plate by nuts 190 and 191 at opposite sides thereof. The under nut 191 may be an ordinary hexagonal nut but the upper nut 190 is coned at its upper side as indicated at 190$^a$, the coned portion coöperating with the head 187 of the screw to provide a two-part inner bearing or ball race for the balls 186. It will be understood that the screw 187, 188 may be so adjusted by means of the nuts as properly to adjust the height of the roller 185 and also the ball bearings of said roller. The opposite side faces of the groove or slot 184 are formed with V-grooves to receive the rollers 185, which while adapted to run freely along the track-way or bar 30 are at the same time held from dropping downward. The middle roller or wheel is arranged slightly forward of the two end wheels as shown, and coöperates with the forward V-groove in the slot 194, while the end wheels coöperate with the rear V-groove, thus providing for a three-point bearing for the sub-carriage. The construction provides a support by and from which the sub-carriage is suspended beneath the main carriage but is prevented from becoming detached accidentally therefrom. At its rear side the base bar or plate 183 is provided with a downwardly bent slotted lug 192 over which is hooked one end of a flexible cord or strap 193 (Figs. 3, 5 and 9) which extends rightward from said lug and around the under side of a motor or spring drum 194 to which its opposite end is secured. Said spring drum is of smaller size than the main spring drum and may be of any suitable construction, being pivoted at 195 on a bracket or arm 196 which extends rightward from the end bar 27 of the main carriage and is secured to the rear side thereof by a screw 197. The screw 172 may assist the screw 197 to hold the bracket 196, while an ear 196$^a$ turned forward from the bracket coöperates with the side of the end bar 27 to increase the rigidity of the connection. To hold the sub-carriage against the pull of its motor 194 and set in proper relationship with the main carriage, detent devices are provided comprising a rack bar 198 having ratchet teeth along its under side, which bar is secured by screws 199 to the rear side of the main carriage bar 30. Coöperative with the teeth of this rack bar is a detent or pawl member 200 pivoted at 201 to a lug 202 extending downward from the plate 183 at its rear side. The right-hand arm of the member 200 terminates in a tooth 203 which is normally maintained engaged with the rack 198 by a leaf spring 204 screwed to the under side of the plate 183 and coöperating at its free end with a pin 205 on the pawl member, which member is controlled at its opposite arm by devices hereinafter described to release the tooth 203 from the rack and permit the sub-carriage to be drawn rightward by its motor independently of the main carriage. With the pawl and rack engaged, however, as in Fig. 16, it will be understood that the sub-carriage will move back and forth with and on the main carriage without any variation in their relationship. The rack 198 and the associate pawl member 200 constitute means or detent devices which maintain the two traveling elements or carriages in set relationship, said devices being disconnectible to permit the motor or drum 194 and its strap 193 to become effective, said drum and strap constituting a flexible connection which is constantly tending to vary the set relationship between the carriages.

The sub-carriage is adapted to carry a work sheet which while movable independently of the main carriage and its platen is nevertheless guided upward at the front of said platen and over the sheets fed around the same and so as to receive type impressions against the front printing face of the platen. To this end as will be understood from Figs. 7, 16 and 17 the carriage plate 183 is formed along its front edge with downwardly and rearwardly inclined lugs or fingers 206 to which is screwed at 207 or otherwise rigidly secured a combined paper support and receptacle 208. Said support or guide is preferably of light sheet metal and beginning at a point slightly above and forward of the plate 183 curves downward and rearward, its lower portion being bent or curved forward and upward, forming a paper basket or receptacle. The details of the paper support or basket 208 and its appurtenances will be understood from the figures last noted and also from Figs. 8 and 25 to 28. Suitably secured to the front side of the basket at about its middle is a flexible finger 209 which extends over the top of the lower or basket portion and has a frictional contact with the inner face of the basket, its purpose being properly to direct the paper downward into the same and to hold it lightly against said face. The basket is provided with a side guide 210 for the paper at its left-hand side, said guide being provided with a laterally extending ear 211 having an elongated slot 212 which receives a thumb screw 213, the latter screwing into a threaded boss 214 fixed to the basket. By loosening the thumb screw the side guide 210 may be adjusted inward or outward in accordance with the width of the paper. An end stop device is also mounted on the paper guide or basket 208. The end stop or gage proper is a squared rod or bar 215 which is arranged within the basket and transversely thereof, being movably mounted on a carrier or bail 216 of spring metal, the tendency of the bail being to bow upward (Fig. 28). The bail is arranged outside the basket and its upturned ends or ears 216ª are formed with holes which receive screw pintles 217 projecting from the ends of the bar 215. Arranged within the basket forward of the bar is a roller 218 provided with a rubber sheath 219, the ends of the roller being reduced as indicated at 220 and bearing in openings in the ears 216ª. Outside the left ear the reduced end has secured to it a knurled finger button 221. Just inside of each ear the ends 220 have secured to them small toothed wheels, gears or sprockets 222. These wheels are rotatably adjustable relatively to each other, and to this end one at least is set to its part 220 by a set screw 220ª. The teeth of the sprocket 222 are adapted to coöperate with rack devices or series of holes 223. There are two sets or series of holes 223, one for each sprocket, said holes being punched or otherwise formed in the basket 208 near its edges. By turning the finger button 221 the sprockets are turned together and will coöperate with the holes 223 to effect a positive feed or advance of the carrier or bail 216 and the end stop 215, the construction providing a positively operating rack and gear connection with its support at each end of the end stop device. The feed of each end of the stop device will therefore be equal and skewing of the stop bar 215 is prevented. The stop device will be held in adjusted positions chiefly by the friction between the body of the bail 216 and the face of the basket. The rubber roller 218, 219 facilitates ease, smoothness and silence in the adjusting operation. The paper, it will be understood, is introduced into the basket and between it and the spring finger 209 and is adjusted against the side gage 210, being pressed downward into the basket until arrested by the stop bar 215 which will not only give the proper initial location endwise but will also square or true the sheet. Above the basket 208 additional paper guiding and controlling devices for the paper on the sub-carriage are provided, as shown in Figs. 7, 8, 15 to 17. Said devices comprise a deflector or guide plate 224 which is inclined forward at about the same angle as the upper part of the basket 208 and extends slightly below and forward of the upper edge portion of the same. Said guide plate is secured at its ends to fingers 225 which are fixed by screws 226 to arms 227, said arms being secured by set screws 228 to a sleeve or hollow rock shaft 229. Fixed in the ends of said shaft 229 are bearing plugs or bushings 230 which project beyond the ends of the shaft and bear in openings in angular plates 231 which are secured to the under side of the sub-carriage base plate 183 and extend downward vertically in the same planes as the end portions 183ª. The arms 227 also provide bearings for a shaft 232 which carries two feed roller sections 233 that are adapted to project rearward through slots 234 in the deflector 224. Between the sections 233 is a gap and in this gap is received a shaft-supporting finger or member 235 which is bent around the shaft 229 and clamped adjustably thereagainst by a clamping screw 236. The free end of the finger engages with the shaft 232 and supports the same between its ends.

The sections 233 constitute a secondary feed roller which coöperates with a main feed roller located behind the deflector 224. Said main feed roller comprises a metal tube or sleeve 237 provided with a sheath 238 of rubber or the like. Fixed in each end of the tube 237 by a screw 239 is a flanged bushing 240, the flanged end whereof is outside the tube and abuts against the associate end portion or bar 183ᵃ of the sub-carriage. Extending through the bushings 240 and secured in place by the screws 239 are inner bushings 241 and 242. The left-hand bushing 241 has a plain flange outside the associate end bar 183ᵃ but the right-hand bushing 242 is formed outside its end bar with a ratchet wheel 243 with which coöperates a roller detent 244 mounted at the free end of a spring arm 245 secured by a screw 246 to the under side of the right-hand one of a pair of lugs 183ᵇ integral with and projecting rearward from the base plate 183. The detent devices 243 and 244 coöperate to maintain the main feed roller 237, 238 in adjusted positions and thus control the feeding movements of the paper which passes between the main feed roller and the secondary feed roller 233. These feed rollers are maintained in spring pressed relationship by draw springs 247, one at each end of the sub-carriage, the rear ends of said springs being anchored to lugs 183ᶜ on the base plate 183 and their forward ends being hooked over pins 248 projecting laterally from the arms 227. These springs tend constantly to turn the rocking frame consisting of the shaft 229, arms 227 and fingers 225, toward the rear and maintain the feed roller 233 pressed against the main feed roller; while the deflector 224 which is also mounted on said rocking frame is held in the normal position shown in Fig. 17 with its upper edge contiguous to the platen 36 below the printing line thereon. The rocking frame is adapted to be swung forward to separate the feed roller 233 from the feed roller 238 and to provide a gap, throat or space between the upper end of the plate 224 and the lower front face of the platen 36 as indicated by dotted lines in Fig. 17. This throwing off of the deflector and the feed roller is accomplished automatically during traveling movements of the main carriage and sub-carriage by devices comprising an arm 249 which is fixed to the shaft or sleeve 229 near its right-hand end by a set screw 250. The arm 249 extends downward, being off-set somewhat to the rear and carries at its lower end a roller 251 which bears on a headed shouldered screw 252 secured in said arm. The roller 251 is adapted to coöperate with a cam member which comprises, as shown clearly in Figs. 20 and 21, a double ended cam 253 fixed to a slide 254 that is similar in construction to the slide 178 and is mounted adjustably on the bar 179 to the left of said slide 178 (Fig. 8). The slide 254 is provided at its top and bottom with forwardly overhanging lips or trough-like portions which embrace the upper and lower edge portions of the bar 179. Said slide is further provided at its top with a tooth 255 which is maintained in engagement with the teeth 180 of the bar 179 by a bowed spring 256 carried by said slide. The cam 253 is in a higher plane than is the cam 177 so that the roller 251 is not low enough to be interfered with by said cam 179 during endwise movements of the carriages. When during leftward movement of the carriages the roller 251 engages with the right-hand inclined or cam edge of the cam 253, said roller will be forced rearward on to the straight portion 253ᵃ and will rock the shaft 229, swinging the feed roller 233 and the deflector 224 forward as described, thus providing a gap or throat into which the sub-carriage work sheet may readily be introduced downward into the basket 208 or may be withdrawn for the substitution of a fresh work sheet. The front of the deflector plate 224 along its upper edge is preferably provided with a scale as shown to coöperate with the paper on the sub-carriage below the printing line. When the roller 251 passes out of the control of its associate cam, the springs 247 will restore the rocking frame to normal or operative position, closing the throat and clamping the paper. Even should the carriages be moved far enough to carry the roller 251 to the left of the cam member their return movement will not be obstructed for the reason that the roller will ride up over the left-hand end of the double cam 253 and thus permit an unobstructed rightward movement of the carriages. Means are also provided operated by a key on the main carriage for controlling the rocking frame to open and close the throat; that is, to swing the deflector 224 away from and toward the platen and also separate and reëngage the sub-carriage feed rollers. Said means, as will be understood from Figs. 4, 8, 17 and 18, comprise a squared shaft 257 which extends through the hollow shaft 229 and bears at its ends in the end bars 26 and 27 of the main carriage. The shaft 257 extends loosely through the shaft 229 so as not to obstruct or interfere with the same during the traveling movements of the sub-carriage; but the two shafts are connected so that rotary movement communicated to the shaft 257 will be transmitted to the shaft 229 whatever the endwise relationship between said shafts may be at the time. To this end one or both of the bushings or plugs 230 are preferably bored out or formed with depressions 258, leaving an end portion or bottom 259 which is formed with a squared hole or opening slightly larger than the shaft 257 which passes through the said squared opening, the parts 257 and 230 having a sliding fit.

Arranged outside the end bar 26 of the main carriage is a lever or arm 260 provided with a hub 261 that fits over the projecting cylindrical end portion of the shaft 257 and is secured thereto by a set screw 262. The lever 260 extends upward and is off-set to the rear, terminating in a lateral off-set or finger piece 263. A collar 264 fixed to the shaft 257 just to the right of the end bar 26 coöperates with said end bar to prevent endwise displacement of said shaft toward the left. It will be understood that by pressing the key 263 forward the shaft 257 will be rocked and this motion will be transmitted through the connecting device or bushing 230 to the rocking frame, carrying the deflector 224 and fed roller 233, causing them to be thrown off whatever the position of the sub-carriage with relation to the main carriage may be at the time. Means are also provided operative from the main carriage for turning the feed roller 237, 238 to advance or retract at will the work sheet or sheets carried by the sub-carriage. Said means as illustrated in Figs. 3, 5, 8, 16 and 37 to 39 comprise a squared shaft 265 which passes through said feed roller and bears in the end bars 26 and 27 of the main carriage. The shaft passes loosely through the bore of the bushing 241 but is adapted to transmit motion to the feed roller through the bushing 242 which has a depression 266 slightly larger in diameter than the greatest cross dimension of said shaft. Said depression, however, extends only part way through the bushing, leaving a bottom or web 267 which is formed with a squared hole of slightly greater dimensions than the shaft 265 so that while the bushing may slide freely along the shaft 265 during endwise movements of the sub-carriage on the main carriage, yet in any of its positions rotary motion communicated to the shaft 265 will be transmitted through the bushing 242 to the feed or pressure roller 237, 238, causing it to turn and advance or retract the paper in coöperation with the feed or pressure roller 233. The right-hand end portion of the shaft 265 projects some distance beyond the end bar 27 and is provided with a knurled finger wheel 268 by which the feed roller 237, 238 may be turned back and forth for feeding or adjusting purposes. Arranged on the shaft 265 just outside the end plate 27 is a line spacing ratchet wheel 269 provided with a hub 270 which receives a set screw 271 by which the ratchet wheel is fixed to the shaft. Coöperative with said ratchet wheel is a pawl-carrying member or lever 272 provided with two pawl teeth 273 and 274 and with a stop lug or finger 275. Said pawl member is pivoted at 276 on an arm or lever 277 pivoted on a shouldered screw 278 secured in the end bar 27. The arm 277 is provided with a restoring spring 279, having one of its ends hooked over a pin 280 on said arm and its other end anchored to a pin 281 on the end plate 27. A washer 278ª is arranged on the shouldered screw 278 between the arm 277 and the spring 279, said spring coöperating with said washer to prevent lateral displacement of the arm 277 rightward away from the end plate 27. Forward of its pivot 276 the lever 272 is connected to the lower end of a link 282 which extends upward and is connected at its upper end to a crank arm 283 fixed by a clamping nut 284 to the reduced rear end 285 of a rock shaft 286 that extends horizontally forward above the end bar 27 and terminates in a handle or finger piece 287 which extends angularly downward forward of the entire carriage structure and of the top plate. The rock shaft 286 bears at its rear end in a bracket 288 secured to the end bar 27 and also bears in a housing 289 secured to said end bar near its front end. The housing is bored out at 290 to receive a coiled spring 291, one end of which is anchored to the housing and the other end to a collar 292 rigid on the rock shaft and bearing in the housing at the forward end of the depression 290. The springs 291 and 279 tend to maintain the line spacing devices thus described in the normal positions shown in Fig. 5. By swinging the line spacing handle or lever 287 toward the right the shaft 286 is rocked and the crank arm 283 swung upward, said crank arm acting on the link 282 to swing the lever 272 on its pivot 276 independently of the arm 277 to the position indicated in Fig. 37. This movement brings the finger 275 into engagement with the pin 280 and also swings the pawl tooth 273 into engagement with the ratchet wheel 269. During further turning of the lever 287 the upward pull of the link 282 will be transmitted through the lever 272 to the arm or lever 277, causing the latter to swing upward on its pivot 278, bodily moving the lever 272 whose relationship with its support will not vary during the upward swing thereof. As a result the pawl tooth 273 will coöperate with the ratchet 269 to turn the feed roller 237, 238 a unit distance as regulated by its detent devices, and succeeding this movement the pawl tooth 274 which will now be in engagement with the ratchet wheel will, during a continuance of the upward swing of the parts, turn the ratchet wheel through another unit distance, the parts being arrested and the line spacing movement determined by the engagement of the finger 275 with the ratchet wheel as illustrated in Fig. 38. Thus an operation of the line space lever 287 communicates a line spacing movement equal to two units to the paper on the sub-carriage. It will also be understood that said lever 287 is operative to retract the main carriage and with it the sub-carriage toward the right at will, so that said lever performs the double function of communicating progressive step-by-step line space movements to the paper on the sub-carriage and of retracting both carriages concurrently at each of such line spacing operations.

On releasing the handle 287 the line spacing devices are restored to normal position as described, and it will be seen that at this time the pawl teeth 273 and 274 are disconnected from the ratchet wheel 269, leaving the shaft 265 free to be turned by the finger button 268. Line spacing or paper feeding devices are also associated with the left-hand end of the squared shaft 265 as illustrated in Figs. 2, 4, 30 and 31. Said devices comprise a pinion 293 arranged on that portion of the shaft 265 which projects leftward beyond the end bar 26, said pinion being contiguous to the outer face of said end bar and being provided with a hub 294 which receives a set screw 295 by which the pinion is fixed to the shaft 265. The pinion 293 meshes with a larger pinion or gear wheel 296 which is rotatably mounted on a shouldered screw 297 projecting laterally from the end bar 26, the head of said screw being provided with the usual nick or slot 298. The gear 296 has a hub portion 299 which bears on the shouldered screw and abuts against the head thereof. Mounted on said hub is a ratchet wheel 300 and a collar 301 which is provided with a series of squared peripheral teeth 302. The ratchet wheel 300 and collar 301 are driven on the hub 299 and are secured in fixed relationship to the gear wheel 296 by one or more pins 303. Engaging in a tapped opening 304 in the screw 297 is a headed shouldered screw 305 and arranged thereon between its head and the head of the screw 297 is a pawl carrier or lever 306, the shouldered portion of said screw 305 providing a pivotal bearing for said carrier 306. Above its pivot 305 the carrier 306 is broadened out and its top surface is formed in a curve 307 concentric with its pivotal axis and terminating at its ends in recesses or depressions 308 beyond which are stop lugs 309. The depressions 308 and the curved surface 307 are adapted to coöperate with a roller detent 310 mounted on a spring arm 311 which extends upward and is provided with a lateral off-set which receives a headed screw 312 by which the spring arm is secured to the end bar 26. A strengthening washer or plate 313 may be arranged between the head of the screw 312 and the top portion of the arm 311. The carrier 306 provides a support for a double pawl member or device 314 which carries a pivot device or headed shouldered screw 315, the shouldered portion whereof engages in a bearing opening formed in the stem of the carrier 306 below its pivot. The pawl device or member 314 is spread or extended laterally above its pivot and terminates in two pawl teeth 316 and 317 which are at opposite sides of the pivot and above the same. At its lower end the member or pawl device 314 is provided with a laterally extending finger piece or handle 318. The pawl 314 is loose on its carrier 306 but is maintained in a normal central position by means comprising a pair of centering springs 319. These springs are arranged at opposite faces of the stem of the carrier 306 and at their upper ends are provided with ears 320 which are riveted or otherwise secured to the face of the carrier. The lower ends of the springs are free and are provided with inwardly extending lugs 321 which overlie the sides of the pawl 314 and maintain it in a middle position and so that its teeth 316 and 317 are disengaged from the squared teeth 302 of the collar 301 with which said teeth are adapted to coöperate.

With the parts in the position shown in Fig. 30 it will be understood that if the finger piece 318 is pulled forward the forward spring 319 will be flexed, permitting the pawl 314 to turn on its pivot and the tooth 317 to engage between two of the teeth 302. This motion of the pawl 314 is independent of its carrier 306 but thereafter as the forward pull on the finger piece 318 is continued, the carrier will turn on its pivot concentrically with the collar 301 which will be forced to turn by the tooth 317. At the beginning of the movement of the carrier 306 the detent 310 will disengage from the rear depression 308 and will be forced up on to the surface 307, riding along said surface until the detent 310 engages with the forward depression 308, the lug 309 determining the extent of the movement and the depression 308 coöperating with the detent 310 to hold the parts in the position to which they have been moved. This gives a predetermined extent of rotation to the collar 301 and the movement will be transmitted through the gear 296 and intermeshing pinion 293 to the squared shaft 265 and from it through the bushing 242 to the pressure or feed roller 237, 238. As a consequence the work sheet or sheets on the sub-carriage will be retracted or fed backward continuously to a predetermined extent. It will be understood that when after such movement the finger piece 318 is released, it will be centralized by the springs 319 so that the pawl tooth 317 will disengage from the teeth 302. Thereafter if the finger piece 318 be pushed downward and rearward it will first operate to turn the pawl 314 independently of its carrier and cause the tooth 316 to engage with the teeth 302 after which the toothed collar 301 will be turned reversely until the parts are arrested by the engagement of the rear lug 309 with the detent 310. This movement will be transmitted through the gear 296 and pinion 293 to the squared shaft 265 and the connected feed roller, causing a continuous advance of the paper on the sub-carriage to an extent equal to that to which it had been previously retracted. It will be understood that the operation of the finger piece 318 to advance and retract the paper on the sub-carriage will take place whatever position the sub-carriage may occupy lengthwise of the main carriage, and also that such operation will be independent of the operation of the line space lever 287 as well as of the finger button 268. There is also a fourth method of feeding the paper on the sub-carriage by devices which coöperate with the ratchet wheel 300, and which will be hereinafter described.

It will be understood that the work sheet on the sub-carriage overlies and is fed over the work sheet or sheets in the main carriage so that items or entries written on the sub-carriage work sheet will be reproduced from the inking device or transfer medium on to the sheet or sheets on the main carriage. At times, however, it is desirable to avoid the reproduction of an entry on the main carriage sheet or sheets and to this end we provide devices or means for shielding said sheets from the types, thereby cutting out or withdrawing such sheets from the action of the types. Said means as illustrated in Figs. 1 to 3, 6, 7, 40 to 46 includes a shield 322 of very thin sheet metal. This shield or strip extends lengthwise along the front of the platen 36 and normally below the printing line thereon, being secured or clamped by screws 323 between lugs or washers 324 and gear segments 325 which are at opposite ends of the platen. The lugs extend forward from the segments slightly beyond the front face of the platen and the strip 322 is stretched between and over the forward edges of said lugs and clamped between them and the inner faces of the gear segments 325. Suitably secured to the outer faces of the gear segments 325 are plates 326 which extend forward and carry laterally projecting headed screws 327 which engage in curved slots 328 formed in arms 329. Said arms are provided at their rear ends with rack teeth or gears 330 engaging with the teeth of the gear segments 325 and are secured at their forward ends to a hollow shaft 331 which is confined between the plates 135 and is provided with end bushings 332 which bear rotatably on the rod or shaft 133. The arms 329 are further connected about midway of their lengths by a cross rod or stiffening bar 333. Lateral pins 334 projecting inward from the arms 131 overlie the arms 329, and the right-hand arm 131 is provided with an inturned lug 335 which underlies the right-hand arm 329. Thus the frame comprising the arms 239 and the shaft 331 has a motion relative to the frame comprising the arms 131 and the shaft 133 which is limited by the pins 334 and lug 335. A stop lug 336 is also secured to the end bar 27 by a screw 337 and underlies a lug 329$^a$ on the right-hand arm 329 limiting the downward movement of the frame in which said arm is comprised. Draw springs 338 connect the arms 329 with the lower ends of the gear segments 325 and tend constantly to throw the shield 322 upward to cover the printing line. The segments 325 extend back over and are curved to conform to the hub 150 of the ratchet wheel 149 and the hub 36$^a$ of the left-hand platen head which is of corresponding diameter to said hub 150, said segments normally resting against said hubs. The segments have a floating connection or loose pivotal engagement with the arms 329, being adapted to turn on said arms to an extent limited by the ends of the slots 328.

In order to overcome the springs 338 and maintain the shield or cut-out device 322 in normal position below the printing line as shown in Figs. 7 and 40, in which latter figure the printing line is indicated by the dotted line 339, detent devices are provided comprising a spring plate 340 which is secured on the end bar 27 by the screw 337 and extends upward inside said end bar, being bent to provide a shoulder or stop portion 341 and terminating in an upturned end 342. The shoulder 341 is adapted to coöperate with a stop lug or detent device 343 secured to the outer face of the right-hand arm 329, and having a flat upper face and an inclined lower face. When this lug is under the shoulder 341 the rocking frame comprising the arms 329 and the shaft 331, and the floating frame comprising the segments 325 and strip 322 may be held in the position shown in Fig. 40. The detent or stop devices 341 and 343 are separable, to permit the shield 322 to swing upward, by devices operative automatically from the line space lever 287, said devices comprising a collar 344 secured to the rock shaft 286 and provided with a tooth or lug 345 which is adapted to engage with the end 342 when the rock shaft is rocked and to draw the detent plate 340 toward the right as shown in Fig. 44, freeing the lug 343 from the shoulder 341 and permitting the floating frame to swing upward under the action of the springs 338. During this upward swinging movement the springs 338 will contract, causing the teeth of the segment 325 to coöperate with the rack teeth 330, and as a result the floating frame will rise as shown in Fig. 41 and the rocking frame comprising the arms 329 will swing upward about the axis 133. With the parts as illustrated in Fig. 41, the shield or cut out device 322 covers the printing line on the platen 36 so that when the types are actuated any work sheet or sheets which may be arranged between the platen and the shield will be protected or covered and will not receive type impressions, but any sheet or sheets outside of or forward of said shield will receive type impressions, the shield itself acting temporarily as a platen or backing when coöperating with the types for impression purposes. The upward movement of the rocking frame to the Fig. 41 position is for the purpose of positioning the parts so that they may be automatically restored to the control of the detent devices 341 and 343, again rendering the shield 322 inoperative.

The restoring means aforesaid is automatically operated during traveling movements of the main carriage and comprises a cam carrier or member 346 having a collar portion which surrounds and bears on the hollow shaft 331. Said collar carries a thumb screw 347, the shank of which is adapted to pass through holes 348 formed at intervals along the rear face of the shaft 331, thus providing for an adjustment of said cam carrier lengthwise of the main carriage and so as to vary its point of operation. The cam carrier depends from the shaft 331 and its stem 346ª has suitably secured to it a double faced cam 349. This cam, it will be understood, is rigid with the shaft 331 so that when acted on it will communicate rotary movement to the rocking frame comprising the arms 329. Said cam is adapted to coöperate with a roller 350 pivoted on an arm 351 secured by a screw 352 to the under side of the fixed guide rail 32 and projecting rearward therefrom. When the rocking frame is rocked to the Fig. 41 position the double cam 349 is swung into line with the roller 350 so that thereafter when the carriage is moved endwise, one of the cam faces 349 will coöperate with said roller to force the rocking frame 329, 331 downward again to the Fig. 40 position, bringing it within the control of the detent devices 341, 343. During this return movement the inclined face of the lug 343 will act as a cam coöperating with the spring plate 340 to cam it rightward out of the way and then permitting it to swing back to operative engagement with the upper horizontal face of said lug. In order to prevent bowing of the shaft 331 during the operation of the cam devices 349 and 350, the collar portion of the cam member 346 is provided at its front with a lug 346ᵇ which is adapted to engage with the back of the scale bar 136, said bar which is rigid on the platen frame, thus serving as an abutment to prevent forward bowing or bending of the shaft 331. As the rocking frame swings downward its rack gears 330 will coöperate with the segments 325 to swing the segments back to the Fig. 40 position. The construction is such that when the pressure device or bail comprising the arms 131 is swung upward to inoperative position as in Fig. 42 it will carry with it both the rocking frame comprising the arms 329 and also the parts supported by said rocking frame, by reason of the engagement of the lug 335 with the associate arm 329. This leaves the front face of the platen 36 clear. When the pressure device is restored to coöperation with the platen, the pins 334 will engage the tops of the arms 329 and force the parts connected therewith back to coöperative engagement with the platen. The final downward swing of the rocking frame, however, is communicated to it independently by hand as the rollers 130 engage with the platen before the rocking frame has quite reached its final position.

The sub-carriage is releasable from the control of its detent devices to permit it to be drawn rightward by its motor independently of the main carriage so as to vary the relationship lengthwise of the printing line between the sheet or sheets on the sub-carriage and the sheet or sheets on the main carriage. This variation in the relationship of the sheets may be accomplished either through release key mechanism on the sub-carriage itself or through special tabulating mechanism controlled from the frame of the machine. Said release key mechanism is illustrated in Figs. 15 and 16 and comprises a lever 353 which is pivoted on a shouldered screw 354 secured to the left-hand bracket 231. Said lever terminates at its forward end in a key or finger piece 355 and at its rear end it is off-set or bent inward as indicated at 356 to underlie the forwardly bent left-hand end 200ª of the pawl member 200. A suitable restoring spring is provided for the release key lever which lever when operated will swing the pawl member 200 on its pivot and disconnect its tooth from the rack 198 so that the sub-carriage may be moved freely by hand back and forth on the main carriage. The left-hand ear 183ª projects forward in the vicinity of the release key 355 and is formed into a finger piece by which the sub-carriage when released may be conveniently manipulated independently of the main carriage.

The tabulating mechanism for controlling the sub-carriage independently of the main carriage is illustrated in Figs. 5, 6, 7, 9, 10, 11, 13, 14 and 29 and comprises a toothed stop bar 357 of ordinary construction which is secured by screws 358 to the lugs 183ᵇ at the rear of the sub-carriage, said lugs being formed with slots 359 (Fig. 15) which afford a lengthwise adjustment of said stop bar. Said stop bar, which is preferably provided with a scale in correspondence with the scale at the front upper edge of the deflector or guide plate 224, receives one or more column or tabulator stops which may be adjusted to various points along it, two column stops being shown thereon and numbered 360 and 361. The stop faces of said stops project downward and the left-hand stop 360 projects to a somewhat greater extent than the other stop and so that it is in line normally with the coöperative stop members on the frame. Said members are coöperative with both said column stops 360 and 361 and in the present instance are constituted by two vertically movable stop bars 362 and 363, said bars being off-set inward toward each other near their upper ends to provide stops proper 362$^a$ and 363$^a$. These upper end or stop portions are guided in a slot-way 364 cut transversely in the forward portion 365 of a bracket 366 which extends rearward and is provided with downwardly projecting ears 367 that embrace lugs 65$^a$ on the frame 65 and are secured in place by a screw 368. The forward portion 365 of the bracket is shaped like an inverted U and the stops 362$^a$ and 363$^a$ extend between the sides of this trough-like portion, which sides serve as guides to prevent movement of said stops fore and aft of the machine. The slot 364 is slightly wider than the combined thicknesses of the stops and a spring 369 that is secured in place on the under side of the bracket 366 by a screw 370 presses at its free end leftward against the stops and normally maintains the two stops pressed together at their upper ends and against the left side of the slot or guide-way 364. The stop bars 362 and 363 extend downward and are pivotally and detachably connected at their lower ends to crank arms 371 and 372 which are fast on the inner end portions of two sleeves or hollow rock shafts 373 and 374, the inner ends of said sleeves abutting and the two sleeves bearing on a rod or shaft 375 which bears at its ends on adjustable screws 376 secured in the sides of the base 1. The sleeves 373 and 374 are maintained in proper relation endwise by collars 377 fixed to the rod 375 at the outer ends of said sleeves. The left-hand sleeve 373 is controlled by a lever 378, said lever having a downwardly extending portion 378$^a$ which is fast on the shaft 373 near its left-hand end and having also a leftwardly off-set tail portion 378$^b$ to which is hooked one end of a restoring spring 379, the lower end of said spring being anchored to a fixed pin 380. The lever 378 extends forward to the upper bank of the keyboard at the left-hand side thereof and terminates in a stem portion 378$^c$ which is provided with a key cap or button 381 having an appropriate index mark, such as "Tabulate". The right-hand sleeve 374 has fixed near its outer end an upwardly and forwardly inclined crank arm 382, the forward end of which has a slot 383 that is engaged by a headed screw 384 secured to a lever 385, said lever being fulcrumed at its rear end on the fulcrum plate 22 and extending forward to the keyboard, terminating in a stem portion 385$^a$ which is provided with a key or button 386, said key bearing the words "Tabulate and line space" and being located at the right-hand end of the uppermost bank of keys.

It will be understood that an operation of either of the keys 381 or 386 will act to turn the associate sleeve 373 or 374 and project upward the connected tabulator stop 362$^a$ or 363$^a$ into the path of the column stop 361. The stop 360, as stated, is of such length that normally its lower end is in position to be engaged by the upper end of the stop 362$^a$, as will be understood from Fig. 7, during movement of the sub-carriage from left to right. The right-hand tabulator key 386 has a lost motion connection with its sleeve 374 by reason of the screw and slot connection 383, 384 so that this key may operate additional devices for automatically line spacing the sub-carriage work sheet. Both the special tabulator keys 381 and 386 are operative to release the sub-carriage so that it may be drawn freely leftward by its motor spring. The releasing devices comprise two bars, a bar 387 provided with a forwardly extending lip 388 and a similar bar 389 provided with a forwardly extending lip 390. These bars are respectively secured to pairs of forwardly extending arms 391 and 392. The arms 391 are provided with collars 393 which fit over a sleeve or hollow shaft 394 and are suitably secured thereto. The arms 392 are provided with collars 395 which are pinned or otherwise secured to the outer end portions of a shaft 396. Said shaft extends through the hollow shaft or sleeve 394, which sleeve bears loosely upon it, the shaft in turn bearing in openings in the end plates 26 and 27 of the main carriage. Laterally extending lips 397 coöperate with pins 398 on the end bars 26 and 27 to limit the downward movement of the rocking frame comprising the bar 387 and arms 391. The left-hand arm 392 is provided with a slot 399 (Fig. 4) which coöperates with a lateral pin 400 on the end bar 26 to limit the downward movement of the rocking frame comprising the bar 389 and arms 392. The lip 388 overlies normally but is out of contact with an off-set or lug 362$^b$ extending forward and upward from the bar 362 near its upper end, while the lip 390 similarly overlies a lug 363$^b$ on the bar 363. It will be understood that when said bars are moved upward by their respective tabulator keys their associate lugs will engage with the overlying lips whatever the longitudinal position of the carriage and will swing the frames comprising the bars 387 and 389 upward on their pivotal axes. Each of these frames is adapted to swing the pawl member 200 on its pivot to free the sub-carriage from the rack 198. The bar 387 underlies said pawl member so that as the bar rises the pawl member will be actuated to disconnect it from the rack 198 and release the sub-carriage. Said pawl member at its left-hand arm is provided with a releasing lip or finger 401 which overlies the bar 389 so that said bar when lifted will also release the pawl member as described. The actuation of the bar 389 by the stop bar 363 is not only operative to project the associated stop 363$^a$ and release the sub-carriage but also effects automatically the line spacing of the sub-carriage work sheet by devices mounted on the left-hand arm 392 and coöperative with the ratchet wheel 300. Said devices as shown in Fig. 4 comprise a pawl member 402 pivoted to the outer face of the left-hand arm 392 on a shouldered screw 403 secured to said arm, a washer 404 being interposed between the head of said screw and said pawl member. The pawl member 402 is provided with a pawl tooth 405 adapted to coöperate with the teeth of the ratchet 300, the back of the said pawl tooth being beveled to coöperate with a stop pin 406 projecting laterally from the end bar 26, said pin acting as a stop and jamming the tooth 405 into the ratchet 300 to prevent overthrow after the limit of movement has been reached. An arresting finger 402$^a$ on the pawl member 402 is also provided, said finger normally coöperating with the stop pin 400. A restoring spring 407 is coiled around the shank of the screw 403 outside the washer 404 and is secured at one end to a pin 408 on the arm 392, the opposite end of said spring being hooked over a pin 409 projecting laterally from the pawl member 402. Said pin also projects inward or toward the right from the inner face of said pawl member and engages in a slot 392$^a$ in the arm 392. The pin 409 and slot 392$^a$ limit the extent of rotary movement of the pawl member 402 on its pivot. Normally the pin 409 is maintained near the forward end of the slot 392$^a$ and with its finger 402$^a$ in engagement with the pin 400 by the spring 407, so that the tooth 405 is normally disengaged. When the frame comprising the arms 392 is swung upward by the actuation of the tubular key 386 the pawl tooth 405 will engage with the ratchet wheel 300 and will turn the ratchet until arrested by the stop 406. This rotary motion is transmitted through the gear 296 and pinion 293 to the feed roll devices of the sub-carriage which will be turned to advance the sub-carriage work sheet a unit distance.

It will be understood that no springs are provided for the sub-carriage releasing bails as they are restored to normal position after actuation by gravity. It will further be understood that when one of the special tabulator keys is operated it will project its associate stop and will release the sub-carriage which will travel toward the right until arrested by the engagement of the proximate column stop which may be either 360 or 361 with the projected frame stop which may be either 362$^a$ or 363$^a$. When the stop 361 coöperates with the frame stop the latter will yield toward the right by reason of the yielding of the spring 369 until arrested by the right-hand wall of the slot 364. In such case when the tabulator key is released the projected stop will recede downward, and disengage from the stop on the sub-carriage and thereupon will be swung leftward to normal position by the spring 369. If then the tabulator key should be again actuated prior to a writing operation it would not strike the column stop on the carriage but would slide upward to the left of said stop, thus avoiding danger of forcing the column stop off the stop bar or of breaking or distorting the mechanism by reason of the contact of the upper end of frame stop with the under face of the column stop. The stops 362$^a$ and 363$^a$ are of very thin sheet metal so that their combined widths are less than a letter space, one-tenth of an inch in the present instance, and the actuation of either one of them will arrest the carriage at the proper point as determined by the setting of the co-acting column stop on the stop bar with the assistance of the stop bar scale. A stop 410 (Fig. 8) is screwed or otherwise clamped to the sleeve 324 at some distance from its right-hand end and is adapted to coöperate with the lower end portion of the right-hand end plate 231 which projects downward and loosely embraces the sleeve 394. The lower portion of this end plate acts as a stop engaging with the stop 410 to provide for finally arresting the sub-carriage on the main carriage should it pass rightward out of the control of its tabulator stop devices.

For enabling the sub-carriage work sheet and parts of the outer work sheet on the main carriage to receive type impressions, ribbon mechanism is provided as illustrated in Figs. 1, 5 to 8 and 10 to 12. Said mechanism comprises two ribbon spools 411 arranged vertically one at each side of the machine and between the front corner posts 3 and the supplemental posts 4. Said spools are mounted at opposite ends of a shaft 412 which extends transversely of the machine and bears on brackets or arms 413 and 414 which are secured to the frame webs 5 by screws 415. The spools are of ordinary construction comprising flanges and a connecting core piece and receive each a detachable hub 416 which is connected to the associate spool to turn therewith by slots 417 formed at its outer end and engaged by lugs 418 on the spool, these lugs projecting radially inward from the hole in the outer flange of the spool through which the end of the hub passes. At its inner end the hub is expanded outside the spool into a flange 419 provided with crown ratchet teeth 420. The hub 416 is arranged between the spool and the shaft 412, bearing on the associate end portion of the shaft which is reduced as indicated at 412$^a$ to provide a bearing surface and is further reduced and threaded as indicated at 412$^b$ at its extreme end. The left-hand threaded portion 412$^b$ receives a thumb nut 421 which retains the spool and hub in place but permits them to turn together on and relatively to their bearing 412$^a$. The right-hand reduced portion 412$^b$ has instead of a thumb nut, a handle 422 which is secured in place by a hexagonal nut 423. A ribbon 424 is wound on the ribbon spools and extends from one to the other, passing upward at each side through a hole 425 in the associate top plate section 12 and being guided over a guide bar 426 which bridges said hole and is slightly inclined inward toward the rear. From the guide bars the ribbon extends horizontally inward and rearward and passes through slots 427 formed in a stationary guide frame 428 which is secured to the segment plate 429 by the same screws 430 which clamp the line gage and paper guide 431 in place.

The segment plate is suitably secured to the segmental type bar support 13. The central ribbon guide 428 is preferably formed of wire and at its lower end portion is bent or looped as shown at 428$^a$ (Fig. 8) to provide recesses for the reception of the screws 430. A cross plate or washer 432 is arranged beneath the heads of the screws 430 and coöperates with the looped portions 428$^a$ to hold the guide 428 securely in place, said guide being thus clamped by the screws between the washer 432 and the lower end portion of the line gage 431. The ribbon 424 is adapted to be fed alternately back and forth from one ribbon spool to the other through the central stationary guide 428, and to this end means are provided for feeding or rotating the shaft 412 from the printing key levers, said shaft thus becoming the power shaft, and for alternately connecting the ribbon spools to be turned from and by said shaft. Accordingly the shaft 412 has mounted on it near its left-hand end just inside the bracket 413 a ratchet wheel 433 provided with a hub 434 which receives a set screw 435 by which the ratchet wheel is fixed to the shaft 412. The teeth of the ratchet wheel are comparatively fine and coöperative therewith is a pawl member 436 provided at its upper end with a pawl tooth 437 which engages the teeth of the ratchet wheel. Guiding fingers or ears 438 and 439 extend forward from the pawl member below the tooth 437 and embrace loosely between them the ratchet wheel 433 so as to prevent lateral displacement of the pawl member in respect of the ratchet wheel while the finger 439 extends around and upward at the front side of the shaft 412, being coöperative with said shaft to prevent the pawl member from being accidentally displaced in the plane of the ratchet wheel by being thrown backward out of engagement with the ratchet wheel. The pawl member or arm 436 is inclined downward and rearward and is pivotally connected at its lower end at 440 to an arm or part 441 which is adjustably connected by screws 442 and 443 with an arm or part 444 fixed to the universal rock shaft 59 and extending forward and slightly upward therefrom. The screw 442 passes through a round hole in the arm 441 but the screw 443 coöperates with an elongated slot 445 in said arm, the construction being such that by loosening the screws 442 and 443 the arm 441 may be swung to a limited extent on the screw 442 as a pivot, the two-part member 441, 444, thus providing for an adjustment of the pawl member 436 and its tooth 437 in respect of the ratchet wheel 433. The construction is such that at the operation of any printing key lever rocking the shaft 59, the outer end of the arm 441 will swing upward lifting the pawl member 436 and causing the tooth to coöperate with the ratchet wheel 433 to turn the same and through it the power shaft 412. Thus successive step-by-step turning movements are communicated to the shaft. A wire spring 446 secured to the arm 441 engages at its free end with the upper rear portion of the arm 436 and tends to maintain the pawl 437 engaged with the ratchet wheel. A weighted detent member or arm 447 is pivoted at 448 on the arm 413 and extends downward and forward therefrom, being provided with a tooth 449 which coöperates with the ratchet wheel 433 to prevent accidental backward rotation thereof. The hub 434 of the ratchet wheel coöperates with the bracket 413 to prevent accidental endwise displacement of the shaft 412 toward the left while a collar 450 screwed fast or otherwise secured to the shaft at the left of the bracket 414 coöperates with said bracket 414 to prevent endwise displacement of said shaft toward the right.

In order to transmit the motion of the power shaft to the ribbon spools in alternation devices are provided comprising sleeves 451 and 452 which are slidably mounted on the shaft 412 to the right and left respectively of the ratchets 420. Secured in a recess 453 in the outer end of each sleeve is a diagonally extending arm 454 provided at its outer ends with ratchet teeth 455 which are adapted to coöperate with the ratchets 420. The sleeves 451 and 452 are connected with each other by a connecting device or rod 456 which extends from one sleeve to the other, said rod being arranged or housed in a slot-way or groove 457 in the shaft 412. The end portions 457ª of said rod are turned outward, passing through holes in the sleeves 451 and 452. The construction is such that endwise motion communicated to one of the sleeves will be transmitted through the rod 456 to the other sleeve, the rod sliding lengthwise through the groove 457 to transmit such motion. Further the rod in coöperation with the groove 457 provides a connection between the shaft 412 and the sleeves to transmit the rotary movement of the shaft to the sleeves. The sleeves it will be seen are clutch members for transmitting the rotation of the shaft 412 to the spools 411 when the teeth 455 of the sleeves engage with the ratchet teeth 420 on the spools. Devices are provided to switch the sleeves or clutch members into and out of operation, said devices comprising a switch lever 458 fulcrumed at 459 on a horizontal ear 413ª bent laterally outward from the forward portion of the bracket 413. The forward arm of the lever 458 is shaped to provide a finger piece by which the lever may be shifted while the rear arm of said lever is provided with an upstanding pin 460 which engages with a circumferential groove 462 in the sleeve 451. By switching the forward arm of the lever 458 toward the left from the positions shown in Figs. 10 and 12 the pin 460 is caused to engage with the side of the groove 462 to switch the member 451 rightward along the shaft 412, disconnecting said sleeve from the left-hand ribbon spool, while the rightward motion of said sleeve is transmitted through the rod 456 to the sleeve 452 which is thereby connected through its teeth 455 with the ratchet teeth 420 of the right-hand spool 411. It will be understood that the sleeves or clutch members 451 and 452 are definitely spaced apart by the rod 456 to an extent such that when one of them is operatively engaged with its ribbon spool the other is disconnected or disengaged. A detent spring 463 secured by screws 464 to the ear 413ª coöperates at its free end with a pin 465 projecting upward from the rear arm of the lever 458. The free end of the spring 463 is bent downward and pointed to coöperate with the upper end of the pin 465 which is beveled to provide two oppositely inclined faces as indicated at 466 so that when the parts are as in Fig. 12 the spring detent 463 will coöperate with the right-hand bevel 466 to hold the clutch member 451 engaged with its ratchet, while when the lever 458 is switched toward the right the spring detent will coöperate with the left-hand bevel 466 to maintain the right-hand clutch member 452 in operation.

In addition to the hand operated shift mechanism, devices are provided for automatically switching the clutch devices 451 and 452 into and out of operation to reverse the ribbon feed. Said automatic devices comprise switch members each composed of a cam arm 467 and a follower 468 joined by a cross bar 469, said cross bar having down turned ears 470 which receive a pivot screw 471 by which the follower is pivotally mounted on the associate frame cross bar 5, the pivot screw 471 projecting outward from said cross bar 5. Secured at the forward edge of the cross bar 469 is a rounded guide 472 over which the ribbon passes upward from its spool to the frame guide 426. The follower arm 468 extends rearward between the flanges of the associate spool 411 and terminates in a downwardly curved end portion 473 which coöperates with the wound up portion or plies of the ribbon as clearly shown in Fig. 5, being maintained in engagement therewith through the force of gravity. The associate cam arm 467 is arranged inward on the cross bar 469 from the follower 468 and like the follower extends rearward but is outside the spool and inclines downward so that it terminates below the follower and is also off-set or bent inward at its rear portion, being provided at its free end with a cam or inclined edge 474. This cam edge faces the follower and is adapted to coöperate with pins 475 which project radially outward from the associate sleeves or clutch members 451 and 452. There are two of these pins on each sleeve arranged opposite each other, the face of each pin opposite its follower being beveled or inclined downward as illustrated at 476 and the cam edge 474 of the follower being similarly beveled.

When the spool is comparatively full of ribbon as in Fig. 5 the follower will maintain the cam arm 467 raised out of the path of the pins 475. As the ribbon gradually unwinds from the spool it allows the follower to drop and the cam arm 467 will swing downward a corresponding extent. The result is that when the ribbon is completely unwound from the spool the cam arm 467 will drop down so that the cam edge 474 is in the path of the pins 475 and will operate to force said pins outward. This movement will be transmitted to the sleeve or clutch member and to the teeth 455 thereon which will engage with the ratchet teeth 420, thus connecting the ribbon spool with the sleeve and forcing it to turn with the power shaft. At the same time the opposite sleeve will be drawn out of operative engagement with its ribbon spool. By reason of the beveled or inclined faces 476 the pins 475 will tend to force the cam edges 474 downward toward the face of the associate sleeve and after once engaging with the cam edge will maintain it down in operative position until the reversal of the ribbon feed has been effected. It will be observed that by reason of the inward off-setting of the frame cross bars 5, a space is provided at each side of the machine between the posts 3 and 4, so that the ribbon, the ribbon spools and the associate devices are not interfered with.

As has been stated, the present form of our invention while adapted for various uses was more particularly designed for employment in connection with the writing of municipal warrants and records thereof. A warrant of the character referred to with an appended check is illustrated in Fig. 58 and marked for reference as a whole by the numeral 477. It will be observed that the sheet 477 comprises two parts divided by a cross line 478, the upper part being the warrant proper and the lower part being the check based on the warrant and to be signed by the proper officer. On both the check and the warrant portions of the sheet 477 there are dotted lines, these merely indicating names which have been omitted from the showing. Aside from these dotted line blanks, all of the blanks on the check are to be filled in with a pen, but the blanks on the warrant are filled in on the typewriter by the aid of our invention and for the most part are simultaneously duplicated on one or more record sheets, a fragment of one of these record sheets being illustrated in Fig. 57 and designated as a whole by the reference numeral 479. Returning to the warrant it will be observed that at the left is a vertical column blocked off into five spaces which are designed to receive entries relating to various data necessary in the system of book-keeping under consideration. The entries aforesaid appear one under the other in a vertical column, the top entry being for the finance voucher number, the next entry under the top being for the contract number, the next for the number of the department, the next for the code number and the next and last for the number of the warrant itself. Referring to the record sheet 479 it will be observed that at the left-hand side are a series of parallel vertical columns, five in all, arranged side by side and headed to correspond with the five blanks at the left of the warrant, but with the difference that whereas on the warrant the entries are to be in a vertical column one under the other, on the record sheet the corresponding entries are to be in a series of parallel columns arranged side by side.

By the employment of our invention the operator is enabled to write the entries on the warrant one under the other in a single vertical line or column and concurrently to duplicate these entries on the record sheet in a single horizontal line, one entry appearing in each of the parallel columns on the record sheet. After writing the data in the five blank spaces on the warrant and simultaneously duplicating them on the record sheet the operator next writes the name of the payee in the "Pay to" line on the warrant, the name being simultaneously duplicated in the payee column on the record sheet. Next the amount of the warrant in figures is written to the right of the "$" mark on the warrant and simultaneously duplicated in the amount column on the record sheet. It will be observed that whereas the name and the amount are in different lines on the warrant they are in the same line on the record sheet, this line being the same as the line occupied by the entries in the five left-hand columns. These are all of the entries on the warrant that are to be duplicated on the record sheet and it will be observed that such duplications occupy a single horizontal line. There are additional entries on the warrant, namely, the amount of the warrant written in words, and the statement of what it is for, but by the use of the type shield or printing cut out devices duplication of these last entries on the record sheet or sheets is prevented. In addition to the entries duplicated on the record sheet from the warrant there are other entries on the record sheet in a series of so-called "distribution" columns to the right of the "amount of warrant" column, but these are to be written in the usual way by the assistance of the main carriage tabulating mechanism, the warrant at this time being to the left of these additional columns so that it does not receive type impressions. The warrant sheet, it will be noted, is considerably narrower than the record sheet and is, of course, to be supported on and controlled by the sub-carriage, while the wide record sheet or sheets are supported on the main carriage. Each record sheet has a blank space at the left of the first column and is provided along its left-hand edge as indicated at 480 with a series of key-hole slots which enable it be entered in a loose leaf record book.

The arrangement of the warrant or work sheet 477 with respect to the record sheet or sheets 479 is diagrammatically illustrated on an enlarged scale in Fig. 22. In practice eight or nine duplicate record sheets are required for use in various divisions of the office and accordingly packs comprising the desired number of record sheets and corresponding interleaved transfer or carbon sheets are employed, the outermost sheet being a record sheet 479, the next a carbon sheet indicated in Fig. 22 by the reference numeral 481, the next a-record sheet, the next a carbon sheet, and so on. The pack comprising the set of record sheets and interleaved carbons passes around the platen 36 between the main feed roll 92 and upward at the front of the machine between the platen and the pressure rolls 130. The work sheet 477 has associated with it a transfer medium or carbon sheet 482 of corresponding dimensions, the carbon face being turned toward the rear so that it will off-set on the outermost record sheet 479. It will be seen that the inking device or impression or printing means or medium 482 for the outer sheet on the main carriage is carried by the sub-carriage. The work sheet 477 and the associate carbon sheet 482 pass upward between the sub-carriage pressure rolls 238 and 233 and thence upward between the combined line gage and paper guide 431 and the type shield 322, said shield being interposed between the sheets 477 and 482 of the pack of record sheets but being normally below the printing line 339 so that the impact of the types will be transferred through the ribbon 424 to the work sheet 477, and simultaneously off-set from the carbon 482 on to the outer record sheet 479 and through the carbon sheets 481 to the underlying record sheets 479 except when the shield 322 is in operation.

In setting up or adjusting the mechanism preliminary to use, the operator first inserts the manifold pack or set of record and carbon sheets in the main carriage over the paper table 114 and the paper apron 106 and between the platen 36 and the main feed roller 92 which is cast off for the purpose, the pack being passed between the platen and the type shield 322 and directed rearwardly over the platen, the pressure device comprising the rolls 130 being thrown up out of operation, carrying with it the shield 322 to facilitate the introduction of the pack. The pack it thus introduced and advanced with its left edge in contact with the side guide or gage 127, said gage having been previously adjusted so that the decimal point in the "amount of warrant" column is in register with one of the indicating marks on the stationary line gage 431. Care should be taken also that said side gage is far enough to the left to insure that the key holes or slots 480 at the left of the record sheet shall be under the left-hand marginal guide 113 as this guards against the tearing of the side of the record sheet at these slots which would otherwise be liable to occur. The main feed roller and the pressure device may then be restored to normal position and the platen turned to bring the first line to be written on in register with the line gage 431. The main carriage is next moved endwise until the point in the first column at which the writing is to begin is opposite the printing point, whereupon the margin stop 140 is adjusted against the frame stop 142. Next the main carriage is spaced leftward until the point of beginning in the second column from the left on the sheet 479 is brought opposite the printing point and then the first column stop 71 is adjusted on its stop bar in accordance with the position indicated by the pointer 142$^b$, the adjustment of the column stop being made, of course, by means of the stop bar scale. Thereafter the succeeding column stops for the third, fourth and fifth columns on the sheet 479 are similarly adjusted on the stop bar 72. Next the fifth column stop 71 is adjusted to correspond with the point at which the names of the payees are to begin in the "payee" column on the record sheet, this point being readily determined by temporarily alining the warrant 477 with the payee column and selecting a suitable point to the right of the words "Pay to" on the warrant. Then the sixth column stop 72 is adjusted to correspond with the "amount of warrant" column and the seventh and succeeding column stops 71 are similarly adjusted in correspondence with the columns following said column on the record sheet. Next the warrant or original or sub-carriage sheet 477 together with the associate carbon 482 is introduced into the sub-carriage, the operator first releasing or throwing forward the deflector 224 and roller 233 and then introducing said sheet from the front, passing it downward over and into the basket 208. It will be observed that this amounts to a front feeding or introduction of the sheet. Said sheet 477 is alined on the sub-carriage by the aid of the end gage 215 and side gage 210 and the feed roller and deflector are restored.

Preferably a disconnecting or fractional spacing mechanism is arranged between the feed roller 237, 238 and its detent 243 so as to enable the warrant to be spaced less than a line space distance and bring the printed blanks thereon more accurately into register with the printing line. Next the column stops 360 and 361 are adjusted on the sub-carriage stop bar 357 in accordance with the proper points for writing respectively in the vertical column at the left of the warrant and in the first letter space position to the right of the "$" sign near the right-hand side of the warrant. The warrant should then be alined with its left-hand column in register with the "warrant No." column on the sheet 479 and then the main carriage carrying with it the sub-carriage should be adjusted endwise until the proper position is reached for writing out the amount of the warrant in words on the line below the "pay to" line. With the carriages thus adjusted the margin gage or stop 141 is set against the frame stop 142. Next the cam member 346 is set in proper position along the shaft 331 to coöperate with the roller 350 just prior to the entrance into the printing field of the "A" column which is the first column to the right of the "amount of warrant" column on the sheet 479. Finally the slide 254 is set on its supporting bar at a point such that the roll 251 will act to release the sub-carriage paper feeding devices after the final column on the sheet 479 passes to the left of the printing point; and the slide 178 is similarly adjusted for coöperation with the roller 175. The mechanism is now ready for use.

With the work sheets in place on the holders or carriages the main carriage is pushed to the right until finally arrested by the contact of the margin stop 140 with the frame stop 142. During such movement the sub-carriage will move lengthwise of the printing line with the main carriage until the stop 360 engages with the frame stop 362ª to arrest the sub-carriage. The work sheets 477 and 479 will now be in the positions shown diagrammatically in Fig. 47 in which figure and in the subsequent diagrammatic views down to and including Fig. 56 the printing point is indicated as $p$, this point being at the intersection of the printing line 339 with a line passing vertically through the point at which the type will strike. It will be observed from Fig. 47 that the sheet 477 overlies the sheet 479 in such relationship that printing will take place in the block or rectangle at the top of the vertical column at the left of the sheet 477 and will be duplicated at the top of the first or left-hand column on the sheet 479. The operator then proceeds to operate the printing keys to print the necessary data, which has been assumed to be the number "5763" as will be observed from Figs. 57 and 58. The scale of the diagrammatic views (Figs. 47 to 56) is necessarily so reduced that it is impossible to indicate numbers or characters other than by marks as shown in these figures, such as vertical straight lines, small x's, 1's, diagonals, &c. After the printing has been done in the first column the operator actuates the left-hand or decimal tabulator key 68, causing the main carriage and sub-carriage to space leftward lengthwise of the printing line, carrying their respective work sheets to the position shown in Fig. 48. Next the key 386 is actuated, releasing the sub-carriage and causing it to move rightward lengthwise of the printing line independently of the main carriage until arrested with the work sheet 477 in the position shown in Fig. 49, the operation of the key 386 not only causing a tabulating run of the sub-carriage from left to right but also automatically line spacing the sheet 477 through the operation of the pawl and ratchet mechanism 402, 300. This operation brings the second or "contract number" block space on the sheet 477 opposite the printing point and overlying the second column from the left on the sheet 479. After the necessary printing operation the decimal key 68 is again operated to tabulate the main and sub-carriages toward the left and bring the third column on the sheet 479 opposite the printing point, whereupon the key 386 is actuated to tabulate the sub-carriage back toward the right, at the same time line spacing the sheet 477 so that when the sub-carriage is arrested at the end of its tabulating run the third or "department" block space in the column at the left of the warrant will be opposite the printing point and overlying the third column on the sheet 479 which, of course, remains unchanged as to location during the rightward tabulating run of the sub-carriage and the automatic line spacing of the sheet 477.

The operations above outlined are continued, enabling the entries in the fourth and fifth columns on the sheet 479 to be written simultaneously with the entries in the "code No." and "warrant No." block spaces on the sheet 477. Each writing operation after the first, it will be observed, has involved as a preliminary a tabulating movement of the sheet 479 toward the left along with a corresponding tabulating movement of the work sheet 477 toward the left, then a return tabulating movement of said sheet 477 toward the right, and also a line spacing or upward advance movement of the sheet 477. The position of the work sheets for the fifth writing operation is illustrated in Fig. 50. The writing in the fifth block space on the sheet 477 and in the fifth column on the sheet 479 having been completed, the decimal key 68 is again actuated, causing a tabulating run of the two carriages together toward the left and bringing the two work sheets into the relationship with the printing point indicated in Fig. 51. The name of the payee is next written on the sheet 477 and duplicated on the sheet or sheets 479. The amount of the warrant is next to be written in figures at the right of the "$" mark on the sheet 477 and duplicated in the "amount of warrant" column on the sheet 479. It will be observed that in the operations heretofore the numbers have not been written decimally or denominationally. In writing the amount, however, it is desirable to denominationalize, and accordingly as the next step the denominational key 68 corresponding with the amount to be written is actuated. In the present instance we have assumed the amount to be $100.50 and accordingly the fourth key 68 from the left is actuated, causing the carriages to move together toward the left until arrested with the "amount of warrant" column on the sheet 479 in the proper denominational position opposite the printing point as will be understood from Fig. 52. Although this operation brings the sheet 479 in proper position for writing the amount, the work sheet 477 is out of position both widthwise and lengthwise and two operations are necessary to locate it for writing opposite the "$" mark thereon. First the key or finger piece 318 is pulled forward to the limit of its movement, effecting a continuous retraction of the sheet 477, carrying it from the Fig. 52 to the Fig. 53 position with the result that the proper line on it is brought opposite the printing line on the platen. Next the left-hand tabulator key 381 is actuated, causing a tabulating movement of the sub-carriage from left to right and carrying the sheet 477 from the Fig. 53 to the Fig. 54 position but without line spacing it. The amount may then be written on the sheet 477, being duplicated on the sheet or sheets 479 in proper denominational position. Thereupon the finger piece 318 is swung back to normal position, effecting a continuous advance movement of the sheet 477 to the Fig. 55 position. Next the line space lever 287 is operated, line spacing the work sheet 477 and concurrently drawing the two carriages toward the right until they are arrested by the engagement of the margin stop 141 with the frame stop 142. As a result the work sheet 477 is positioned as in Fig. 56, being thus properly located for receiving the amount of the warrant written out in words under the "pay to" line. The actuation of the line space lever 287 as described has also effected through the lug 345 a disengagement of the detent devices 341 and 343, the result being that the type shield 322 has been automatically swung up behind the sheet 477 so as to cover the printing line, cutting out or shielding the manifold or record sheet or sheets 479 from the action of the types. Consequently when the amount is written in on the sheet 477 under the "pay to" line it will not be reproduced on the underlying sheet or sheets. After writing in the amount the line spacing handle 287 is again actuated, line spacing the sheet 477 and restoring it by a retraction of the main and sub-carriages to the right until arrested through the coöperation of the margin stops 141 and 142. This completes the typewriting on the sheet 477. Next the operator actuates the proper denominational key 68 for releasing the main carriage and bringing the sheet 479 in proper denominational position for writing in the first column to the right of the "amount of warrant" column thereon. This first or "A" column, together with the succeeding columns is, in the present instance, under the heading of "Distribution" and is intended to receive a fraction of the amount of the warrant as debited against a particular department. The writing in the "distribution" columns is done directly from the ribbon, the warrant itself, together with the carbon 482 having been moved wholly to the left of the printing point by the first tabulating run in reaching a column. During the tabulating run the roller 350 and the cam 349 become effective to automatically restore the shield 322 to inoperative position below the printing line so that the sheet 479 is clear to receive impressions from the types in the "distribution" columns. Opposite each distribution column on the sheet 479 as well as opposite the "amount of warrant" column thereon is preferably arranged an adding head 147 so that the amounts in these columns are automatically totalized as written. At the completion of the writing in the last distribution column the carriage is further moved to the left, causing the roll 251 to coöperate with the cam 253 to swing forward the deflector 224 and roller 233, thus releasing the sheet 477. This movement also causes the roll 175 to coöperate with the cam 177 to line space the sheet 479. Next the completed sheet 477 is removed, a fresh sheet or warrant 477 is inserted and the carriages restored toward the right to repeat the series of operations above outlined.

It will be perceived that during the entire series of operations above outlined the sheet 479 has been line spaced only once and consequently all of the entries on it up to this point have been in a single horizontal line across it. In other words, the data for each warrant occupies a single cross line on the record sheet although on the warrant itself such data comprises a number of entries written directly under one another in a vertical line or column and other entries at various line space positions to the right of this vertical line or column. When the record sheet therefor is finally completed or filled in it will contain the data of as many warrants, vouchers or original work sheets as there are lines on said record sheet.

It will be understood that the forms illustrated in Figs. 57 and 58, the filling in or writing whereof has just been explained in detail, exemplify only one combination out of many that might be employed, and also that such combination itself may be varied as may be desired by re-adjusting the mechanism or varying its operation. It will further be apparent that the mechanism with but slight re-arrangement and adjustment may be employed in writing commercial forms other than billing forms. For example, it may be employed to write a general salesmen's summary of sales of commodities having a main carriage sheet on which the names of the salesmen would appear vertically opposite each line and those of the commodities horizontally in the caption across the top of the form. The individual salesmen's sheets which would be controlled from the sub-carriage would be made to show a daily, weekly or monthly report as desired, having the commodities printed vertically at the left and the dates of the week or month horizontally in the caption at the top. As another example, mechanism in accordance with our invention might be employed in a manufacturing business in writing a distribution of requisitions for stock for different jobs in process of manufacture, posting on the sub-carriage form for the individual job while the main carriage form would classify the materials used in their proper column. The entire work would thus be summarized, the sub-carriage form showing the total amount of materials used for a particular day on a particular job, while the main carriage form would show the total amount of all materials used for all jobs. Furthermore, the invention may be adapted for use with adding mechanism in other arrangements than that illustrated, permitting of totalizing, sub-totalizing, cross footing, etc., in various combinations. In short, any character of work which may be written on individual sheets in the sub-carriage may be simultaneously duplicated on a summary or record sheet on the main carriage in which all of the various data would be properly classified. Furthermore it will be apparent that the invention as herein exemplified may be used in other ways than that set forth. For example, the platen may be used merely as a printing surface and without taking any part in the line spacing or adjustment of the work sheet, in which case the entire manipulation of the sheet would be taken care of from the sub-carriage. The sub-carriage being adapted for the front feeding or introduction of a sheet and being capable of taking in a sheet in a practically straight condition may be employed with heavy material which does not bend easily and which otherwise would be difficult to feed. In using the sub-carriage only as a paper carrier the work sheet would be placed in it and the regular marginal stops on the main carriage would be adjusted for the full line to be written on the sub-carriage form while the automatic feed roll release would be correspondingly adjusted. Thus using the mechanism the platen of the main carriage serves merely as an anvil or backing for the types when coöperating with the paper in the sub-carriage. From time to time the platen should be turned in order to distribute wear evenly over its surface and for the same reason the endwise relationship between it and the sub-carriage should be occasionally varied. Otherwise the relationship between the platen and the sub-carriage is not changed during the use of the sub-carriage alone as a paper support or carrier. Furthermore the main carriage and the platen might be employed for writing on wide sheets without regard to the sub-carriage which would not interfere at all with the use of the main carriage when employed in this way.

Other uses and modes of use will suggest themselves to those skilled in the art; and various constructional changes may be made without departing from our invention.

Some of the features herein disclosed form the subject-matter of divisional applications as follows:—Serial No. 764,782, filed May 1, 1913; Serial No. 767,203, filed May 12, 1913; Serial No. 767,204, filed May 12, 1913; Serial No. 767,529, filed May 14, 1913.

What we claim as new and desire to secure by Letters Patent, is:—

1. In a typewriting machine, the combination of a main frame for typewriting machines comprising a base, pairs of posts or uprights having extended foot portions detachably secured to the base and top plate sections secured to said pairs of posts, a carriage rail fixed to each of said sections, and a carriage supported on said rails.

2. In a typewriting machine, the combination of a main frame for typewriting machines comprising a rectangular base, pairs of posts or uprights provided with angularly disposed extensions screwed to the base, and top plate sections secured to said pairs of posts, a carriage rail fixed to each of said sections, and a carriage supported on said rails.

3. In a typewriting machine, the combination of a main frame for typewriting machines comprising a base and a plurality of upright members arranged in pairs, the members of each pair being at opposite sides of the machine, the members of one pair each comprising single vertical portions and the members of another pair each comprising two vertical portions and a web or cross bar connecting said vertical portions, top plate sections one connecting each pair of members, carriage rails one fixed to each of said top plate sections, and a carriage supported on said rails.

4. A main frame for typewriting machines comprising a rectangular base, and upright members secured at the sides of said base, certain of said upright members each comprising two vertical posts and U-shaped webs connecting said posts near their upper ends and extending inward toward each other.

5. A main frame for typewriting machines comprising a rectangular base, two rear posts each having angularly extending foot portions screwed to the base, two front posts each having an inwardly extending foot portion screwed to the base, and two intermediate posts screwed to the sides of the base and connected to the front posts by integral web portions.

6. A main frame for typewriting machines comprising a rectangular base, two rear posts each having angularly extending foot portions screwed to the base, two front posts each having an inwardly extending foot portion screwed to the base, two intermediate posts screwed to the sides of the base and connected to the front posts by integral web portions, a rear top plate connecting the rear posts, and two forward top plates one on each of said forward posts and its companion intermediate post.

7. A main frame for typewriting machines comprising a rectangular base, two rear posts detachably secured thereto, a rear top plate connecting the tops of said posts, two front posts detachably secured to the base, two posts one at each side intermediate the associate front and rear posts and detachably secured to the base, and two top plates one connecting each front post with its associate intermediate post.

8. In a typewriting machine and in tabulating mechanism, the combination of key controlled denominational levers, and carriage releasing devices comprising two rocking frames, a pair of parallel links connecting said frames, and a universal bar carried by said links and operative directly by said denominational levers.

9. In a typewriting machine and in tabulating mechanism, the combination of key controlled denominational levers, and carriage releasing devices comprising two rocking frames, a pair of parallel links connecting said frames, a universal bar carried by said links and operative directly by said denominational levers, a releasing lever, and devices connecting said releasing lever to one of said rocking frames.

10. In a typewriting machine, the combination of a carriage; a platen thereon; a spring drum; a spring drum strap; paper feeding devices comprising a rock shaft, a paper plate or guide, tabulating devices comprising a stop bar, and a bracket device secured to said carriage and constituting a bearing for said rock shaft, a connection for said strap, a support for said paper plate, and also constituting a support for said stop bar.

11. In a typewriting machine, the combination of a carriage; a platen thereon; a spring drum; a spring drum strap; paper feeding devices comprising a rock shaft, a paper plate or guide, tabulating devices comprising a stop bar; and a pair of bracket devices secured to said carriage, said bracket devices constituting end supports or bearings for said rock shaft, for said paper plate and for said stop bar, one of said brackets also providing a connection between the carriage and said strap.

12. In a typewriting machine, the combination of a platen carrier, a platen thereon, a paper table on said carrier, a tabulator stop bar on said carrier, angular bracket members on said carrier, said bracket members assisting to support said paper table intermediate its ends and also assisting to support said stop bar intermediate its ends, and means for supporting the end portions of said table and said bar.

13. In a typewriting machine, the combination of a traveling carriage, a support arranged above said carriage, and means for movably suspending said carriage from and below said support, said means comprising a plurality of rollers having vertical axes of rotation.

14. In a typewriting machine, the combination of a traveling carriage element, a carriage supporting element, and a bearing connection by which said carriage element is suspended from said supporting element, said bearing connection comprising a plurality of rollers on one of said elements, said rollers having vertical axes and coöperating with oppositely facing grooves in the other element, each roller coöperating with one only of said grooves.

15. In a typewriting machine, the combination of a traveling carriage, a second traveling carriage arranged above the same, and a roller bearing by which said first named carriage is suspended from and below said second traveling carriage.

16. In a typewriting machine, the combination of a traveling carriage, a track-way arranged above the same, and connections between said carriage and said track-way and by which said carriage is suspended below said support, said connections comprising a plurality of horizontally arranged rollers on said carriage, each roller coöperating with one of a pair of oppositely facing grooves in said track-way, one of said rollers coöperating with one of said grooves and the next succeeding roller coöperating with the oppositely fixed grooves in the other element, each roller coöperating with one only of said grooves, successive rollers coöperating with the grooves at opposite sides.

17. In a typewriting machine, the combination of a traveling carriage, a second carriage provided with a grooved track-way arranged above the same, and a roller bearing connecting said first named carriage with said track-way and by which said carriage is suspended from said second carriage.

18. In a typewriting machine, the combination of a traveling carriage, a second carriage provided with a grooved track-way arranged above the same, and a roller bearing mounted on said first named carriage and coöperating with said track-way, said bearing providing a three-point connection by which said carriage is suspended from said second carriage.

19. In a typewriting machine, the combination of a main traveling carriage provided with a track-way grooved along its underside, a sub-carriage arranged below said track-way, and a plurality of roller bearings mounted on said sub-carriage and coöperating with said track-way, said sub-carriage being thereby suspended from said main carriage.

20. In a typewriting machine, the combination of a traveling element, a supporting element therefor, and means connecting said elements comprising a bearing device, said bearing device comprising a wheel provided with an internal groove, balls arranged in said groove, a screw provided with a coned head coöperating with said balls, and nuts for clamping said screw to its supporting element, one of said nuts being coned to coöperate with said balls, the coned head and the coned nut providing a ball race and the construction affording an adjustable setting of the opposite sides of the ball race.

21. In a typewriting machine, the combination of a traveling carriage, a supporting carriage provided with a track-way arranged above the first named carriage and grooved along its under side, and a plurality of ball bearing wheels mounted on said first named carriage and coöperative with said track-way whereby the first named carriage is suspended from and below said supporting carriage.

22. In a typewriting machine, the combination of a traveling carriage, a supporting carriage provided with a track-way slotted along its under side, the opposite faces of the slot being formed with V-grooves, and a plurality of ball bearing wheels mounted on said first named carriage and rounded at their peripheries to coöperate with said V-grooves, said wheels and said grooves coöperating to suspend said first named carriage from and below said supporting carriage.

23. In a typewriting machine, the combination of a main carriage supporting a work sheet, a sub-carriage mounted on the main carriage, and also supporting a work sheet, roller bearings for the main carriage, and roller bearings for the sub-carriage.

24. In a typewriting machine, the combination of two carriages each supporting a work sheet in position for printing, and means on one of said carriages affording a support for the other carriage.

25. In a typewriting machine, the combination of two carriages each supporting a work sheet in position for printing, means on one of said carriages affording a support for the other carriage, said carriages being relatively movable, and means for maintaining said carriages in set relationship endwise of each other.

26. In a typewriting machine, the combination of two carriages each supporting a work sheet, means on one of said carriages affording a support for the other carriage, and means for maintaining said carriages in set relationship endwise of each other and for affording variation in such set relationship.

27. In a typewriting machine, the combination of a main carriage and a sub-carriage suspended from and below the same, and detent devices for maintaining said carriages in a set relationship endwise of each other.

28. In a typewriting machine, the combination of a main carriage and a sub-carriage suspended from the same, and detent devices for maintaining said carriages in a set relationship endwise of each other, said detent devices being releasable to afford a variation in such set relationship.

29. In a typewriting machine, the combination of a traveling paper carriage, a second traveling paper carriage connected to the first named paper carriage, each of said carriages supporting a work sheet, and detent devices for maintaining a fixed relationship between said carriages.

30. In a typewriting machine, the combination of a traveling paper carriage, a second traveling paper carriage connected to the first named paper carriage, each of said carriages supporting a work sheet, and detent devices for maintaining a fixed relationship between said carriages, said detent devices comprising a rack bar on one of said carriages and a coöperating pawl on the other carriage.

31. In a typewriting machine, the combination of two traveling carriages each supporting a work sheet, a single set of printing instrumentalities for writing on said work sheets, carriage motors one connected to each carriage and constantly tending to draw said carriages in opposite directions, and connections between said carriages.

32. In a typewriting machine, the combination of two traveling carriages, carriage motors one connected to each carriage and constantly tending to draw said carriages in opposite directions, and releasable devices for maintaining a fixed relationship between said carriages.

33. In a typewriting machine, the combination of two traveling carriages each supporting a work sheet, a single set of printing instrumentalities for writing on said work sheets, two carriage motors one connected to each carriage, and connections between said carriages.

34. In a typewriting machine, the combination of two traveling carriages, and two carriage motors one connected to each carriage, the motor for one of said carriages being mounted on the other carriage.

35. In a typewriting machine, the combination of a traveling carriage, a second carriage, a motor for the first recited carriage mounted on the frame of the machine, and a motor for the second carriage mounted on the first recited carriage.

36. In a typewriting machine, the combination of two traveling carriages each supporting a work sheet, a single set of printing instrumentalities for writing on said work sheets, two spring drums one for each carriage, flexible connections between said spring drums and their carriages, and connections between said carriages.

37. In a typewriting machine, the combination of two traveling carriages, two spring drums one for each carriage, flexible connections between said spring drums and their carriages, the spring drum for one carriage being mounted on the other carriage, and connections between said carriages.

38. In a typewriting machine, the combination of two traveling carriages, two spring drums one for each carriage, flexible connections between said spring drums and their carriages, one of said spring drums being on the frame of the machine and the other spring drum being mounted on one of said carriages, and connections between said carriages.

39. In a typewriting machine, the combination of two traveling carriages, two opposing spring drums one for each carriage, flexible connections between said spring drums and their carriages, one of said spring drums being mounted on the frame of the machine and the other spring drum being mounted on one of said carriages, and detent devices connecting said carriages.

40. In a typewriting machine, the combination of two traveling carriages; two spring drums one for each carriage; flexible connections between said spring drums and their carriages, one of said spring drums being on the frame of the machine and the other spring drum being mounted on one of said carriages; and detent devices connecting said carriages, said detent devices comprising a rack bar on one carriage and a coöperating pawl on the other carriage.

41. In a typewriting machine, the combination of two carriages each supporting a work sheet, means on one carriage affording a support for the other carriage, and two carriage motors one connected to each carriage.

42. In a typewriting machine, the combination of two carriages, means on one carriage affording a support for the other carriage, two carriage motors one connected to each carriage and tending to draw them in opposite directions, and connections between said carriages to maintain them in a set relationship.

43. In a typewriting machine, the combination of two carriages each supporting a work sheet, means on one carriage affording a support for the other carriage, two carriage motors, one connected to each carriage, and releasable detent devices connecting said carriages.

44. In a typewriting machine, the combination of two carriages each supporting a work sheet, means on one of said carriages affording a support for the other carriage, said carriages being relatively movable, means for maintaining said carriages in set relationship endwise of each other, and two motors one for each carriage.

45. In a typewriting machine, the combination of two carriages each supporting a work sheet, said carriages being relatively movable and one mounted on the other, means for maintaining said carriages in set relationship endwise of each other and for affording variation in such set relationship, a carriage motor tending constantly to draw one carriage in one direction and a second carriage motor tending constantly to draw the other carriage in the opposite direction.

46. In a typewriting machine, the combination of two carriages each supporting a work sheet, means on one of said carriages affording a support for the other carriage, a carriage motor connected to one carriage and tending constantly to draw it in one direction, and a carriage motor for the other carriage tending constantly to draw it in the opposite direction.

47. In a typewriting machine, the combination of a main paper carriage, a sub-paper carriage supported on the main paper carriage, detent devices for maintaining said carriages in set relationship, carriage motors one connected to each carriage and constantly tending to draw said carriages in opposite directions, and connections between said carriages.

48. In a typewriting machine, the combination of a main paper carriage, a sub-paper carriage supported on the main paper carriage, detent devices for maintaining said carriages in set relationship, carriage motors, one connected to each carriage, connections between said carriages, and key controlled escapement mechanism connected to one of said carriages.

49. In a typewriting machine, the combination of two traveling carriages one mounted on the other, and two carriage motors one connected to each carriage, the motor for one of said carriages being mounted on the other carriage.

50. In a typewriting machine, the combination of a traveling carriage, a second carriage mounted on said traveling carriage, a motor for said traveling carriage mounted on the frame of the machine, and a motor for said second carriage mounted on said traveling carriage.

51. In a typewriting machine, the combination of a traveling carriage, a second carriage mounted on said traveling carriage, a motor for said traveling carriage mounted on the frame of the machine, a motor for said second carriage mounted on said traveling carriage, and releasable detent devices connecting the two carriages to compel the second carriage to move in one direction with the first recited carriage.

52. In a typewriting machine, the combination of a traveling carriage, a second carriage mounted on said traveling carriage, a motor for said traveling carriage mounted on the frame of the machine, a motor for said second carriage mounted on said traveling carriage, releasable detent devices connecting the two carriages, and key controlled step-by-step feeding devices connected to and operative on said traveling carriage.

53. In a typewriting machine, the combination of a traveling carriage, a second carriage mounted on said traveling carriage, a motor for said traveling carriage mounted on the frame of the machine, a motor for said second carriage mounted on said traveling carriage, releasable detent devices on the two carriages and connecting them, and key controlled letter feeding devices associated with said traveling carriage.

54. In a typewriting machine, the combination of two traveling carriages one supported on the other, each of said carriages supporting a work sheet, two spring drums one for each carriage, flexible connections between said spring drums and their respective carriages, and connecting devices between said carriages.

55. In a typewriting machine, the combination of two traveling carriages one supported on the other, two spring drums one for each carriage, flexible connections between said spring drums and their respective carriages, the spring drum for one carriage being mounted on the other carriage, and connections on and between said carriages.

56. In a typewriting machine, the combination of two traveling carriages one supported on the other, two spring drums one for each carriage, flexible connections between said spring drums and their respective carriages, one of said spring drums being mounted on the frame of the machine and the other spring drum being mounted on one of said carriages, and detent devices connecting said carriages.

57. In a typewriting machine, the combination of two traveling carriages, roller bearing connections through which one of said carriages is movably mounted on the other, two spring drums one for each carriage, flexible connections between said spring drums and their respective carriages, one of said spring drums being mounted on the frame of the machine and the other spring drum being mounted on one of said carriages, and detent devices connecting said carriages and comprising a rack bar on one carriage and a coöperating pawl on the other carriage.

58. In a typewriting machine, the combination of two traveling carriages, roller bearing connections through which one of said carriages is movably mounted on the other, two spring drums one for each carriage, flexible connections between said spring drums and their respective carriages, one of said spring drums being mounted on the frame of the machine and the other spring drum being mounted on one of said carriages, said spring drums tending constantly to draw their respective carriages in opposite directions, and releasable detent devices between said carriages.

59. In a typewriting machine, the combination of two traveling carriages, roller bearing connections through which one of said carriages is movably mounted on the other, two spring drums one for each carriage, flexible connections between said spring drums and their respective carriages, one of said spring drums being mounted on the frame of the machine and the other spring drum being mounted on one of said carriages, said spring drums tending constantly to draw their respective carriages in opposite directions, releasable detent devices on the two carriages and connecting them, and key controlled letter feeding devices associated with one of said carriages.

60. In a typewriting machine, the combination of two paper carriages, a flexible connection between said carriages, and detent devices also connecting said carriages.

61. In a typewriting machine, the combination of two carriages one mounted on the other, a flexible connection between said carriages and connecting them to move together in one direction, and detent devices connecting said carriages to move together in the opposite direction.

62. In a typewriting machine, the combination of two carriages one mounted on the other, a flexible connection between said carriages, and detent devices also connecting said carriages, said detent devices being disconnectible to permit a variation in the relationship between said two carriages through said flexible connection.

63. In a typewriting machine, the combination of two carriages, a connection between them and constantly tending to vary their relationships, and means normally preventing such variation.

64. In a typewriting machine, the combination of two carriages, means tending constantly to vary the relationship between said carriages, and means normally preventing such variation.

65. In a typewriting machine, the combination of two carriages, means tending constantly to vary the relationship between said carriages, and releasable detent devices normally preventing such variation.

66. In a typewriting machine, the combination of two carriages; means tending constantly to vary the relationship between said carriages; and means normally preventing such variation, said last named means comprising a rack on one carriage and a coöperating pawl on the other.

67. In a typewriting machine, the combination of two carriages; means tending constantly to vary the relationship between said carriages; and detent devices normally preventing such variation comprising a rack on one carriage and a coöperating pawl on the other, said rack and pawl being disconnectible to permit said means to become effective.

68. In a typewriting machine, the combination of two carriages; means comprising a spring motor tending constantly to vary the relationship between said carriages; and means normally preventing such variation comprising a rack on one carriage and a coöperating pawl on the other, said pawl being disconnectible from said rack to permit said motor to become effective.

69. In a typewriting machine, the combination of two carriages; one of said carriages being mounted on the other; means tending constantly to vary the relationship between said carriages, said means comprising a spring motor on one carriage and a strap or cord connecting said motor with the other carriage; and detent means normally preventing such variation in the relationship, said detent means comprising a releasable pawl and rack connection between the two carriages.

70. In a typewriting machine, the combination of two carriages; means tending constantly to vary the relationship between said carriages, said means comprising a spring motor on one carriage and a strap or cord connecting said motor with the other carriage; detent means normally preventing such variation in relationship, said detent means comprising a releasable pawl and rack connection between the two carriages; and key controlled letter feeding devices associated with one of said carriages.

71. In a typewriting machine, the combination of a main carriage, a sub-carriage mounted on said main carriage, key controlled letter feeding devices for said main carriage, a spring drum on said main carriage, a strap or cord connecting said spring drum with said sub-carriage, said spring drum tending constantly to vary the relationship between said carriages, and detent devices normally preventing such variation in relationship.

72. In a typewriting machine, the combination of a main carriage; a sub-carriage mounted on said main carriage; key controlled letter feeding devices for said main carriage; a spring drum on said main carriage; a strap or cord connecting said spring drum with said sub-carriage, said spring drum tending constantly to vary the relationship between said carriages; and detent devices normally preventing such variation in relationship, said detent devices comprising a rack on the main carriage and a pawl on the sub-carriage normally engaging with said rack but disconnectible therefrom to permit said spring drum to become effective.

73. In a typewriting machine, the combination of a main carriage, a sub-carriage, roller bearing devices whereby said sub-carriage is supported on said main carriage, printing instrumentalities, escapement devices for said main carriage controlled by the printing keys, a spring drum on the main carriage, connections between said spring drum and the sub-carriage, and releasable detent devices between said main and sub-carriages.

74. In a typewriting machine, the combination of a main carriage, a sub-carriage, roller bearing devices whereby said sub-carriage is supported on said main carriage, printing instrumentalities, escapement devices for said main carriage controlled by the printing keys, a spring drum on the main carriage, connections between said spring drum and the sub-carriage, a rack on the main carriage, and a disconnectible pawl on the sub-carriage normally engaging said rack and opposing the action of said spring drum.

75. In a typewriting machine, the combination of a releasable carriage, a second carriage supporting said releasable carriage, each of said carriages supporting a work sheet, and tabulating mechanism for said releasable carriage.

76. In a typewriting machine, the combination of two carriages each supporting a work sheet, means on one of said carriages affording a support for the other carriage, and tabulating mechanism for one of said carriages.

77. In a typewriting machine, the combination of two traveling carriages, carriage motors one connected to each carriage and constantly tending to draw said carriages in opposite directions, connections between said carriages, and tabulating mechanism effective to release one of said carriages for a tabulating run in opposition to one of said motors.

78. In a typewriting machine, the combination of a traveling carriage, a second carriage, a motor for the first recited carriage mounted on the frame of the machine, a motor for the second carriage mounted on the first recited carriage, and tabulating mechanism for the first recited carriage.

79. In a typewriting machine, the combination of two traveling carriages, each supporting a work sheet, two spring drums one for each carriage, flexible connections between said spring drums and their carriages, connections between said carriages, and denominational tabulating mechanism for one of said carriages.

80. In a typewriting machine, the combination of a carriage, a support thereon for a work sheet, coöperating pressure rolls for feeding said work sheet, a backing or platen for said work sheet, and a movable support for said platen on which said platen is itself movably mounted, said support and said carriage being relatively movable endwise of each other.

81. In a typewriting machine, the combination of a carriage, a support thereon for a work sheet, coöperating pressure rolls for feeding said work sheet, a second carriage, and a platen on said second carriage for said work sheet.

82. In a typewriting machine, the combination of a carriage, a support thereon for a work sheet, coöperating pressure rolls for feeding said work sheet, a platen for said work sheet supported independently of said carriage but traveling with said carriage during letter feed movements, and means for varying the normal position of said platen, said work sheet remaining quiescent during such variation.

83. In a typewriting machine, the combination of a carriage, a support thereon for holding and guiding a work sheet, coöperating pressure rolls for feeding said work sheet, and a rotatable platen supported independently of said work sheet support, said platen backing said work sheet constantly throughout the entire printing line and being rotatable in a direction transversely of the printing line.

84. In a typewriting machine, the combination of a carriage, a support thereon for a work sheet, coöperating pressure rolls for feeding said work sheet, a platen for said work sheet mounted independently of said carriage, and means for affording a variation in the normal position of said platen lengthwise of said work sheet.

85. In a typewriting machine, the combination of a carriage, a support thereon for a work sheet, coöperating pressure rolls for feeding said work sheet, a platen for said work sheet mounted independently of said carriage, means for affording a variation in the lengthwise relationship of said platen with respect to said work sheet, and means for rotating said platen independently of said work sheet.

86. In a typewriting machine, the combination of a carriage, a support thereon for a work sheet, coöperating pressure rolls for feeding said work sheet, a platen for said work sheet, means for affording adjustment of said platen independently of said work sheet, said work sheet being adjustable independently of said platen, said platen moving to correspond with letter feed movements of said carriage.

87. In a front-strike typewriting machine, the combination of a platen, a traveling carriage, said platen being supported independently of said carriage, and said platen and said carriage being mounted for relative movement with respect to each other lengthwise of the printing line, said platen traveling with said carriage during letter feed movements, a paper support on said carriage, and paper feeding devices on said carriage.

88. In a front-strike typewriting machine, the combination of a platen movable lengthwise of the printing line, a work sheet carrier mounted for movement lengthwise of the printing line independently of said platen and arranged below the same, and paper feeding devices on said carrier.

89. In a front-strike typewriting machine, the combination of a carriage, a rotary platen thereon, a second carriage, and paper controlling devices on said second carriage adapted to receive paper inserted downwardly from the front and further adapted to feed the paper upward over the front face of said platen.

90. In a typewriting machine, the combination of a platen, a paper basket extending downward from the platen and terminating in a forwardly and upwardly curved portion, and a flexible finger on said upwardly curved portion coöperative with the face of said basket to maintain the paper thereagainst and guide it between said basket and the end of its upwardly curved portion.

91. In a typewriting machine, the combination of a carriage element, a supporting element on which said carriage element is movable, a paper controlling device on one of said elements, a release key for said devices on the other element, and a connection between said key and said device variable with the change in relationship due to the relative movement of said elements.

92. In a typewriting machine, the combination of a carriage, a support therefor, said carriage being arranged for movement relative to its support, paper controlling devices on said carriage, a release key on said support, and connections between said key and certain of said devices, said connections being variable with the change in relationship between said carriage and its support.

93. In a typewriting machine, the combination of a carriage element, a supporting element on which said carriage is movable, a paper feed roller on one of said elements, a release key for said feed roller on the other element, and a connection between said key and said feed roller.

94. In a typewriting machine, the combination of a carriage element, a supporting element on which said carriage is movable, a releasable paper controlling device on one of said elements, a release key on the other element, and a connection between said key and said device comprising a shaft and a member having a slidable engagement with said shaft.

95. In a typewriting machine, the combination of a carriage element, a supporting element on which said carriage is movable, a releasable paper controlling device on one of said elements, a release key on the other element, a shaft on which said key is mounted, and a sleeve or hollow shaft upon which said device is mounted, said sleeve and said shaft being slidably connected.

96. In a typewriting machine, the combination of a carriage element, a supporting element on which said carriage is movable; a releasable paper controlling device on one of said elements; a release key on the other element; and a connection between said key and said device comprising a squared shaft on which said key is mounted, a hollow shaft surrounding said squared shaft and on which said device is mounted, and a bushing fixed to said hollow shaft and provided with a squared opening slidably engaging with said squared shaft.

97. In a typewriting machine, the combination of a carriage, a support therefor, said carriage being arranged for movement relative to its support, a hollow shaft on said carriage, a feed-roll supporting-frame fixed to said shaft, a feed roll on said frame, a second shaft extending through said hollow shaft and mounted on said support, the two shafts being slidably connected, and a release key connected to said second shaft.

98. In a typewriting machine, the combination of a traveling carriage, a rocking frame thereon, a paper guide plate on said frame, a pressure roller also mounted on said frame, and means for automatically rocking said frame during endwise movements of the carriage to move said guide plate and said feed roller to abnormal positions to facilitate the introduction of the paper.

99. In a typewriting machine, the combination of a traveling carriage; a rocking frame thereon, a paper guide plate on said frame; a pressure roller also mounted on said frame; and means for automatically rocking said frame during endwise movements of the carriage to move said guide plate and said feed roller to abnormal positions to facilitate the introduction of the paper, said means comprising an arm rigid on said rocking frame, and a coöperative cam adjustable on a stationary support.

100. In a typewriting machine, the combination of a traveling carriage, a shaft thereon, arms rigid on said shaft, paper guide plates secured to said arms, a pressure roller rotatably mounted on said arms, spring means constantly tending to turn said shaft in one direction, a third arm rigid on said shaft, and a stationary cam coöperative with said third arm to turn said shaft in a direction opposite to said spring means.

101. In a typewriting machine, the combination of a carriage; a support therefor, said carriage being mounted to travel on said support; a hollow shaft on said carriage; a frame on said shaft; a guide plate on said frame; a feed roller on said frame; a second shaft extending through said hollow shaft and mounted on said support, the two shafts being slidably connected; a release key on said hollow shaft operative at will on said frame; and automatically operating means for moving said frame connected to said hollow shaft and comprising an arm fixed to said shaft, and a stationary adjustable cam.

102. In a typewriting machine, the combination of a carriage; a second or supporting carriage on which carriage the first recited carriage is mounted to travel; a hollow shaft on said first recited carriage; a frame on said shaft; a guide plate on said frame; a feed roller on said frame; a second shaft extending through said hollow shaft and mounted on said supporting carriage, the two shafts being slidably connected; a release key on said second shaft operative on said frame at will; and automatically operating releasing means effective on said hollow shaft and comprising an arm fixed to said shaft, and a stationary adjustable cam.

103. In a typewriting machine, the combination of a carriage, a supporting carriage on which said first named carriage is mounted to travel, a hollow shaft on said first named carriage, a frame on said shaft, a guide plate on said frame, a feed roller on said frame, a second shaft extending through said hollow shaft and mounted on said supporting carriage, the two shafts being slidably connected, hand operated releasing means connected to one of said shafts, and automatically operating releasing means connected to the other shaft.

104. In a typewriting machine, the combination of a carriage, a second carriage on which the first carriage is supported, each of said carriages being movable independently of the other, a shaft on the first recited carriage, a supporting frame secured to said shaft, a paper controlling device on said frame, a second shaft mounted on said second carriage, the two shafts being slidably connected, a manual release key connected to one of said shafts, and automatic releasing devices connected to the other of said shafts.

105. In a typewriting machine, the combination of a carriage, a second carriage on which the first carriage is supported, each of said carriages being movable independently of the other, a shaft on the first recited carriage, a supporting frame secured to said shaft, a feed roller on said frame, a second shaft mounted on said second carriage, a manual release key connected to one of said shafts, and automatic releasing devices connected to the other of said shafts, said second shaft extending through said first shaft and said first shaft being provided with a device which communicates rotary movement to it from said second shaft.

106. In a typewriting machine, the combination of a carriage element, a support on which said carriage is adapted to travel, a releasable paper controlling device on one of said elements, a release key for said device on the other element, and means for actuating said device to feed paper, said means being operative from said support.

107. In a typewriting machine, the combination of a carriage, a second carriage on which the first carriage is supported, the two carriages being relatively movable, a paper feeding device on one carriage, and key connections to the other carriage adapted at all times to actuate said device to feed paper.

108. In a typewriting machine, the combination of a traveling carriage, a second carriage on which said traveling carriage is mounted, the carriages being relatively movable, a paper feed roller on one carriage, a finger piece on the other carriage, and connections from said finger piece to said roller for enabling said finger piece to turn said roller to cause it to feed paper, said connections varying with changes in the relationship between the two carriages.

109. In a typewriting machine, the combination of a carriage, a support on which said carriage is adapted to travel, a paper feeding device on said carriage, a hand device on said support, and connections from said hand device to said feeding device for operating the latter, said connections comprising a shaft on said support connected to said hand device, said shaft being slidably connected to said paper feeding device.

110. In a typewriting machine, the combination of a carriage, a support on which said carriage is adapted to travel, a paper feed roller on said carriage, a shaft extending through said feed roller and mounted on said support, a finger piece connected to said shaft and having an unvarying normal position on said support, and slidable connections between said shaft and said feed roller.

111. In a typewriting machine, the combination of a carriage, a support on which said carriage is adapted to travel, a paper feed roller on said carriage, a second shaft extending through said feed roller and mounted on said support, a key device connected to said shaft, and a bushing or collar fixed to said feed roller and provided with a square opening slidably engaging said shaft.

112. In a typewriting machine, the combination of a carriage, a support on which said carriage is adapted to travel, a paper feeding device on said carriage, an operating shaft for said device mounted on said support, and a plurality of means separately operative to actuate said shaft.

113. In a typewriting machine, the combination of a carriage, a support on which said carriage is adapted to travel, a paper feeding device on said carriage, an operating shaft for said device mounted on said support, and independent actuating devices connectible to opposite ends of said shaft.

114. In a typewriting machine, the combination of a carriage, paper feeding devices thereon, a second carriage, and paper feeding devices on said second carriage operative from the first named carriage.

115. In a typewriting machine, the combination of a carriage, paper feeding devices thereon, means on said carriage for operating said paper feeding devices to feed a work sheet, a second carriage, separate means on said second carriage for feeding another work sheet, and an actuating device on said first named carriage for said separate means.

116. In a typewriting machine, the combination of a carriage, paper feeding devices thereon, means on said carriage for operating said paper feeding devices to feed a work sheet, a second carriage, separate means on said second carriage for feeding another work sheet, and an actuating device on said first named carriage for said separate means, said actuating device being also effective concurrently to move said first named carriage.

117. In a typewriting machine, the combination of a carriage, paper feeding devices thereon, means on said carriage for operating said paper feeding devices to feed a work sheet, a second carriage mounted on the first named carriage, separate means on said second carriage for feeding another work sheet, and an actuating device on said first named carriage for said separate means, said actuating device being also effective to move the first named carriage and through it to move also said second carriage.

118. In a typewriting machine, the combination of a carriage, a support on which said carriage travels, a shaft mounted on said support, a feed roller surrounding said shaft but adapted to travel with said carriage independently of said shaft, connections between said feed roller and said shaft, a finger wheel on said shaft for turning it, and pawl and ratchet devices on said support also effective to turn said shaft.

119. In a typewriting machine, the combination of a carriage, a support on which said carriage travels, a shaft mounted on said support, a feed roller surrounding said shaft but adapted to travel with said carriage independently of said shaft, connections between said feed roller and said shaft, a finger wheel on said shaft for turning it, pawl and ratchet devices on said support also effective to turn said shaft to advance the paper progressively step by step, and other pawl and ratchet devices also effective on said shaft to advance the paper continuously to a predetermined extent.

120. In a typewriting machine, the combination of two traveling carriages, one mounted on the other, a feed roller adapted to travel with one carriage, a shaft passing through the feed roller and supported on the second carriage, connections through which said shaft turns said feed roller, a finger wheel for turning said shaft, and pawl and ratchet devices for turning said shaft mounted on said second carriage.

121. In a typewriting machine, the combination of two traveling carriages, one mounted on the other, a feed roller adapted to travel with one carriage, a shaft passing through the feed roller and supported on the second carriage, connections enabling said shaft to turn said feed roller, a finger wheel for turning said shaft, hand actuated pawl and ratchet devices mounted on said second carriage for turning the feed roller progressively step by step, and other pawl and ratchet line spacing devices effective on said shaft to turn the feed roller to advance the paper continuously either backward or forward to a predetermined extent.

122. In a typewriting machine, the combination of two traveling carriages, two sets of paper feeding devices one associated with each carriage, said sets of devices being operative to advance their respective work sheets independently of each other, and a single set of printing instrumentalities coöperative with said work sheets.

123. In a typewriting machine, the combination of two traveling carriages, two sets of paper feeding devices one associated with each carriage, said sets of devices being operative to advance their respective work sheets independently of each other, means for effecting relative movement of said carriages to change the relationship between said work sheets lengthwise of the printing line, and a single set of printing instrumentalities coöperative with said work sheets.

124. In a typewriting machine, the combination of two traveling paper supports, means for controlling said supports to vary the relationship between the work sheets thereon lengthwise of the printing line, and a single set of printing instrumentalities coöperative with said work sheets.

125. In a typewriting machine, the combination of two paper supports, means on each support for controlling a work sheet, the two work sheets being superposed, and means for varying the relationship between said supports to vary the relationship of said work sheets lengthwise of the printing line.

126. In a typewriting machine, the combination of two traveling paper supports one mounted on the other, and means for controlling said supports to vary the relationship of the work sheets thereon lengthwise of the printing line.

127. In a typewriting machine, the combination of two traveling paper supports one mounted on the other, means for guiding work sheets on said supports in superposed relationship, and means for controlling said supports to vary the relationship of said work sheets lengthwise of the printing line.

128. In a typewriting machine, the combination of two traveling paper supports carrying separate work sheets, means for varying the relationship between said work sheets in two directions, and a single set of printing instrumentalities coöperative with said work sheets.

129. In a typewriting machine, the combination of two traveling paper supports, two sets of paper controlling means, one set on each support, means for varying the relationship between said supports to vary the relationship in one direction of the work sheets controlled respectively by said sets of means, said sets of paper controlling means being controllable to vary the relationship between said work sheets in another direction, and a single set of printing instrumentalities coöperative with said work sheets.

130. In a typewriting machine, the combination of two traveling paper supports, one mounted on the other, paper controlling means on each support for separate work sheets, said work sheets being maintained in superposed relationship, and means for varying the relationship between said supports to vary the relationship of the respective work sheets in one direction, said paper controlling means being controllable to vary the relationship between said work sheets in another direction.

131. In a typewriting machine, the combination of a traveling carriage, a platen thereon, means for feeding a work sheet over said platen, a second traveling carriage supporting an independent work sheet, means for moving said second carriage to change the relationship of said independent work sheet to the first named work sheet, and a single set of printing instrumentalities coöperative with said work sheets.

132. In a typewriting machine, the combination of a traveling carriage, a platen thereon, means for feeding a work sheet over said platen, a second traveling carriage supporting an independent work sheet, means for controlling said independent work sheet to change its relationship to the first work sheet, and a single set of printing instrumentalities coöperative with said work sheets.

133. In a typewriting machine, the combination of a carriage, a platen thereon, means for guiding a work sheet on said carriage over the printing face on said platen, a second carriage, means thereon for guiding an independent work sheet over the printing face of said platen, and means for varying the relationship of the respective work sheets to said platen.

134. In a typewriting machine, the combination of a traveling carriage, means for line spacing a work sheet supported thereby, a second traveling carriage, means for line spacing another work sheet supported by said second traveling carriage, and a single set of printing instrumentalities coöperative with said work sheets.

135. In a typewriting machine, the combination of a traveling carriage, a platen thereon, line spacing means for advancing over the platen a work sheet carried by said carriage, a second traveling carriage, and line spacing means for advancing over said platen another and different work sheet supported on said second carriage.

136. In a typewriting machine, the combination of a traveling carriage, a rotary platen thereon, line spacing means on said carriage for turning said platen and advancing over it a work sheet carried by said carriage, a second traveling carriage, other line spacing means for line spacing another work sheet carried by said second carriage, said other line spacing means being operative from said first named traveling carriage, and a single set of printing instrumentalities coöperative with said work sheets.

137. In a typewriting machine, the combination of a traveling carriage, a rotary platen thereon, line spacing means on said carriage for turning said platen and advancing over it a work sheet carried by said carriage, a second traveling carriage, and other line spacing means for line spacing a second work sheet carried by said second carriage, said other line spacing means comprising a key or finger piece on said first named traveling carriage, said finger being operative to advance said second work sheet over said platen.

138. In a typewriting machine, the combination of a traveling carriage, a rotary platen thereon, line spacing means on said carriage for turning said platen and advancing over it a work sheet carried by said carriage, a second traveling carriage, and other line spacing means for line spacing a second work sheet carried by said second carriage, said other line spacing means being operative from said first named traveling carriage to advance said second work sheet over said platen, the two work sheets being maintained in superposed relationship.

139. In a typewriting machine, the combination of a traveling carriage, a rotary platen thereon, line spacing means on said carriage for turning said platen and advancing over it a work sheet carried by said carriage, a second traveling carriage, other line spacing means for line spacing a second work sheet carried by said second carriage, said other line spacing means being operative from said first named traveling carriage to advance said second work sheet over said platen, and means for changing the relationship between said carriages to change the relationship of said work sheets lengthwise of the printing line.

140. In a typewriting machine, the combination of a traveling carriage, a rotary platen thereon, line spacing means on said carriage for turning said platen and advancing over it a work sheet carried by said carriage, a second traveling carriage, other line spacing means for line spacing a second work sheet carried by said second carriage, said other line spacing means being operative from said first named traveling carriage to advance said second work sheet over said platen, and tabulating mechanism for separately controlling said carriages.

141. In a typewriting machine, the combination of a traveling carriage, a rotary platen thereon, line spacing means on said carriage for turning said platen and advancing over it a work sheet carried by said carriage, a second traveling carriage mounted on the first named carriage, other line spacing means for line spacing a second work sheet carried by said second carriage, said other line spacing means being operative from said first named traveling carriage to advance said second work sheet over said platen, and two separate sets of tabulating mechanism, one of said sets being effective to communicate a tabulating run to both of said carriages without disturbing the relationship between them, the other of said sets being effective on one only of said carriages.

142. In a typewriting machine, the combination of two carriages, each supporting a work sheet, and two sets of tabulating mechanism, one set for each carriage.

143. In a typewriting machine, the combination of two carriages, one mounted on the other and each supporting one of two work sheets, and tabulating mechanism associated with said carriages.

144. In a typewriting machine, the combination of two carriages, one mounted on the other, and each supporting one of two work sheets, and two sets of tabulating mechanism, one set associated with each carriage.

145. In a typewriting machine, the combination of a traveling carriage supporting a work sheet, detent mechanism for controlling the same, detent devices, a second traveling carriage also supporting a work sheet, detent devices for said second carriage, and key operated mechanism for independently freeing said carriages from the control of their respective detent devices.

146. In a typewriting machine, the combination of a carriage mounted to travel on the frame of the machine, carriage feeding devices for controlling the position of said carriage on said frame, a second carriage mounted to travel on the first carriage, detent devices for controlling the position of said second carriage on the first carriage, key operated tabulating mechanism effective to disconnect the first named carriage from its controlling devices, and other tabulating mechanism effective to disconnect said second carriage from its controlling devices.

147. In a typewriting machine, the combination of two traveling carriages, one mounted to travel on the other, denominational tabulating mechanism effective on both carriages, and other tabulating mechanism effective on one only of said carriages.

148. In a typewriting machine, the combination of a traveling carriage, a second carriage mounted to travel on the first carriage, denominational tabulating mechanism effective on both carriages to afford tabulating runs in one direction, and other tabulating mechanism effective only on said second carriage to afford a tabulating run thereof independent of the first carriage and in the opposite direction.

149. In a typewriting machine, the combination of two relatively movable carriages each supporting one of two separate work sheets, means for maintaining said carriages in set relationship endwise of each other, and releasing mechanism on one of said carriages for rendering said means inoperative.

150. In a typewriting machine, the combination of two carriages, one of said carriages being supported on the other, said carriages being relatively movable and supporting separate work sheets, detent devices for maintaining said carriages in set relationship endwise of each other, and release key mechanism on one of said carriages for disconnecting said detent devices.

151. In a typewriting machine, the combination of a traveling paper carriage, a second traveling paper carriage connected to the first named paper carriage, each of said carriages supporting a work sheet, detent devices between said carriages comprising a rack bar on one carriage and a coöperating spring-pressed pawl on the other carriage, and a release lever on one carriage effective at will to disconnect said pawl from said rack bar.

152. In a typewriting machine, the combination of two traveling carriages, carriage motors one connected to each carriage and constantly tending to draw said carriages in opposite directions, detent devices for maintaining said carriages in fixed relationship, and release key mechanism on one of said carriages for disconnecting said detent devices.

153. In a typewriting machine, the combination of a traveling carriage, a motor tending to draw said carriage in one direction, a second traveling carriage mounted on the first carriage, a second motor tending to draw said second carriage in the opposite direction from the first carriage, detent devices connecting said carriages and opposing said second motor but which permit relative displacement of said carriages in opposition to said second motor, and release mechanism for disconnecting said detent devices and permitting said second motor to become effective on said second carriage to move it on said first carriage.

154. In a typewriting machine, the combination of a main carriage; a sub-carriage mounted on said main carriage; motor mechanism tending to move said carriages in opposite directions; detent devices normally connecting said carriages and comprising a rack bar on the main carriage and a spring-pressed pawl member pivoted on the sub-carriage; and a release key lever on the sub-carriage effective at will on said pawl member to disconnect it from said rack.

155. In a typewriting machine, the combination of a traveling paper carriage supporting a work sheet, a second traveling paper carriage connected to the first named paper carriage and also supporting a work sheet, detent devices for maintaining a fixed relationship between said carriages, and means operating to disconnect said detent devices to afford a variation in the relationship between said carriages.

156. In a typewriting machine, the combination of a traveling paper carriage supporting a work sheet, a second traveling paper carriage connected to the first named paper carriage and also supporting a work sheet, detent devices for maintaining a fixed relationship between said carriages, and key controlled devices operative at will to disconnect said detent devices so as to permit a variation in the relationship between said carriages.

157. In a typewriting machine, the combination of two traveling carriages, carriage motors one connected to each carriage and constantly tending to draw said carriages in opposite directions, devices for maintaining said carriages in fixed relationship, and key controlled devices operative at will to render said last named devices ineffective.

158. In a typewriting machine, the combination of two releasable carriages, carriage motors one connected to each carriage and constantly tending to draw said carriages in opposite directions, connections between said carriages, and sets of tabulating mechanism one associated with each carriage and effective to release the same for a tabulating run under the control of its motor.

159. In a typewriting machine, the combination of a traveling carriage, a second carriage, a motor for the first recited carriage mounted on the frame of the machine, a motor for said second carriage mounted on the first recited carriage, sets of detent devices opposing the action of said motors, and sets of tabulating mechanism one for each carriage and operative to disconnect said detent devices and permit said motors to become effective.

160. In a typewriting machine, the combination of two traveling carriages one mounted on the other, two opposing spring drums one for each carriage, flexible connections between said spring drums and their respective carriages, one of said spring drums being on the frame of the machine and the other being mounted on one of said carriages, detent devices for maintaining said carriages in set relationship, carriage feeding devices for one carriage, tabulating mechanism operative to disconnect said carriage feeding devices, and other tabulating mechanism operative to disconnect said detent devices.

161. In a typewriting machine, the combination of a main carriage, a sub-carriage mounted to travel on said main carriage, a main carriage spring drum, a sub-carriage spring drum opposing the main carriage spring drum, escapement devices for the main carriage, detent devices connecting the two carriages, denominational tabulating mechanism for the main carriage effective to disconnect said escapement devices and permit the main spring drum to become effective on both carriages, and other tabulating mechanism effective to disconnect said detent devices and permit the sub-carriage spring drum to become effective on the sub-carriage only.

162. In a typewriting machine, the combination of a main carriage, a sub-carriage mounted to travel on said main carriage, opposing spring drums for said carriages, escapement devices for the main carriage, detent devices connecting the two carriages, a stop bar on the main carriage, column stops adjustable thereon, key controlled denominational stop mechanism on the frame of the machine, release mechanism effective on said escapement devices and controlled by said denominational mechanism, a stop bar on said sub-carriage, a column stop thereon, and key controlled stop mechanism on the frame of the machine coöperative with the sub-carriage column stop and effective to disconnect said detent devices.

163. In a typewriting machine, the combination of a main carriage, a sub-carriage mounted to travel thereon, line spacing mechanism for the sub-carriage work sheet, opposing spring drums for said carriages, escapement devices for the main carriage, detent devices connecting the two carriages, column stops adjustably mounted on the main carriage, key controlled denominational stop mechanism on the frame of the machine coöperative with said column stops, a releasing mechanism effective on said escapement devices and controlled by said denominational mechanism, a column stop adjustable on the sub-carriage, and key controlled stop mechanism on the frame of the machine coöperative with the sub-carriage column stop and effective both to disconnect said detent devices and also to actuate said line spacing mechanism.

164. In a typewriting machine, the combination of a paper carriage, line spacing mechanism for the paper thereon, and tabulating mechanism associated with said carriage and effective also to operate said line spacing mechanism.

165. In a typewriting machine and in tabulating mechanism, the combination of a traveling paper support, and tabulating mechanism operative on said support to move the paper in one direction along with said support and also effective to move the paper concurrently relatively to said support in another direction.

166. In a typewriting machine, the combination of a carriage, a paper feeding device thereon, an operating shaft for said device, and tabulating mechanism effective to afford tabulating runs to said carriage and also to actuate said operating shaft.

167. In a typewriting machine, the combination of a carriage, a paper feeding device thereon, an operating shaft for said device, a finger wheel connected to said shaft, key controlled line spacing devices effective to turn the shaft progressively step by step, and tabulating mechanism for said carriage, said tabulating mechanism being also effective to operate said shaft.

168. In a typewriting machine, the combination of a carriage, a paper feed roller thereon, pawl and ratchet line spacing mechanism operative on said feed roller comprising a handle which is also effective to move said carriage, tabulating mechanism for said carriage, and other pawl and ratchet line spacing mechanism operative on said feed roller and actuated by said tabulating mechanism.

169. In a typewriting machine, the combination of a carriage; a paper feeding device thereon; a shaft connected to said device to turn the same; pawl and ratchet mechanism for said shaft including a handle effective to actuate said mechanism and also to move said carriage; means for turning said shaft back and forth predetermined extents to effect a continuous advance and a continuous retraction of the paper, said means comprising a toothed wheel connected to said shaft, a pawl carrier pivoted concentrically with said toothed wheel, a double toothed pawl pivoted on said carrier and provided with a finger piece, and centering means for maintaining said pawl normally in a position in which both of its teeth are disengaged; tabulating mechanism for said carriage; and line spacing devices operative by said tabulating mechanism and including a ratchet wheel rigidly connected with said toothed wheel, and a pawl member coöperative with said ratchet wheel and operative from said tabulating mechanism.

170. In a typewriting machine, the combination of a carriage; a paper feeding device thereon; a shaft connected to said device to turn the same; pawl and ratchet mechanism for said shaft including a handle effective to actuate said mechanism and also to move said carriage; means for turning said shaft back and forth predetermined extents to effect a continuous advance and a continuous retraction of the paper, said means comprising a toothed wheel connected to said shaft, a pawl carrier pivoted concentrically with said toothed wheel, a double toothed pawl pivoted on said carrier and provided with a finger piece, and centering means for maintaining said pawl normally in a position in which both of its teeth are disengaged; tabulating mechanism for said carriage including a stop adjustable thereon, and a key controlled coöperating stop mounted on the frame of the machine; and line spacing mechanism operative by said tabulating mechanism, said line spacing mechanism including a ratchet wheel rigidly connected to said toothed wheel, a co- operating pawl member, and a bail on which said pawl member is mounted, said bail being operative from said key controlled frame stop.

171. In a typewriting machine, the combination of a carriage; a paper feeding device thereon; a shaft connected to said device to turn the same; pawl and ratchet line spacing devices operative on said shaft including a ratchet wheel connected to said shaft, a pawl member operative on said ratchet wheel, a pivoted bail on which said pawl member is pivoted, and a restoring spring for said pawl member; tabulating mechanism for said carriage including a key controlled stop member supported from the frame of the machine; and a device connected to said stop member for actuating said bail.

172. In a typewriting machine, the combination of a sub-carriage; a paper feeding device thereon; a shaft connected to said device to turn the same; pawl and ratchet line spacing devices operative on said shaft including a ratchet wheel connected to said shaft, a pawl member operative on said ratchet wheel, and a bail on which said pawl member is mounted; a main carriage on which said sub-carriage is mounted, said bail being pivoted on said main carriage; and tabulating mechanism for said sub-carriage including a key controlled stop member and a device on said stop member for actuating said bail.

173. In a typewriting machine, the combination of a carriage; a paper feed roller thereon; a shaft connected to said roller; pawl and ratchet operating devices for said shaft including a pawl-carrying bail; and tabulating mechanism for said carriage including a stop member supported from the frame of the machine, a rock shaft provided with a crank arm to which said stop member is pivotally connected, a second crank arm on said rock shaft, and a tabulating key lever operative on said second crank arm, said stop member being provided with an extension for operating said bail and actuating said feed roller.

174. In a typewriting machine, the combination of a releasable carriage, a plurality of tabulator stops mounted thereon, two stop members slidably supported on a stationary frame and having contiguous stop portions, the combined widths of said stop portions being less than a unit of letter space movement, and key controlled devices for separately actuating said stop members to project their respective stop portions into the path of said tabulator stops on the carriage.

175. In a typewriting machine, the combination of a releasable carriage; a plurality of tabulator stops mounted thereon; two stop bars slidably supported on a stationary frame and having contiguous stop portions; and trains of actuating devices for said stop bars, one train comprising a rock shaft provided with two crank arms to one of which the first stop bar is pivoted, the other crank arm being provided with a key at the keyboard, and the other train comprising a second rock shaft provided with two crank arms to one of which the second stop bar is pivoted and the other of which has a lost motion connection with a tabulator key lever.

176. In a typewriting machine, the combination of a releasable carriage; a plurality of tabulator stops mounted thereon; two stop bars slidably supported on a stationary frame and having contiguous stop portions; trains of actuating devices for said stop bars, one train comprising a rock shaft having connections with one stop bar and with a key at the keyboard, and the other train comprising a second rock shaft provided with two crank arms to one of which the other stop bar is pivoted and the other of which has a lost motion connection with a tabulator key lever; means for line spacing the work sheet associated with said carriage; and connections between said second stop bar and said line spacing means.

177. In a typewriting machine, the combination of a releasable carriage; a plurality of tabulator stops mounted thereon; two stop bars slidably supported on a stationary frame; trains of actuating devices for said stop bars, one train comprising a rock shaft provided with two crank arms to one of which one of said stop bars is pivoted, the other crank arm having a lost motion connection with a tabulator key lever; and pawl and ratchet line spacing mechanism for a work sheet supported on said carriage, said line spacing mechanism including a pawl carrying bail operative from said last mentioned stop bar.

178. In a typewriting machine, the combination of a carriage, a tabulator stop thereon, a key controlled frame stop normally in the path of said tabulator stop, key controlled mechanism comprising a frame stop normally in the path of said tabulator stop, and carriage releasing devices operative from said frame stop.

179. In a typewriting machine, the combination of a traveling paper supporting carriage, a paper shield normally arranged at one side of the printing line on the paper on said carriage, and means operating automatically during traveling movements of said carriage and because of such movements to move said shield to cover the printing line.

180. In a typewriting machine, the combination of a paper shield normally disposed at one side of the printing line on the paper, means constantly tending to move said shield to cover the printing line on the paper, and devices normally preventing said means from operating.

181. In a typewriting machine, the combination of a platen, a shield normally disposed at one side of the printing line thereon, means constantly tending to move said shield to cover the printing line on the paper, and disconnectible detent devices normally restraining said means.

182. In a typewriting machine, the combination of a paper shield normally disposed at one side of the printing line on the paper, means constantly tending to move said shield to cover the printing line on the paper, disconnectible detent devices normally restraining said means, and means for automatically disconnecting said detent devices.

183. In a typewriting machine, the combination of a platen, a shield normally disposed at one side of the printing line thereon, means constantly tending to move said shield to cover the printing line on the paper, disconnectible detent devices normally restraining said means, and line spacing mechanism operative automatically to disconnect said detent devices.

184. In a typewriting machine, the combination of a platen, type bars, a shield normally out of the path of said type bars, and means operative automatically to afford movement of said shield concentrically of the platen into the path of said type bars.

185. In a typewriting machine, the combination of a rotary platen, a shield for covering the printing line of the paper on said rotary platen, and means for moving said shield into and out of operative position independently of rotary movements of said platen.

186. In a typewriting machine, the combination of a traveling carriage, a platen thereon, a shield for covering the printing line on the platen, and means operating automatically to move said shield out of operative position during traveling movements of the carriage.

187. In a typewriting machine, the combination of a traveling carriage, a platen thereon, a shield for covering the printing line on the platen, line spacing mechanism operative automatically to afford movement of said shield into operative position, and means operating automatically to move said shield out of operative position.

188. In a typewriting machine, the combination of a traveling paper carriage, a paper shield thereon for covering the printing line on the paper, line spacing mechanism operative automatically to afford movement of said shield into operative position, and means operating automatically during traveling movements of the carriage to move said shield out of operative position.

189. In a typewriting machine, the combination of a platen, a paper shield, and line spacing mechanism for advancing a work sheet over the platen and for automatically moving said shield transversely of the printing line and circumferentially of the platen.

190. In a typewriting machine, the combination of a rotary platen, a paper shield extending lengthwise of the platen, and means for moving said shield circumferentially of the platen back and forth transversely of the printing line and so as to uncover and cover the printing line on the paper.

191. In a typewriting machine, the combination of a paper shield adapted to cover the printing line on the paper, and a support with which said shield has a floating connection.

192. In a typewriting machine, the combination of a carriage, a platen thereon, a supporting frame pivoted on said carriage, and a shield mounted to float on said support, said shield being adapted to move transversely of the printing line to cover and uncover the same.

193. In a typewriting machine, the combination of a carriage, a platen thereon, a supporting frame pivoted on said carriage, and a shield mounted to float on said support, said shield being adapted to move transversely of the printing line to cover and uncover the same, said frame being adapted to be swung away from the platen carrying said support with it so as to leave the printing face of the platen free and unobstructed.

194. In a typewriting machine, the combination of a carriage, a platen thereon, a supporting frame pivoted on said carriage, and a shield mounted to float on said support, spring means connecting said shield with its support, and devices normally overcoming said spring means.

195. In a typewriting machine, the combination of a platen, a shield adapted to cover the printing line, said shield extending lengthwise of said platen, arms at the ends of said shield, a movable supporting frame, and a yielding connection between said arms and said supporting frame.

196. In a typewriting machine, the combination of a platen, a shield adapted to cover the printing line, said shield extending lengthwise of said platen, arms at the ends of said shield, a movable supporting frame, gear connections between said arms and said supporting frame, and means for limiting the movement of said arms on said supporting frame.

197. In a typewriting machine, the combination of a platen, a shield adapted to cover the printing line, said shield extending lengthwise of said platen, arms at the ends of said shield, a movable supporting frame, gear connections between said arms and said supporting frame, and pin and slot connections between said arms and said supporting frame.

198. In a typewriting machine, the combination of a platen, a shield adapted to cover the printing line, said shield extending lengthwise of said platen, arms at the ends of said shield, a movable supporting frame, gear connections between said arms and said supporting frame, pin and slot connections between said arms and said supporting frame for limiting the movement of said arms on said frame, and springs tending to maintain said arms at the limit of movement in one direction.

199. In a typewriting machine, the combination of a paper shield adapted to cover the printing line on the paper, arms at the ends of said shield, a movable supporting frame, gear connections between said arms and said supporting frame, pin and slot connections between said arms and said supporting frame for limiting the movement of said arms on said frame, springs tending to maintain said arms at the limit of movement in one direction, and devices normally overcoming said springs.

200. In a typewriting machine, the combination of a paper shield adapted to cover the printing line, arms at the ends of said shield, a movable supporting frame, gear connections between said arms and said supporting frame, pin and slot connections between said arms and said supporting frame for limiting the movement of said arms on said frame, springs tending to maintain said arms at the limit of movement in one direction, and hand controlled detent devices normally overcoming said springs.

201. In a typewriting machine, the combination of a platen, a shield adapted to cover the printing line, said shield extending lengthwise of said platen, arms at the ends of said shield, a movable supporting frame, gear connections between said arms and said supporting frame, pin and slot connections between said arms and said supporting frame for limiting the movement of said arms on said frame, springs tending to maintain said arms at the limit of movement in one direction, hand operated means for restoring said platen, said hand operated means automatically disconnecting said detent devices.

202. In a typewriting machine, the combination of a paper shield adapted to cover the printing line on the paper; arms at the ends of said shield, a movable supporting frame, gear connections between said arms and said supporting frame, pin and slot connections between said arms and said supporting frame for limiting the movement of said arms on said frame, springs tending to maintain said arms at the limit of movement in one direction, and paper advancing devices, the actuation of which also operates automatically to disconnect said detent devices.

203. In a typewriting machine, the combination of a paper shield adapted to cover the printing line; arms at the ends of said shield; a movable supporting frame; gear connections between said arms and said supporting frame; pin and slot connections between said arms and said supporting frame for limiting the movement of said arms on said frame; springs tending to maintain said arms at the limit of movement in one direction, detent devices normally preventing said springs from operating, said detent devices comprising a lug on said supporting frame and a coöperating spring finger; and a hand actuated rock shaft provided with a lug or extension for disengaging said spring finger.

204. In a typewriting machine, the combination of a paper shield adapted to cover the printing line; arms at the ends of said shield; a movable supporting frame; gear connections between said arms and said supporting frame; pin and slot connections between said arms and said supporting frame for limiting the movement of said arms on said frame; springs tending to maintain said arms at the limit of movement in one direction; detent devices normally preventing said springs from operating, said detent devices comprising a lug on said supporting frame and a coöperating spring finger; a hand actuated rock shaft provided with a lug or extension for disengaging said spring finger; and paper advancing devices controlled by said rock shaft, said hand actuated rock shaft being also employed to restore said platen to the beginning of the printing line.

205. In a typewriting machine, the combination of a platen, a shield adapted to cover the printing line, said shield extending lengthwise of said platen, forwardly extending arms at the ends of said shield, said arms being provided with rearwardly extending fingers, a movable supporting frame, gear connections between the arms and said frame, means for limiting the movement of said arms on said frame, springs tending to maintain said arms at the limit of movement in one direction, said fingers normally coöperating with devices at the ends of the platen to maintain said springs under tension, and disconnectible detent devices normally coöperative with said frame.

206. In a typewriting machine, the combination of a spring pressed pivotally mounted frame provided with a paper pressure-roller, a second frame mounted concentrically with said first frame, a shield adapted to cover the printing point and mounted on said second frame, and loose connections between the two frames.

207. In a typewriting machine, the combination of a platen, a spring pressed pivotally mounted frame provided with a pressure roller, a second frame mounted concentrically with said first frame, a shield adapted to cover the printing point and mounted on said second frame, said first frame being adapted to be swung up and down to render the roller inoperative and operative, and devices for compelling said second frame to participate in the movements of the first frame.

208. In a typewriting machine, the combination of a carriage, a frame mounted movably on said carriage and provided with a paper shield adapted to extend over the printing line, spring means for holding said shield covering the printing line, and cam devices for overcoming said spring means and moving said shield to expose the printing line, said cam devices comprising an arm adjustable on said frame, and a coöperative device on the machine frame for swinging said arm.

209. In a typewriting machine, the combination of a carriage; a paper shielding frame mounted movably on said carriage; and an arm provided with a double cam adjustable lengthwise of said frame and a coöperating roller on the frame of the machine.

210. In a typewriting machine, the combination of a main carriage, devices for feeding and supporting a work sheet thereon, a sub-carriage, devices thereon for feeding and supporting a second work sheet in superposed relation with the work sheet on the main carriage, a shield interposed between said work sheets, and means for moving said shield to cover and uncover the printing line.

211. In a front-strike typewriting machine, the combination of a main carriage, a platen thereon, means for feeding a work sheet over said platen, a sub-carriage, means for feeding another work sheet supported thereon over the printing face of said platen, a shield mounted on the main carriage and interposed between said work sheets, and means for automatically controlling said shield to cause it to move into and out of register with the printing line at the front of said platen.

212. In a typewriting machine, the combination of a traveling carriage, stop devices for limiting the travel thereof in one direction, a second carriage adapted to travel parallel to the first carriage, a single set of printing instrumentalities coöperative with the work sheets supported on said carriages, and independent stop devices for limiting the travel of said second carriage in the same direction.

213. In a typewriting machine, the combination of a traveling carriage, a second carriage adapted to travel parallel with the first carriage, a single set of printing instrumentalities coöperative with the work sheets supported on said carriages, relatively adjustable stops for limiting the movement of the first carriage in one direction, and relatively adjustable stops for limiting the movement of the second carriage in the same direction.

214. In a typewriting machine, the combination of a main carriage adapted to support a work sheet, a sub-carriage adapted to support another work sheet, the two work sheets being superposed, and printing instrumentalities for printing simultaneously on the two work sheets.

215. In a typewriting machine, the combination of a main carriage supporting a wide work sheet, a sub-carriage mounted on the main carriage and supporting a narrow work sheet, tabulating mechanism adapted to arrest the main carriage and the sub-carriage at predetermined points in the travel of the main carriage toward the left, margin stops adapted to arrest the main carriage at predetermined points in its travel toward the right, and stop mechanism adapted to arrest the sub-carriage at predetermined points in its travel toward the right.

216. In a typewriting machine, the combination of a main carriage supporting a wide work sheet, a sub-carriage mounted on the main carriage and supporting a narrow work sheet, key operated tabulating mechanism adapted to arrest the main carriage and the sub-carriage at predetermined points in the travel of the main carriage toward the left, margin stops adapted to arrest the main carriage at predetermined points in its travel toward the right, and other key operated tabulating mechanism for arresting the sub-carriage at predetermined points in its travel toward the right.

217. In a typewriting machine, the combination of a main carriage, a sub-carriage mounted thereon, tabulating mechanism for the main carriage, tabulating mechanism for the sub-carriage, margin stop mechanism for the main carriage, a stop on the sub-carriage, and a coöperating stop on the main carriage to limit the movement of the sub-carriage thereon.

218. In a typewriting machine, the combination of a main carriage, a platen thereon supporting a plurality of record sheets, a sub-carriage supporting a work sheet which is guided in superposed relationship with said record sheets, carbon or transfer sheets being associated with the record sheets, ribbon mechanism, and printing instrumentalities coöperative with the sub-carriage work sheet through the ribbon and simultaneously coöperative with the record sheets through the carbon sheets.

219. In a typewriting machine, the combination of a main carriage, a platen thereon supporting a plurality of record sheets with interleaved carbon sheets, a sub-carriage supporting a work sheet which is guided in superposed relationship with the work sheets on the main carriage, ribbon mechanism, printing instrumentalities coöperative with the sub-carriage work sheet through the ribbon and simultaneously coöperative with the work sheets on the main carriage through the interleaved carbon sheets, and a shield or cut-out device interposable at will over the record sheets to prevent the co-action of the printing instrumentalities therewith.

220. In a typewriting machine, the combination of printing types and two relatively movable carriages, one carrying a work sheet and the other carrying means for imprinting on the work sheet when the types are actuated.

221. In a typewriting machine, the combination of printing types, and two traveling carriages, one mounted on the other, one carriage supporting a work sheet and the other an impression medium interposed in front of said work sheet in the path of the types.

Signed at the borough of Manhattan, city, county and State of New York, this 17th day of January, 1913.

STEPHEN H. FARNHAM.
ARTHUR W. SMITH.
JOSEPH PHELPS.

Witnesses:
E. M. WELLS,
CHARLES E. SMITH.